United States Patent
Stadelmeier et al.

(10) Patent No.: US 9,236,927 B2
(45) Date of Patent: Jan. 12, 2016

(54) TRANSMISSION APPARATUS AND METHOD FOR TRANSMISSION OF DATA IN A MULTI-CARRIER BROADCAST SYSTEM

(75) Inventors: Lothar Stadelmeier, Stuttgart (DE); Nabil Loghin, Stuttgart (DE); Joerg Robert, Vreden (DE); Samuel Asangbeng Atungsiri, Basingstoke (GB)

(73) Assignee: Sony Corporation, Tokyo (JP)

( * ) Notice: Subject to any disclaimer, the term of this patent is extended or adjusted under 35 U.S.C. 154(b) by 541 days.

(21) Appl. No.: 13/579,727

(22) PCT Filed: Feb. 15, 2011

(86) PCT No.: PCT/EP2011/052222
§ 371 (c)(1),
(2), (4) Date: Sep. 17, 2012

(87) PCT Pub. No.: WO2011/104142
PCT Pub. Date: Sep. 1, 2011

(65) Prior Publication Data
US 2012/0327879 A1   Dec. 27, 2012

(30) Foreign Application Priority Data

Feb. 25, 2010   (EP) .................................. 10154717
Nov. 22, 2010   (EP) .................................. 10192096

(51) Int. Cl.
*H04L 5/00*   (2006.01)
*H04B 7/06*   (2006.01)

(52) U.S. Cl.
CPC .............. *H04B 7/0689* (2013.01); *H04L 5/005* (2013.01); *H04L 5/0023* (2013.01); *H04L 5/0042* (2013.01)

(58) Field of Classification Search
USPC ......................................... 370/228, 248, 389
See application file for complete search history.

(56) References Cited

U.S. PATENT DOCUMENTS 7,123,887 B2   10/2006   Kim et al.
7,583,609 B2   9/2009    Catreux et al.
(Continued)

FOREIGN PATENT DOCUMENTS

WO   2009 003410   1/2009

OTHER PUBLICATIONS

Digital Video Broadcasting (DVB); Implementation Guidelines for a second generation digital cable transmission system (DVB-C2), 2010, pp. 1-146.*

(Continued)

*Primary Examiner* — Brandon Renner
*Assistant Examiner* — Prince A Mensah
(74) *Attorney, Agent, or Firm* — Oblon, McClelland, Maier & Neustadt, L.L.P.

(57) ABSTRACT

A transmission apparatus and method, respectively, mapping payload data of mapping input data streams onto a mapping output data stream having a channel bandwidth for transmission in a multi-carrier broadcast system. To enable selection of robustness for transmission of data, the apparatus includes a frame forming mechanism mapping data blocks of at least two mapping input data streams onto frames of the mapping output data stream covering the channel bandwidth, each frame including a payload portion, the payload portion including plural data symbols and being segmented into data segments each covering a bandwidth portion of the channel bandwidth. The frame forming mechanism is configured to map the data blocks of the at least two mapping input data streams onto data symbols of the payload portion and includes a MIMO mode selector selecting a MIMO mode of the data blocks per data segment and/or per mapping input data stream.

27 Claims, 29 Drawing Sheets

(56) References Cited

U.S. PATENT DOCUMENTS

| | | | |
|---|---|---|---|
| 7,724,838 B2 * | 5/2010 | Mantravadi | H04B 7/0669 375/260 |
| 7,920,483 B2 | 4/2011 | Catreux et al. | |
| 8,089,858 B2 | 1/2012 | Stadelmeier et al. | |
| 8,121,017 B2 | 2/2012 | Stadelmeier et al. | |
| 8,194,529 B2 | 6/2012 | Stadelmeier et al. | |
| 8,203,929 B2 | 6/2012 | Atungsiri et al. | |
| 8,274,878 B2 | 9/2012 | Stadelmeier et al. | |
| 2002/0193146 A1 * | 12/2002 | Wallace et al. | 455/562 |
| 2004/0132496 A1 | 7/2004 | Kim et al. | |
| 2005/0099975 A1 | 5/2005 | Catreux et al. | |
| 2005/0243780 A1 * | 11/2005 | Trainin et al. | 370/338 |
| 2007/0217531 A1 * | 9/2007 | Kwon | H04L 5/0023 375/260 |
| 2009/0219932 A1 * | 9/2009 | Kobayashi | 370/389 |
| 2009/0252247 A1 * | 10/2009 | Lee et al. | 375/267 |
| 2009/0296839 A1 | 12/2009 | Stadelmeier et al. | |
| 2010/0226366 A1 * | 9/2010 | Lee et al. | 370/389 |
| 2011/0205983 A1 * | 8/2011 | Bharadwaj et al. | 370/329 |
| 2012/0243561 A1 | 9/2012 | Loghin et al. | |
| 2012/0254684 A1 | 10/2012 | Loghin et al. | |
| 2012/0272117 A1 | 10/2012 | Stadelmeier et al. | |

OTHER PUBLICATIONS

Combined Chinese Office Action and Search Report issued May 7, 2014 in Patent Application No. 201180011361.0 (submitting English translation only).

ETSI EN 302 755 V1.1.1, "Digital Video Broadcasting (DVB); Frame structure channel coding and modulation for a second generation digital terrestrial television broadcasting system (DVB-T2)," Total 167 Pages, (Sep. 2009).

"Digital Video Broadcasting (DVB); Frame structure channel coding and modulation for a second generation digital transmission system for cable systems (DVB-C2)," Digital Video Broadcasting, DVB Document A138, Total 109 Pages, (Apr. 2009).

International Search Report Issued Jun. 1, 2011 in PCT/EP11/52222 Filed Feb. 15, 2011).

U.S. Appl. No. 13/578,446, filed Aug. 10, 2012, Stadelmeier, et al.

* cited by examiner

TRANSMISSION APPARATUS AND METHOD FOR TRANSMISSION OF DATA IN A MULTI-CARRIER BROADCAST SYSTEM

CROSS-REFERENCES TO RELATED APPLICATIONS

The present application claims the benefit of the earlier filing date of Ser. No. 10/154,717.2 filed in the European Patent Office on Feb. 25, 2010 and 10192096.5 filed in the European Patent Office on Nov. 22, 2010 and is a national stage application of the international application PCT/EP 2011/052222 filed on Feb. 15, 2011, the entire content of which applications is incorporated herein by reference.

FIELD OF INVENTION

The present invention relates to a transmission apparatus comprising an apparatus for mapping payload data of mapping input data streams onto a mapping output data stream having a channel bandwidth for transmission in a multi-carrier broadcast system. Further, the present invention relates to a receiving apparatus for receiving data within a multi-carrier broadcast system. Still further, the present invention relates to corresponding methods and a non-transitory computer-readable recording medium.

The present invention relates, for instance, to the field of Digital Video Broadcasting (DVB) utilizing Orthogonal Frequency Division Multiplexing (OFDM). Further, the present invention can generally be applied in other broadcast systems, such as DAB (Digital Audio Broadcasting), DRM (Digital Radio Mondial), MediaFlo, ISDB systems or a future ATSC system. However, it should be noted that the invention is not limited to the use of OFDM, but can generally be applied in all multi-carrier broadcast systems and their components.

BACKGROUND OF THE INVENTION

The transmission parameters of known broadcast systems, such as the broadcast systems in accordance with the DVB-T2 standard (second generation digital terrestrial television broadcast systems standard as defined in ETSI EN 302 755 V1.1.1 (2009-09) "Digital Video Broadcasting (DVB); Framing structure Channel Coding and Modulation for a Second Generation Digital Terrestrial Television Broadcast system (DVB-T2)"), are generally optimized for fixed reception with stationary receivers, e.g. with roof-top antennas, for which low power consumption is not a main issue. Further, according to this standard a fixed channel bandwidth is generally used. In future broadcast systems, such as the upcoming DVB-NGH (DVB Next Generation Handheld; in the following also referred to as NGH) standard, a mobile receiver (which is the main focus of this upcoming standard) shall support a variety of different channel bandwidths, e.g. ranging from 1.7 MHz to 20 MHz wide channels. Further, such a mobile receiver has to account for specific needs of mobile and handheld reception, i.e. low power consumption and high robustness.

SUMMARY OF INVENTION

It is an object of the present invention to provide a transmission apparatus and method comprising an apparatus and a corresponding method, respectively, for mapping payload data of mapping input data streams onto a mapping output data stream having a channel bandwidth for transmission in a multi-carrier broadcast system, which selectively provide a high robustness of the data transmission and which enable the use of narrow-band receivers having a low power consumption. It is a further object of the present invention to provide a corresponding receiving apparatus and method and a non-transitory computer-readable recording medium.

According to an aspect of the present invention there is provided a transmission apparatus for transmitting data within a multi-carrier broadcast system, comprising a transmitter unit for transmitting said mapping output data stream, an apparatus for mapping payload data of mapping input data streams onto a mapping output data stream having a channel bandwidth for transmission in a multi-carrier broadcast system, and wherein said apparatus for mapping comprises a data input for receiving said at least two mapping input data streams each being subdivided into data blocks carrying payload data, a frame forming means for mapping the data blocks of said at least two mapping input data streams onto frames of said mapping output data stream covering said channel bandwidth, each frame comprising a payload portion, said payload portion comprising a plurality of data symbols and being segmented into data segments each covering a bandwidth portion of said channel bandwidth, wherein the frame forming means is adapted for mapping the data blocks of said at least two mapping input data streams onto the data symbols of said payload portion and comprises a MIMO mode selection means for selecting the MIMO mode of the data blocks per data segment and/or per mapping input data stream, and a data output for outputting said mapping output data stream According to a further aspect of the present invention there is provided a receiving apparatus for transmitting data within a multi-carrier broadcast system.

According to further aspects of the present invention there is provided a transmission method, a receiving method and a non-transitory computer-readable recording medium that stores therein a computer program product, which, when executed by a processor, causes the method disclosed herein to be performed.

Preferred embodiments of the invention are defined in the dependent claims. It shall be understood that the claimed apparatus and methods and the claimed medium have similar and/or identical preferred embodiments as the claimed transmission apparatus and as defined in the dependent claims.

One of the ideas of the present invention is to apply the concept of band segmentation in the frames in order to enable the use of narrow-band receivers for receiving and processing the frames. Such a segmentation of the payload portion (which carries the actual payload data) of the frames, according to which the payload portion is segmented into (two or more) data segments each covering a bandwidth portion of the total channel bandwidth, the power consumption of the used narrow-band receiver can be kept low. Additionally, one fixed receiver tuner bandwidth is sufficient for the reception of all available transmission bandwidths.

The frame structure applied for the frames thus uses the band segmentation concept as, for instance, described in the DVB-C2 standard (DVB BlueBook A138 "Digital Video Broadcasting (DVB); frame structure channel coding and modulation for a second generation digital transmission system for cable systems (DVB-C2)") according to which the total channel bandwidth is divided into data slices (generally referred to herein as "data segments"). Further, quite similar as described in the DVB-C2 standard, the frames may in an embodiment comprise a preamble portion in addition to the payload portion, wherein the preamble portion comprises at least one preamble symbol carrying at least one preamble signalling block including signalling data. The data segments of the payload portion may have flexible bandwidths and are generally not aligned to a frequency raster. All data of a mapping input data stream may be transmitted within one data segment, but this is not an essential requirement as will be explained below. Further, while the preamble signalling blocks are aligned to a frequency raster, the data segments typically do not follow any channel raster and can even have flexible bandwidths. Data segments may also be combined in frequency direction to an overall broader data pipe having a broader bandwidth, and may also contain data of more than one mapping input data stream.

Further, the concept of absolute OFDM may be applied for the frame structure of the frames, according to which all OFDM subcarriers are seen relative to the absolute frequency 0 MHz instead of a signal center frequency. Reason for the application of absolute OFDM and unique pilot pattern across the medium spectrum, as applied in DVB-C2, is to avoid in the preamble symbols repeating OFDM subcarrier allocations in the frequency domain that result in an increased PAPR (Peak to Average Power Ratio). Furthermore, the recognition of signals provided for particular receivers (e.g. mobile receivers, for instance according to the upcoming DVB-NGH standard) during initial acquisition gets faster and more reliable with the help of the frequency specific pilot patterns.

Another idea of the present invention is to provide the ability to the mapping apparatus to select the MIMO mode of the data blocks (also referred to as "bursts" or "data patterns") per data segment (also referred to as "data slice") and/or per mapping input data stream (also referred to as "PLP" or "physical layer pipe"), i.e. for each particular data segment and/or for each particular mapping input data stream it is possible to determine the MIMO mode of the data blocks so that the data blocks are transmitted by use of a respective antenna configuration of the transmitter. Selection of the MIMO mode here means that it is possible during the mapping of the data blocks onto the frames to select by which antenna configuration the data blocks of a particular mapping input data stream (which may be mapped onto a single or several data segments) and/or the data blocks that shall be mapped onto a data segment (which may belong to a single or several mapping input data streams) shall be transmitted. Hence, for instance, the service provider of a particular service may determine that his service (i.e. his mapping input data stream shall be transmitted with a high robustness compared to another service that shall be transmitted with a lower robustness, but with a higher throughput rate. The antenna configuration (i.e. the MIMO mode) used for transmitting the data blocks of said services may thus be selected accordingly.

Generally, all possible MIMO modes are available for selection, i.e. the term MIMO mode shall not be construed as being limited to selecting a MIMO (Multiple Input Multiple Output) antenna configuration, using at least two antennas for transmission in the transmitter and at least two antennas for reception in the receiver. In contrast, other modes and, thus, other antenna configurations shall also be available for selection, and the term MIMO mode selection shall thus be understood broadly in this broad sense. In an embodiment, the MIMO mode selection means is adapted for selecting one of a SISO (Single Input Single Output) scheme, MISO (Multiple Input Single Output) scheme or MIMO scheme, which represent the most common schemes, i.e. the MIMO mode available for selection can be MIMO, MISO or SISO scheme (often also called "mode" or "antenna configuration") in this embodiment. In the selection of the used MIMO mode a trade-off can be made between high robustness but increased mapping and processing capacity versus lower robustness and lower mapping and processing capacity. As an example, a certain service (e.g. news broadcast) can be transmitted using MISO scheme, such that even fast moving receivers (e.g. in cars or trains) can receive this service, while at a later time, the next service might target only stationary or portable receivers and thus uses a MIMO scheme, which results in a higher data rate but requires a higher reception quality. Finally, in the given example, a low bit rate radio service can be transmitted using SISO such that decoding becomes simple. Furthermore, SISO offers the advantage that the number of pilots for channel estimation can be reduced compared to MISO or MIMO transmission.

It should be noted here that there are generally two different basic antenna arrangements available in MIMO and MISO schemes. In one antenna arrangement two or more transmission antennas are arranged spatially distinct (so-called distributed MIMO/MISO). In another antenna arrangement the two or more antennas are located close together, but the transmitted signals are differently polarized (so-called co-located MIMO/MISO).

In an embodiment said MIMO mode selection means is adapted for changing the MIMO mode from frame to frame or from a group of frames to a next group of frames. Hence, some flexibility in the MIMO mode selection is provided, which allows e.g. targeting different receiver types, or transmitting data in MIMO scheme only in a specific part of a mapping output data stream, while data in SISO scheme is transmitted in the remaining parts. Further, this embodiment can be used to change the MIMO mode for a new service that is mapped onto a new frame or a new group of frames.

Further, in an embodiment said MIMO mode selection means is adapted for mapping the data blocks onto the data symbols of the data segments such that the MIMO mode changes from data symbol to data symbol or from a group of data symbols to a next group of data symbols, which allows e.g. targeting different receiver types, or transmitting data in MIMO mode only in a specific part of a mapping output data stream, while data in SISO scheme is transmitted in the remaining parts. Furthermore, this scheme allows e.g. for the application of scalable video coding, where the robust layer is transmitted in SISO scheme, while the enhancement layer is transmitted in MIMO scheme. Thus, decoding of the robust layer is also possible in channel conditions where MIMO decoding fails (e.g. correlated channels).

In another aspect of the present invention an apparatus for mapping payload data of mapping input data streams onto a mapping output data stream having a channel bandwidth for transmission in a multi-carrier broadcast system is provided, said apparatus comprising a data input for receiving said at least two mapping input data streams each being subdivided into data blocks carrying payload data, a frame forming means for mapping the data blocks of said at least two mapping input data streams onto frames of said mapping output data stream covering said channel bandwidth, each frame comprising a payload portion, said payload portion comprising a plurality of data symbols and being segmented into data segments each covering a bandwidth portion of said channel bandwidth, wherein the frame forming means is adapted for mapping the data blocks of said at least two mapping input data streams onto the data symbols of said payload portion and comprises a pilot pattern selection means for selecting the pilot pattern per data segment and/or per mapping input data stream, and a data output for outputting said mapping output data stream.

This aspect provides another option for selecting the robustness (especially for reliable channel estimation at the receiver) of data blocks of data segments and/or mapping input data streams. This option can be provided as an alternative or in addition to the MIMO mode selection means of the MIMO mode per data segment and/or per mapping input data stream, but can also be provided in addition thereto.

In particular, in a further embodiment said pilot pattern selection means is adapted for increasing the pilot density in time and/or frequency direction, in particular depending on the number of transmission antennas and/or the desired robustness level, since by selecting a higher pilot density a higher robustness can be achieved.

Preferably, said pilot pattern selection means is adapted for providing edge pilots for one or more neighbouring data segments, said edge pilots fitting with the pilot patterns of said one or more neighbouring data segments. Said fitting can, for instance, be achieved by selecting edge pilots such that they are a multiple of the pilot patterns of the two neighbouring data segments, between which the (common) edge pilots are provided, or of a single neighbouring data segment (if the edge pilots are provided at the beginning or end in frequency direction of a data symbol). Hence, both segments can employ these edge pilots, and no frequency gap is required between data segments. Furthermore, the required pilot overhead is limited to a minimum, as both data segments employ the same (common) edge pilots.

Preferably, said pilot pattern selection means is adapted for changing the pilot pattern from frame to frame or from a group of frames to a next group of frames. Hence, some flexibility in the pilot pattern selection is provided. If e.g. a SISO signal is transmitted in a frame, only the SISO pilots have to be transmitted, which require significantly less overhead compared to MIMO pilots. Furthermore, also the density of the pilots can be adjusted to different scenarios, e.g. different receiver velocities. As an example, a certain service (e.g. news broadcast) can be transmitted with a high pilot density, such that even fast moving receivers (e.g. in cars or trains) can receive this service, while at a later time, the next service might target only stationary or portable receivers and thus uses a smaller pilot density, which results in a higher data rate.

In an embodiment, said frame forming means further comprises a buffer unit per mapping input data stream for storing preprocessed data blocks of an associated mapping input data stream therein until they are mapped onto a frame, wherein said frame forming means, in particular a scheduler thereof, is adapted for retrieving data blocks from a buffer and mapping them onto a data segment of a frame, if sufficient data blocks are stored therein for filling a complete data symbol. This provides an efficient way of filling the data segments of the frames with the data blocks.

In an embodiment said frame forming means is adapted for mapping the data blocks of said at least two mapping input data streams onto the data segments of a frame such that into a data segment only data blocks having the same MIMO mode and/or pilot pattern are mapped. This facilitates the transmission of the data and the signalling to the receiver since within a data segment only a single MIMO mode and/or pilot pattern is applied so that per data segment only one single piece of signalling information must be provided to the receiver.

In a preferred embodiment said frame forming means is adapted for mapping signalling information into said frame, said signalling information including MIMO mode information indicating the selected MIMO mode of the data blocks per data segment and/or per mapping input data stream and/or pilot pattern information indicating the selected pilot pattern per data segment and/or per mapping input data stream. The receiver thus easily knows which MIMO mode and/or pilot pattern is applied and can thus correctly receive and decode the received data blocks. Further, this enables the receiver to switch off particular receiving antennas or complete receiving paths, if the signalling information signals that only a single receiving antenna (and also further elements, like tuner, demodulator, etc.) is generally required as is, for instance, the case in SISO or MISO scheme. In this way, processing capacity and power can be significantly saved in the receiver in certain MIMO modes. Alternatively, mechanisms like maximum ratio combining can be used to increase the decoding probability.

To enable the receiver to obtain all the required signalling information for receiving all the data blocks of the desired data stream, which is particular important if the data blocks are multiplexed in time and frequency direction and/or if they are irregularly mapped onto the frame, various embodiments exist for informing the receivers accordingly.

Optionally, said frame forming means is adapted for including said signalling information into one or more preamble signalling blocks mapped onto preamble symbols of a preamble portion of said frames, into one or more payload portion signalling blocks mapped onto data symbols of said payload portion or in-band into one or more data blocks mapped onto data symbols of said payload portion. Hence, according to one embodiment all the required signalling information could be put into the preamble signalling blocks. This, however, would require quite large preamble signalling blocks forcing the receiver to receive and process quite a lot of information which is not all required if only one particular data stream shall be received, i.e. the signalling data for the other data streams is not required and thus superfluous in such situation. This would also lead to time delays of the processing of the actual data to be received. On the other hand, one advantage would be that zapping could be faster, as all signalling information is already known.

Hence, according to a preferred embodiment the at least one preamble signalling block comprises only high level, rough signalling information about the mapping of the data blocks onto the data segments of the frames and the frame forming means is adapted for mapping payload portion signalling blocks comprising low level, more detailed signalling information about the mapping of the data blocks onto the data symbols of the frames. According to this embodiment the main information for enabling the receiver to receive and process a particular data stream is provided in said payload portion signalling blocks, which can generally be regarded and processed by the frame forming means as an own mapping input stream and which can thus be mapped onto the frames in the same way as the other mapping input data streams. The information contained in the payload portion signalling blocks thus, for instance, contains the information about the code rate, modulation, number of subsequently arranged FEC-frames, the number of data blocks within a frame and the information about the location of the data blocks within the frame. This information for a particular mapping input data stream can either be put into one payload portion signalling block and can be cyclically repeated, or it can be divided into several pieces of information distributed over multiple payload portion signalling blocks. The use of such payload portion signalling blocks mapped onto the payload portion provides the additional advantage that a time diversity of said payload portion signalling blocks can be provided resulting in a higher robustness of the signalling information. This signalling is similar to the L1 signalling as done according to the DVB-T2 standard, whereby further or other parameters are included as needed.

To enable the receiver to find at least one payload portion signalling block the at least one preamble signalling block preferably comprises at least one pointer to a payload portion signalling block. Hence, the receiver first obtains said pointer from the preamble signalling block and then uses the pointer to find the payload portion signalling block by use of said pointer, obtains the signalling information contained therein which then enables the receiver to find the data blocks of the desired data stream. Hence, the preamble signalling blocks can be short since basically pointers and only some other general signalling information needs to be provided therein.

The provision and use of a pointer in the preamble portion is, however, not mandatory. For instance, according to an alternative embodiment, the position of the payload portion signalling block(s) is predefined and known a priori in the receiver, e.g. predefined in a standard or pre-programmed in the transmitter and all receivers.

In an even more elaborate embodiment it is proposed that the frame forming means is adapted for mapping in-band signalling information comprising low level, more detailed signalling information about the mapping of data blocks of a particular mapping input data stream onto the data segments of the frames into one or more of said data symbols, in particular into all data symbols carrying data blocks of said particular mapping input data stream. Hence, the concept of in-band signalling may additionally be used in the frames. Said in-band signalling information may, for instance comprise the information where the next data block of the same mapping input data stream can be found. Thus, all this signalling information needs not to be decoded from the preamble signalling blocks and/or the payload portion signalling blocks, which thus only need to enable the receiver to find the first data block. If the receiver has decoded said data blocks it can also read the in-band signalling information contained therein enabling the receiver to find the next data block. This concept is preferably provided in the data blocks of all mapping input data streams mapped onto the frames.

According to still another embodiment the frame forming means is adapted for mapping payload portion signalling blocks onto data symbols of one or more particular frames, wherein signalling information, in particular pointers, about the mapping of the data blocks onto the data symbols of one or more subsequent frames, in particular the next superframe, is included into said payload portion signalling blocks. Hence, in a frame all the required signalling information can be found by the receiver in the payload portion signalling blocks that are required to find all data blocks mapped onto one or more subsequent frames, i.e. a group of frames or the frames of a superframe. This requires for the receiver a bit more time for obtaining all the signalling information, but allows instant zapping of the receiver between all data streams without any waiting time for first obtaining the required signalling information. In other words, the signalling information is obtained in advance and without knowing if and which parts thereof all are really required by the receiver.

According to a further refinement the frame forming means is adapted for including offset signalling information indicating changes of the mapping of the data blocks between said one or more particular frames and said one or more subsequent frames into in-band signalling information of a data block or into one or more payload portion signalling blocks mapped onto data symbols of said one or more particular frames. Hence, at the end of a frame said offset signalling information can be mapped as in-band signalling information into one or more data blocks. Alternatively, said offset signalling information can be mapped into one or more payload portion signalling blocks. Said offset signalling information indicates how the signalling information changes from this (group(s) of) frame(s) to the next (group(s) of) frame(s) (or any other subsequent frame(s)) so that in the next (or subsequent) (group(s) of) frame(s) all the signalling information must not necessarily be mapped into payload portion signalling blocks or must at least not be obtained by the receiver. In other words, mainly some offset information is mapped into the frames to save mapping space and time (in the receiver, which can be continuously tuned to the desired data stream and needs not access the payload portion signalling blocks again).

In another embodiment said frame forming means further comprises one or more mapping units per transmission path of a transmitter into which said apparatus is included, wherein said one or more mapping units are adapted for individually mapping substantially the same data blocks of the provided mapping input data stream onto individual frames. Hence, in the various MIMO modes the required mapping can be applied by the various frame forming units. For instance, in SISO scheme the data can either be transmitted by only a single antenna, but can also be transmitted—in identical form—by two or more antennas. On the receiver side, for instance, in SISO scheme the data can either be received by only a single antenna, but can also be received—in identical form—by two or more antennas (single input, multiple output, SIMO scheme). Also in MIMO all reception paths are generally active. In MISO scheme the data of one transmission path can be subjected to an additional coding, e.g. Alamouti coding as defined in the DVB-T2 standard, whereas the data on the other transmission path are not further coded. Therefore, in another embodiment at least one mapping unit comprises encoding means for encoding the data blocks provided to said at least one mapping unit.

Still further, in an embodiment said frame forming means is adapted for mapping the data blocks of a mapping input data stream onto a frame such that they are spread in time and frequency over various data symbols and various data segments of said frame. Hence, according to this embodiment, the data blocks of a mapping input data stream are not only mapped onto a single data segment or onto two or more data segments, but are mapped onto various, e.g. all, data segments of the frame. In other words, time and frequency multiplexing is applied to the data blocks of a mapping input data stream providing time and frequency diversity increasing the overall robustness against different kinds of disturbances that might appear on the transmission channel, which is particularly important when considering the reception by mobile receivers. In addition, the data contained in the data blocks may be interleaved in advance, and generally the data are also protected by a forward error correction code, such as an LDPC code.

According to a preferred embodiment the frame forming means is adapted for mapping the data blocks of a mapping input data stream onto a frame such that they are mapped onto a single data segment or onto two or more, in particular neighbouring, data segments of said frame. Hence, as mentioned above, data segments can be combined to obtain a broader "data segment", which is also referred to as a "data pipe". The same concept of a segmented payload portion of the frames can be used, even if mapping input data streams having a higher data density shall be mapped onto a frame. According to a more general scenario the data blocks of a particular mapping input data stream are mapped onto two or more data segments, which are not neighbouring in frequency direction. In all these embodiments the receiver needs to have a broader bandwidth.

According to further embodiments the frame forming means is adapted for selecting the bandwidth of said data segments of the payload portion of the frames. Hence, the bandwidth may be variable and selected as needed, for instance according to the amount of data of a mapping input data stream to be mapped on the frames. Alternatively, as proposed according to another embodiment, the data segments of the payload portion of the frames may have a predetermined bandwidth, in particular an equal bandwidth, in all frames. The latter embodiment requires less signalling since the receivers can be appropriately adapted in advance for reception of the known predetermined bandwidth.

Further, according to an embodiment the frame forming means is adapted for mapping the data blocks of a mapping input data stream onto a frame such that at each time at most one data symbol comprises a data block of a particular mapping input data stream. Hence, according to this embodiment a further improvement of time diversity is obtained further increasing robustness and a narrow-band receiver can detect this service.

Further, in an embodiment the frame forming means is adapted for mapping the data blocks of a mapping input data stream onto a frame such that the data blocks are irregularly mapped onto data symbols of the frame. This embodiment also contributes to an increase of the robustness, in particular against regular disturbances. Irregular particularly means that there is no predefined or any regular mapping, e.g. that is periodic in time and/or frequency direction, of the data blocks of a mapping input data stream onto the data symbols both in time and frequency direction, e.g. a sequential sorted arrangement that could be susceptible to periodic disturbances.

Still further, in an embodiment the frame forming means is adapted for mapping the data blocks of a mapping input data stream onto a frame such that between data symbols carrying a data block of a particular mapping input data stream there is one or more data symbol in time direction carrying no data block of the same particular mapping input data stream. This embodiment also contributes to an increase of the robustness, but provides the further advantage that the receiver may fall into sleep mode and, thus, save power in between data symbols carrying data blocks of the mapping input data stream that shall be received, i.e. data symbols carrying no data blocks of the mapping input data stream that shall be received are not received or at least not completely processed in the receiver. Further, this provides the ability to the receiver to estimate the channel prior of fully waking up.

According to a preferred embodiment the frame forming means is adapted for segmenting the preamble portion of the frames into preamble segments all having an identical fixed bandwidth. This solution corresponds, as mentioned above, to the segmentation of the preamble portion as, for instance, described in the DVB-C2 standard according to which L1 blocks are provided in the preamble portion. In an embodiment the bandwidth of the preamble segments is equal to or larger than the bandwidth of the data segments. Alternatively, the bandwidth can also be smaller, e.g. if less signalling information must be put into the preamble segments. Generally, the bandwidth of both the preamble segments and the data segments is smaller than the receiver bandwidth.

In a further embodiment the frame forming means is adapted for mapping substantially the same signalling data onto all preamble segments of the preamble portion of a frame. Thus, the same signalling data is continuously provided in the preamble signalling blocks (which might slightly differ from each other, e.g. have different pilots and/or are differently scrambled), but enable a receiver always to be able to receive signalling data, irrespective to which data segment it is tuned. Hence, even if the tuning position of a receiver is not aligned to the frequency raster of the preamble segments, the receiver is able to obtain the signalling data by sorting the signalling data out of two adjacent preamble signalling blocks since the signalling data is preferably cyclically repeated within the preamble portion.

In an embodiment the mapping apparatus further comprises a second frame forming means for mapping the data blocks of a first group of received mapping input data streams onto first frames having a first frame structure covering said channel bandwidth for use by receivers of a first type, wherein said frame forming means is adapted for mapping the data blocks of a second group of received mapping input data streams onto second frames having a second frame structure covering said channel bandwidth for use by receivers of a second type, which second frame structure is different from the first frame structure, and a stream forming means for forming said mapping output data stream by alternately arranging one or more first and one or more second frames.

This embodiment is based on the idea to construct the mapping output data stream such that it comprises two different types of frames, each having its own frame structure. These two types of frames are alternately arranged in the mapping output data stream such that alternately one or more second frames follow one or more first frames and so on as, for instance, defined in the superframe structure according to the DVB-T2 standard, according to which T2-frames and FEF frames (Future Extension Frames) are alternately arranged. The first frames are designed for reception by a first type of receiver, e.g. a stationary receiver such as a DVB-T2 receiver, while the second frames (i.e. the "frames" as explained above in detail) are designed for reception by a second type of receiver, e.g. a mobile receiver such as a DVB-NGH receiver.

The frame structure applied for the first frames may, as proposed according to a preferred embodiment, be the frame structure as described in the DVB-T2 standard for the T2-frames, and the second frames may be the FEF frames as described in the DVB-T2 standard. Both frames may thus be arranged alternately to obtain a superframe structure as generally described in the DVB-T2 standard. Further, both frames may carry data from the same mapping input data streams but with a different robustness level and different data throughput (i.e. different data density) if designed for reception by different kinds of receivers. For instance, the first frames may carry the data with a high density for reception by stationary receivers, while the second frames may carry the same data with low density for reception by mobile receivers. In other embodiments, however, the two different types of frames may carry data from different (or only partly the same) mapping input data streams, for instance if different services or data shall be provided to the different kinds of receivers.

As mentioned above, the first frames may be formed in accordance with the DVB-T2 standard and the second frames may be formed in accordance with the DVB-C2 standard. The mapping input data streams can thus be regarded as physical layer pipes, wherein each physical layer pipe is segmented into subslices or bursts representing the above-mentioned data blocks, which carry error correction code encoded, interleaved data. The invention, however, is not limited to such embodiments and applications, but other frame structures and other kinds of mapping input data streams in other applications (using other standards or no particular standard) may be used as well.

It has been found that generally for changing from the transmission of data in a SISO scheme (requiring only a single transmission antenna) to the transmission of data in a MIMO or MISO scheme (requiring at least two transmission antennas) in time domain it is needed to quickly switch the one or more further transmission antennas on and off. Due to the high power used for transmission in the field of broadcasting, other solutions are needed.

For solving this problem, in an embodiment the transmission apparatus as proposed according to the present invention is adapted for transmitting a mapping output data stream in which the MIMO mode of the data blocks is selected per data segment, wherein said transmitter unit comprises at least two transmission antennas, wherein a first transmission antenna is adapted for transmission of data blocks mapped onto data segments in any MIMO mode and wherein the further transmission antennas are adapted for transmission of data blocks mapped onto data segments in the MISO scheme or MIMO scheme. Hence, no quick on and off switching of transmission antennas in time domain is required, but the transmission antennas are generally switched on all the time but are generally using different numbers of subcarriers.

Preferably, said further transmission antennas are adapted to use differently polarized subcarriers than the first antenna. For instance, in an embodiment of a transmission apparatus a first transmission antenna uses vertically polarized subcarriers, while a second transmission antenna uses horizontally polarized subcarriers. Alternatively, the various antennas may use different circular polarizations. In still another alternative embodiment of a transmission apparatus the various transmission antennas deploy spatial diversity, i.e. they may be located at considerable distances from each other, i.e. not at substantially the same place, but rather separated by about 5-10 times the wavelength, and may then use the same polarization. Further, combinations of all schemes are also possible (spatially separated and (circular) polarized, . . . . )

Advantageously, said frame forming means is adapted for generating OFDM symbols for transmission by said further transmission antennas over the complete channel bandwidth. Thus, a single wide-band OFDM symbol is used in this embodiment by said further transmission antennas.

In this embodiment said frame forming means is preferably adapted for setting subcarriers used by said further transmission antennas to zero in bandwidth portions of said channel bandwidth covered by data segments onto which data blocks are mapped in the SISO scheme. Thus, only a single OFDM symbol has to be generated and synchronization in time and frequency is eased.

Alternatively, said frame forming means is adapted for generating OFDM symbols for transmission by said further transmission antennas, an OFDM symbol comprising two or more partial OFDM symbols, each partial OFDM symbol comprising only directly adjacent, non-zero subcarriers. Thus, two or more narrow-band OFDM symbols are used in this embodiment by said further transmission antennas. This approach yields smaller PAPR values for each partial OFDM and further allows the construction of very broadband OFDM signals of smaller building blocks. However, the partial OFDM signals have to be shifted (mixed) to the corresponding data segments with perfect time and frequency synchronization.

Further, in an embodiment said further transmission antennas are adapted for each substantially using the same total transmission power as the first transmission antenna and for each substantially equally distributing the total transmission power to the non-zero subcarriers. This ensures that each transmission antenna can transmit with the same total power which is generally desired in case of several transmission antennas in a MIMO or MISO transmission system. This helps to avoid power imbalances at the receiver for the detection of the different transmission antennas prior to OFDM demodulation, thereby achieving the best possible average SNR values for the different reception antennas. This provides an advantage, since many MIMO schemes suffer from power imbalances, e.g., spatial multiplexing MIMO.

Preferably, said transmission antennas are adapted for each substantially using the same transmission power per non-zero subcarrier. This helps to avoid power imbalances at the receivers for the detection of the different transmission antennas after OFDM demodulation.

Finally, in an embodiment said frame forming means is adapted for inserting PAPR reducing methods (e.g. pilots, tone reservation carriers, etc.) for use by said further transmission antennas in bandwidth portions of said channel bandwidth covered by data segments onto which data blocks are mapped only in the SISO scheme. This provides for an improvement of the PAPR (peak-to-average power ratio) reduction of the transmissions of the further transmission antennas.

In a further aspect of the present invention a transmission apparatus is provided, in particular as described above, comprising at least two transmission antennas, wherein a first transmission antenna is adapted for transmission of data blocks mapped onto data frames in any MIMO mode and wherein the further transmission antennas are adapted for transmission of data blocks mapped onto data frames in the MISO scheme or MIMO scheme, wherein the one or more further antennas are adapted for also transmitting data during times where the first transmission antenna is transmitting data blocks mapped onto data frames in the SISO scheme, and wherein said further transmission antennas are adapted for each substantially using the same transmission power as the first transmission antenna.

This transmission apparatus is generally provided for use in any kind of transmission system, including broadcast systems, using at least two transmission antennas in which different MIMO modes are alternately used from time to time, i.e. where it is needed to quickly switch the one or more further transmission antennas on and off. Such quick switching operations are thus avoided according to this aspect of the present invention.

Preferably, said one or more further antennas are adapted for transmitting, during times when the first transmission antenna is transmitting data blocks mapped onto data frames in the SISO scheme, the same data as the first antenna. This contributes to avoid undesired power variation among said one or more further antennas.

Also in such a transmission apparatus the further transmission antennas may be adapted to use differently polarized subcarriers than the first antenna. Further, in an embodiment the first and second transmission antennas (in case of two transmission antennas may be inclined by +45° and −45°, respectively, to a vertical axis resulting in good reception results by a common rooftop antenna.

BRIEF DESCRIPTION OF DRAWINGS

These and other aspects of the present invention will be apparent from and explained in more detail below with reference to the embodiments described hereinafter. In the following drawings

DESCRIPTION OF PREFERRED EMBODIMENTS

Figure 1:
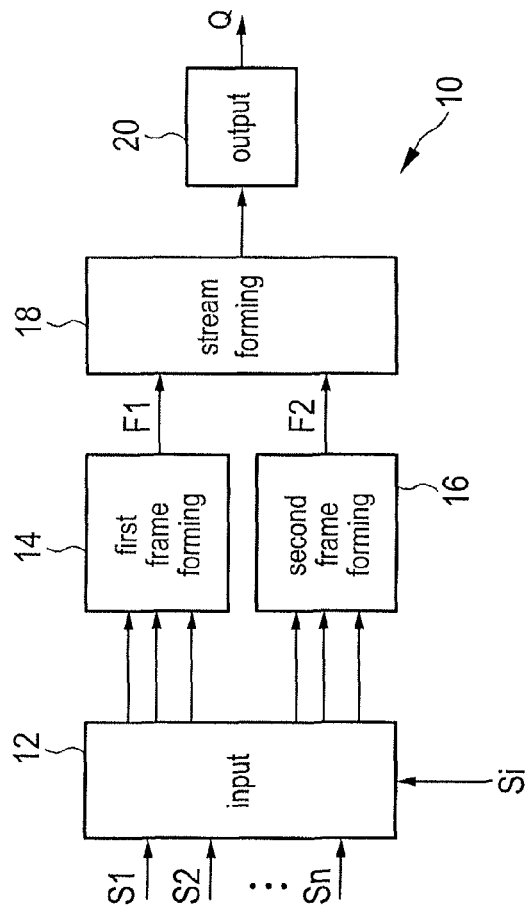
FIG. 1 shows a first embodiment of a mapping apparatus according to the present invention.

FIG. 1 shows a block diagram of a mapping apparatus 10 according to the present invention. The apparatus 10 is provided for mapping payload data of mapping input data streams S1, S2, . . . , Sn onto a mapping output data stream Q having a (predetermined) channel bandwidth for transmission in a multi-carrier broadcast system. The mapping input data streams S1, S2, . . . , Sn are each subdivided into data blocks (also called bursts, sub-slices or data patterns) carrying payload data, which are pre-processed by other elements of a transmitter as will be explained below. A data input 12 receives said mapping input data streams S1, S2, . . . , Sn. Further, signalling data Si are received by said data input 12.

For frame forming and mapping the data blocks of received mapping input data streams onto frames two different frame forming units 14 and 16 are provided. A first frame forming unit 14 maps the data blocks of a first group of mapping input data streams, e.g. of mapping input data streams S1, S2 and S3, onto first frames F1 having a first frame structure also covering the total channel bandwidth. In addition, the signalling data Si are incorporated into said first frames F1 for signalling the required data to receivers of a first type that are adapted for receiving and processing said first frames F1.

A second group of mapping input data streams, e.g. the mapping input data streams S1, S4 and S5, are provided to the second frame forming unit 16 which maps them onto second frames F2 having a second frame structure covering the total channel bandwidth. The second frame structure is generally different from the first frame structure, and the second frames F2 are generally provided for reception and processing by different types of receivers. Also the second frame forming unit 16 uses signalling data Si for incorporation into the second frames F2 for use by the receivers, wherein the signalling data incorporated into the first frames F1 are generally different from the signalling data incorporated into the second frames F2, which shall, however, not exclude that the same structure of the signalling data and the signalling concept is used in both types of frames. Those frames F1, F2, in particular both sequences of first frames F1 and second frames F2 generated by the first frame forming unit 14 and the second frame forming unit 16, are then further processed by a stream forming unit 18 which alternately arranges one or more first frames F1 and one or more second frames F2, thus forming the mapping output data stream Q. Said mapping output data stream is then outputted by a data output 20 for further processing and/or transmission.

Figure 2:
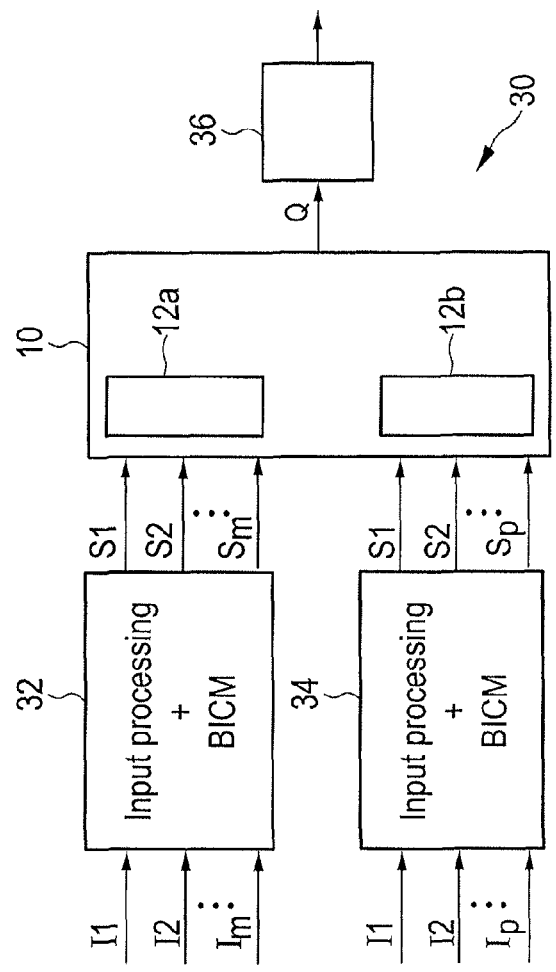
FIG. 2 shows a first embodiment of a transmitter according to the present invention.

FIG. 2 shows a block diagram of a transmitter 30 according to the present invention, in which a mapping apparatus 10 as explained above is used. FIG. 2 particularly shows an exemplary embodiment of a transmitter 30 which, however, shall not be understood as limiting the application of the present invention.

The transmitter 30 comprises a first pre-processing unit 32 and a second pre-processing unit 34. The first pre-processing unit 32 receives transmitter input data streams I1, I2, . . . , Im and pre-processes them to obtain the mapping input data streams S1, S2, . . . , Sm. The transmitter input data streams I1, I2, . . . , Im may, for instance, be one or more (e.g. MPEG-2) transport stream(s) and/or one or more generic stream(s), and the data may be carried therein in individual Physical Layer Pipes PLPs.

The first pre-processing unit 32 is, in this exemplary embodiment, adapted in accordance with the DVB-T2 standard and comprises elements for input processing and Bit Interleaved Coding & Modulation (BICM). Such means may include means for CRC encoding, header insertion, padding insertion, scrambling, FEC encoding (LDPC/BCH) bit interleaving, bit to cell demultiplexing, cell to constellation mapping, constellation rotation and cyclic Q-delaying, cell interleaving and time interleaving, just to name a few elements that are generally provided as explained in detail in the DVB-T2 standard. Those elements are commonly known and described in detail in the DVB-T2 standard so that no further explanations are provided here.

The second pre-processing unit 34 is, in this exemplary embodiment, adapted for pre-processing the received transmitter input data streams I1, I2, . . . , Ip, which may be different from, partly equal or completely equal to the transmitter input data streams I1, I2, . . . , Im (which depends mainly on the kinds of services provided to the different types of receivers). In an embodiment, said pre-processing may be performed in the same or in a similar way as described in the DVB-T2 standard (or, alternatively, in the DVB-C2 standard), possibly with additional adaptions according to the needs of the desired application. Hence, said pre-processing unit 34 comprises, in this exemplary embodiment, means for input processing and Bit Interleaved Coding & Modulation (BICM). Said means may particularly comprise means for input stream synchronization, null packet detection, CRC-encoding, header insertion, scrambling, FEC (BCH/LDPC) encoding, bit interleaving, bit to cell demultiplexing, cell to constellation mapping and frame header insertion. Again, these means are generally known and described in detail in the DVB-T2 standard and the DVB-C2 standard so that no further explanations are provided here.

It shall be noted that any time reference is made to any standard herein, the various explanations provided in the cited standard, particularly in the DVB-T2 standard and the DVB-C2 standard, to which reference has been made above and will be made below, are herein incorporated by reference herewith.

The output of the first and second pre-processing units 32, 34 are then provided as mapping input data streams S1, S2, . . . , Sm and S1, S2, . . . , Sp to the mapping apparatus 10, which is generally adapted as explained above with respect to FIG. 1. In the particular embodiment shown in FIG. 2, however, the data input 12 is split-up into two data input subunits 12a, 12b for respectively receiving the mapping input data streams from the first pre-processing unit 32 and the second pre-processing unit 34. The mapping output data stream Q is then provided to a transmitter unit 36 for transmission, in particular by a broadcast, after further processing, where necessary.

Figure 3:
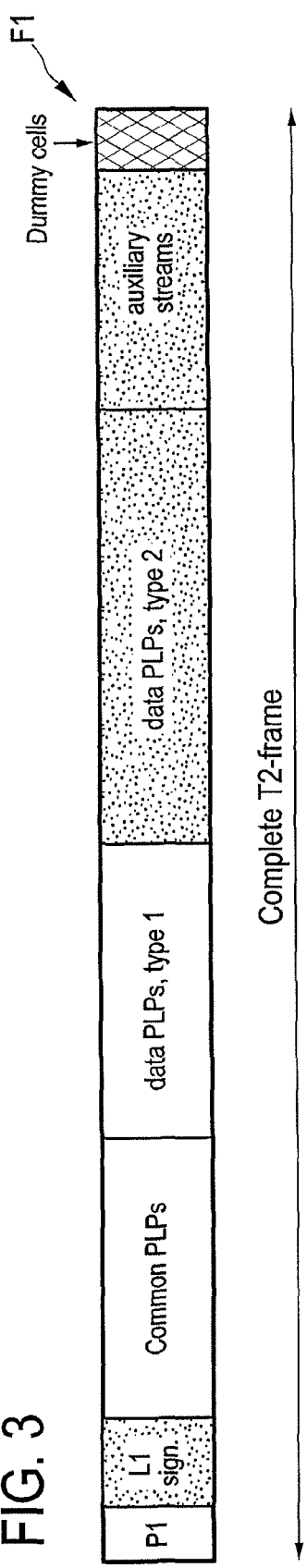
FIG. 3 shows the structure of a complete T2-frame.
Figure 4:
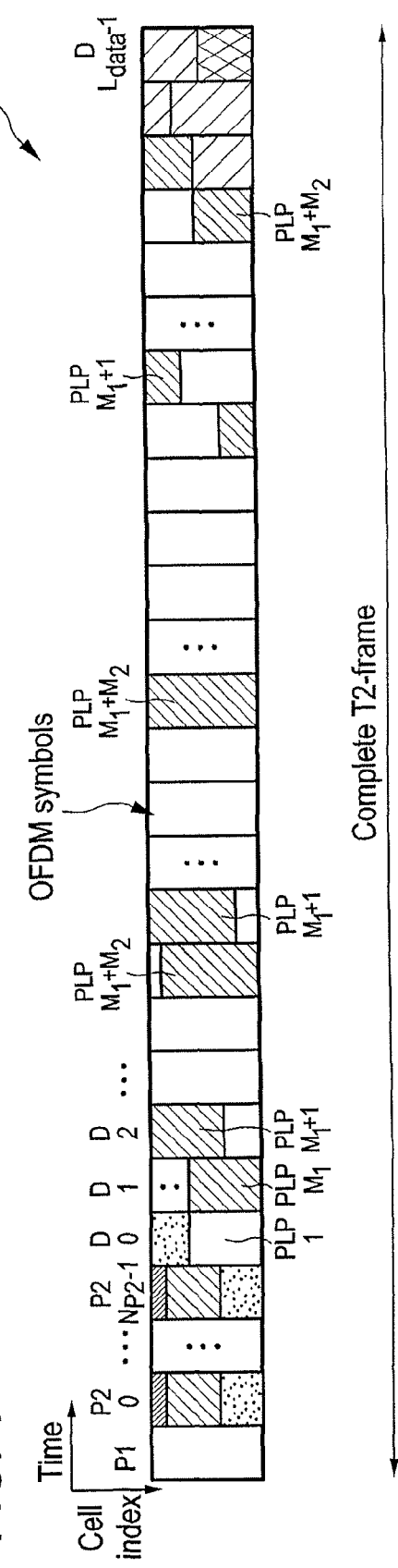
FIG. 4 shows more details of the structure of a complete T2-frame.
Figure 5:
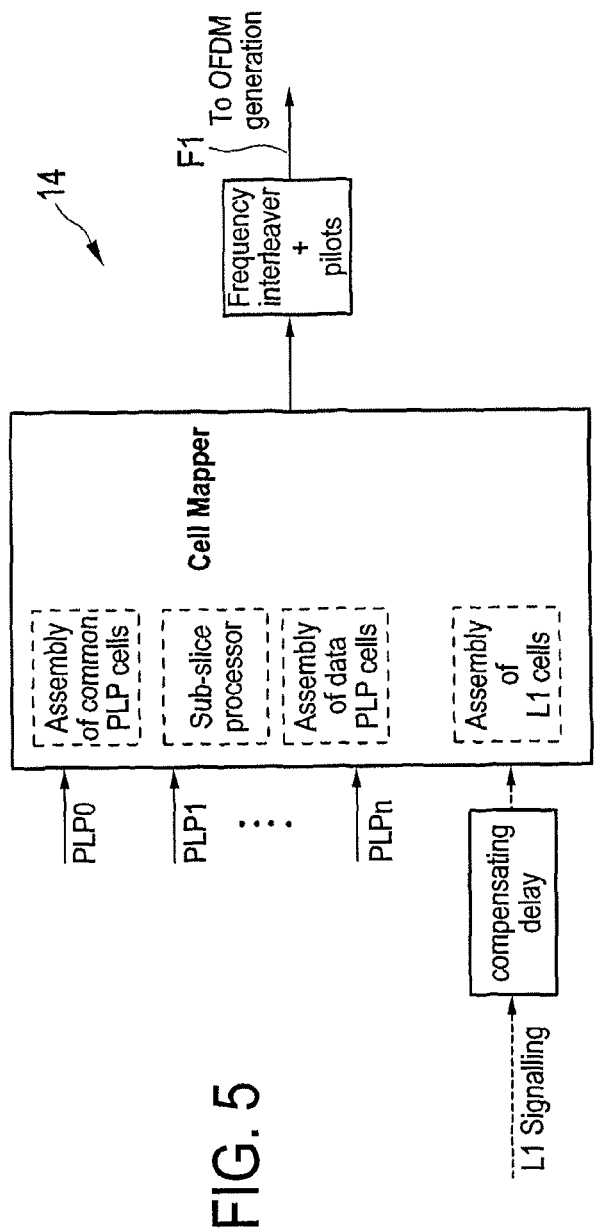
FIG. 5 shows an embodiment of a frame forming unit in accordance with the DVB-T2 standard.

Next, frame forming in the first frame forming unit 14 shall be explained. If applied in transmitter 30 as depicted in FIG. 2, the first frame forming unit 14 is also adapted to process the received mapping input data streams S1, S2, . . . , Sm in accordance with the DVB-T2 standard. Hence, generally the first frame forming unit 14 comprises a cell mapper, which assembles modulated cells of PLPs and signalling information into arrays corresponding to OFDM symbols. Hence, frames are formed (generally called "T2-frames") as schematically depicted in FIG. 3 and in more detail in FIG. 4. Such a T2-frame comprises one P1 preamble symbol, followed by one or more P2 preamble symbols, followed by a configurable number of data symbols. Thereby, PLPs are classified into three types, in particular common PLP, data PLP type 1 and data PLP type 2. An exemplary embodiment of the first frame forming unit 14 is depicted in FIG. 5. More details about the T2-frame structure and the mapping of PLPs (generally referred to herein as mapping input data streams) can be found in the DVB-T2 standard and shall thus not be provided here.

Figure 6A:
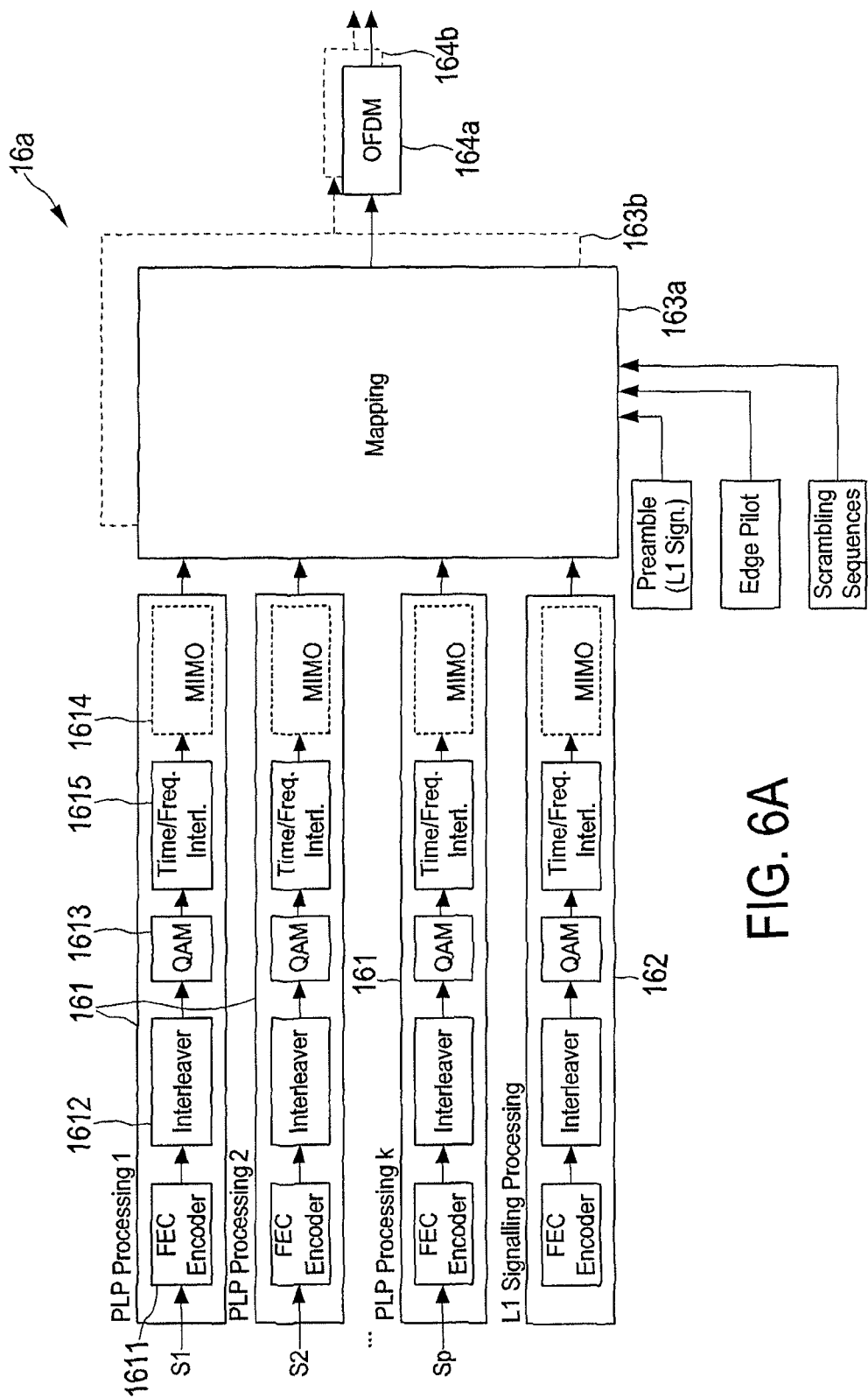
FIG. 6 shows block diagrams of various embodiments of a frame forming unit in accordance with the present invention.

Block diagrams of various embodiments of the second frame forming unit 16 are schematically depicted in FIGS. 6A to 6D. A first embodiment of the second frame forming unit 16a is shown in FIG. 6A. For each of the p mapping input data streams (PLPs) S1, S2, . . . , Sp received by the second frame forming unit 16a a separate PLP processing unit 161 is provided, each generally comprising a FEC-encoder 1611, an interleaver 1612, a QAM-modulator 1613 (optionally with rotated constellations), and a MIMO mode selection unit 1614. Further, a signalling processing unit 162 is provided for processing of signalling information, which signalling processing unit 162 generally comprises the same elements as the PLP processing units 161. The processed PLPs and the processed signalling data are then provided to one or more mapping units 163a, 163b, whose task is the mapping of the time interleaving blocks of the several PLPs onto the frame structure. Therefore, each mapping unit 163a, 163b divides the time interleaving blocks into bursts (generally called data blocks). These bursts are then mapped onto the OFDM symbols (generally called data symbols) in the different data slices (generally called data segments). The length of each burst is preferably a multiple of the number of useful OFDM subcarriers per data slice.

The data slices, more precisely the bursts of the data slices, are then subjected to data slice processing including frequency interleaving and a pilot insertion, so that the complete OFDM symbol for the corresponding data slice is generated. Preferably, a pairwise frequency interleaving is performed and all pilots are added, i.e. the scattered and continual pilots for channel estimation and synchronization. Preferably, the bandwidth of the data slices is a multiple of 24, which ensures a constant number of payload OFDM subcarriers (generally per four (temporally) consecutive segments). Generally, only after some (e.g. four) data symbols the pilot pattern is repeated, but not after each data symbol. This allows channel estimation in frequency and time direction with reduced overhead.

The output from the data slice processing, the preamble, edge pilots and scrambling sequences, are then further processed. In particular, the different data slices and the preamble are assembled to the complete framing structure to be used for the second frames F2. Furthermore, the edge pilot next to the highest OFDM subcarrier is added. Additionally, scrambling of the data is preferably performed. Finally, one or more OFDM modulators 164a, 164b may be provided for OFDM modulation in each processing path.

The MIMO mode selection unit 1614 provides the ability to select for each mapping input data stream S1, S2, . . . , Sp individually the MIMO mode to be used for the data blocks of the respective mapping input data stream S1, S2, . . . , Sp. Hence, it can be determined for each mapping input data stream S1, S2, . . . , Sp by which antenna configuration the data blocks of the mapping input data stream S1, S2, . . . , Sp shall be transmitted. For instance, it may be determined that for the data blocks of the first mapping input data stream S1 the SISO scheme is selected, that for the data blocks of the second mapping input data stream S2 the MISO scheme is selected, and that for the data blocks of the third mapping input data stream S3 a MIMO scheme with spatial multiplexing is selected. For this purpose, more than one mapping unit 163a, 163b is provided, which allows splitting the signal outputted from a PLP processing unit 161 onto various paths for individual processing, which various paths are then provided to different transmission antennas. For instance, two transmission antennas (and, hence, two mapping units 163a, 163b and two OFDM modulators 164a, 164b) may be provided, e.g. to allow the data to be split between the two transmission antennas on the same frequency in such a way that the two transmission antennas will not much interfere with each other. In particular, e.g. in MISO scheme the pre-processing of the signals is such that the receiver can separate the signals, and in MIMO scheme both the receiver and the transmitter may have multiple antennas for reception and transmission, respectively, which numbers can be equal or different. This enables that even interfering signals can be reconstructed. More details as well as further examples will be explained below.

Figure 6B:
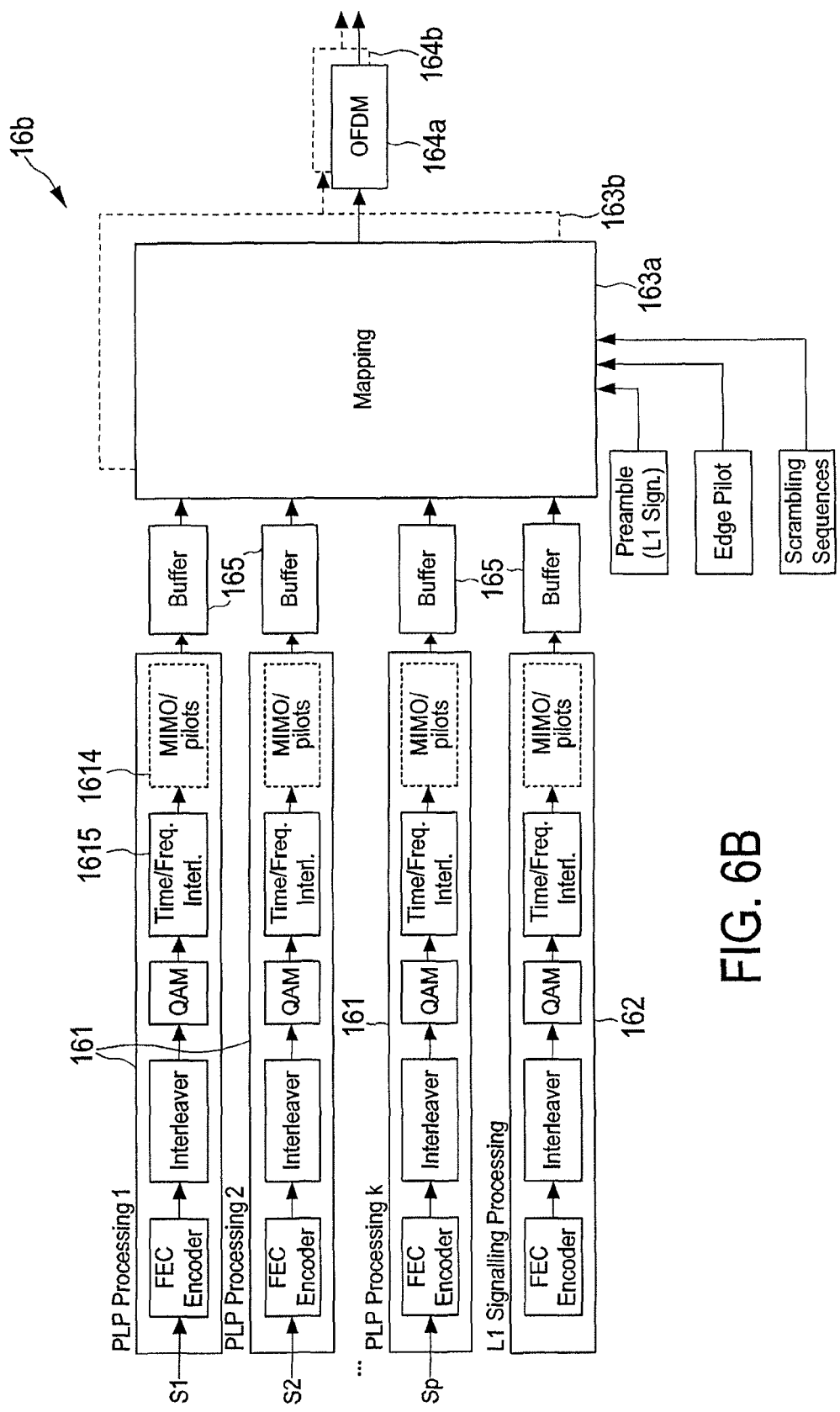

In another embodiment of the second frame forming unit 16b illustrated in FIG. 6B for each mapping input data stream S1, S2, . . . , Sp a separate buffer 165 is provided. These buffers 165 are filled with the data blocks of the respective mapping input data stream. The mapping unit(s) 163a, 163b accesses the buffers 165, and when sufficient data blocks are stored in a buffer, e.g. for completely filling a data symbol of a data segment, these data blocks are taken from the buffer and provided to the mapping unit(s) 163a, 163b for further processing and mapping onto said data symbol.

Further, according to this embodiment, a time and frequency interleaver 1615 (e.g. implemented as separate units for time interleaving and frequency interleaving) is provided in each PLP processing unit 161, and the MIMO selection unit 1614 is further adapted for selecting the pilot pattern individually for each mapping input data stream S1, S2, . . . , Sp. In this way, preferably the pilot density in time and/or frequency direction can be selected, in particular depending on the number of transmission antennas, to select the robustness of the data transmission with respect to reliable channel estimation at the receiver.

Figure 6C:
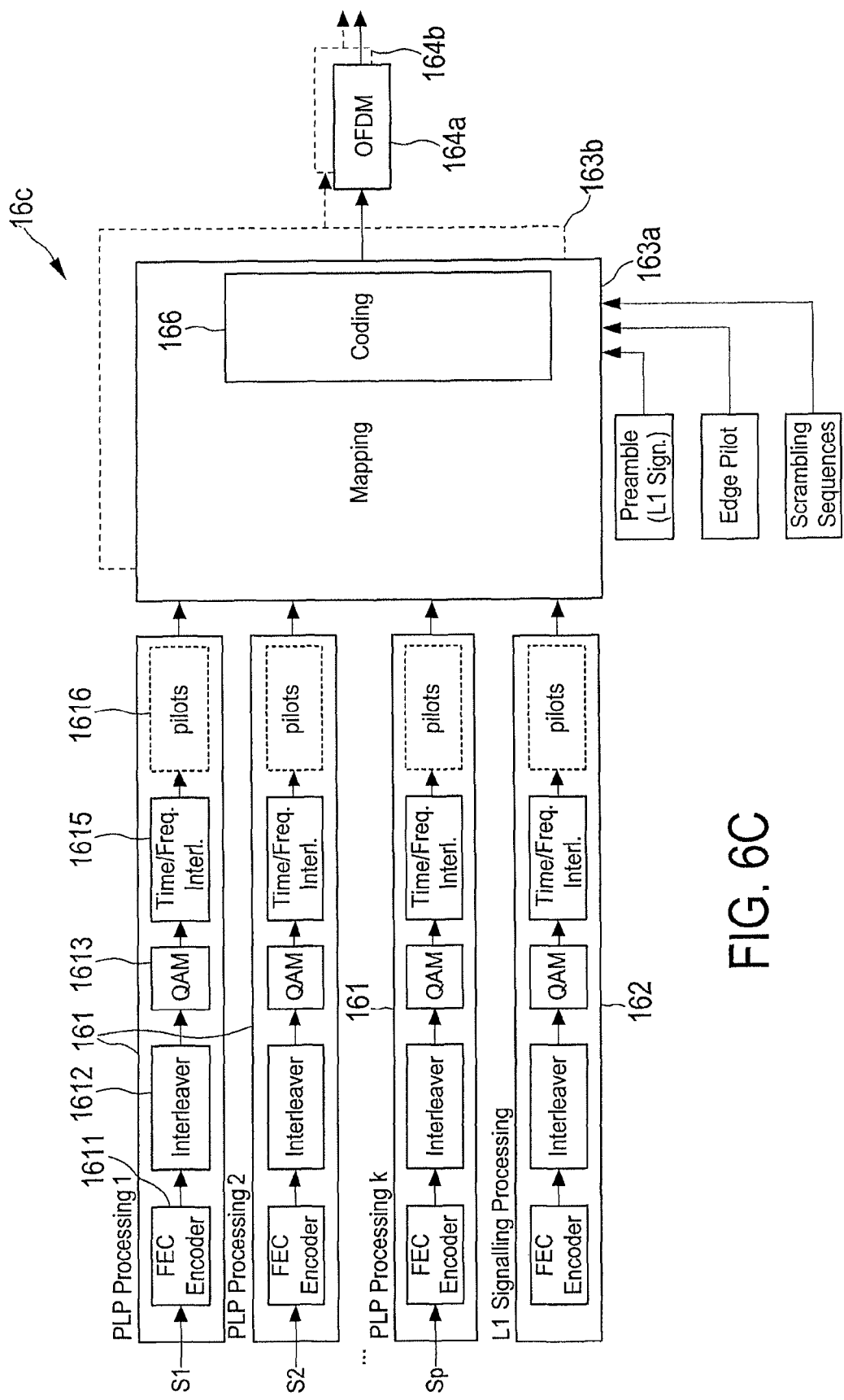

In still another embodiment of the second frame forming unit 16c illustrated in FIG. 6C, which is quite similar to the embodiment of the second frame forming unit 16b illustrated in FIG. 6B, a coding unit 166 is provided in at least one (preferably all) mapping unit(s) 163a, 163b. This coding unit 166 enables to encode the data blocks (e.g. all data blocks or selected data blocks), as is, for instance, regularly performed in MISO processing (for instance according to the DVB-T2 standard). In an example an Alamouti code can be applied by the coding unit 166 on the data blocks outputted from the PLP processing unit 161 to produce two similar sets of data blocks at the output, each of which being directed to a separate transmission antenna.

Further, in this embodiment, for each mapping input data stream S1, S2, . . . , Sp a separate pilot pattern selection unit 1616 is provided for selecting the pilot pattern individually for each mapping input data stream S1, S2, . . . , Sp.

Figure 6D:
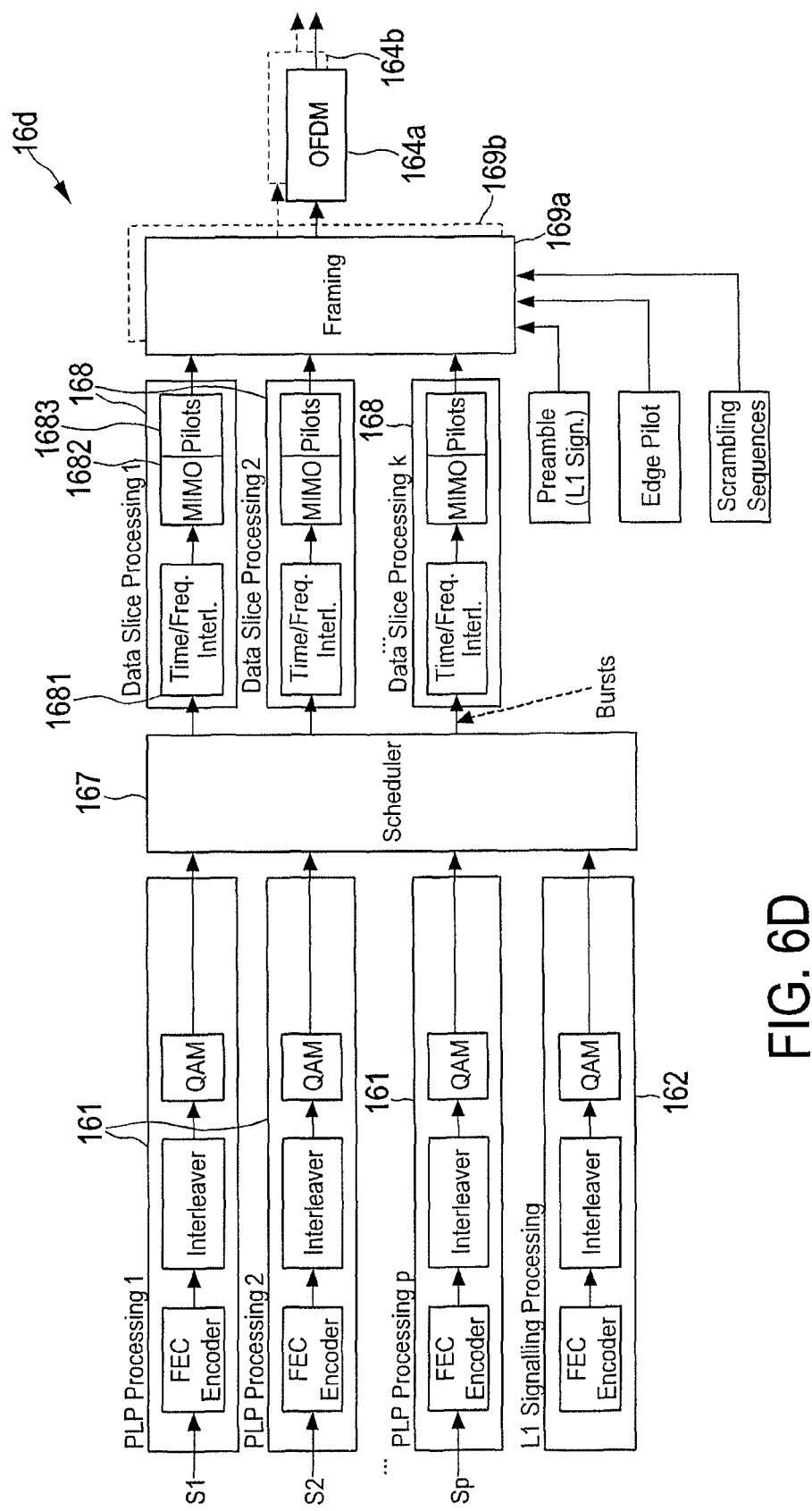

FIG. 6D shows still another embodiment of the second frame forming unit 16d. According to this embodiment the MIMO selection is not performed per mapping input data stream, but per data segment (also called data slice). The output of the PLP processing units 161 is provided to a scheduler 167, whose task is the mapping of the time interleaving blocks of the several PLPs onto the frame structure. Therefore, the scheduler 167 divides the time interleaving blocks into bursts. These bursts are then mapped onto the OFDM symbols in the different data slices. The length of each burst is preferably a multiple of the number of useful OFDM subcarriers per data slice. The data slices, more precisely the bursts of the data slices, are then provided to data slice processing units 168, each comprising a frequency interleaver 1681 a MIMO mode selection unit 1682 and a pilot pattern selection unit 1683. The data slice processing uses the data received from the scheduler 167, creates the complete OFDM symbol for the corresponding data slice, and performs a pair-wise frequency interleaving. Further, in the MIMO mode selection unit 1682 the MIMO mode can be selected for all data blocks of the respective data stream, and in the pilot pattern selection unit 1683 the pilot pattern can be selected for all data blocks of the data stream. Preferably, the scheduler 167 is adapted such that it schedules only data blocks onto a particular data segment that shall be transmitted with the same MIMO mode (and/or pilot pattern) of this particular data segment.

The output from the data slice processing units 168, the preamble, edge pilots and scrambling sequences, are then provided to one or more framing units 169, which assembles the different data slices and the preamble to the complete framing structure to be used for the second frames F2. Furthermore, it adds the edge pilot next to the highest OFDM subcarrier. Additionally, it performs the scrambling of the data. Finally, one or more OFDM modulators 164a, 164b are provided for OFDM modulation.

The embodiments illustrated in FIGS. 6A to 6D show that according to the present invention it is possible to select the MIMO mode and/or the pilot pattern individually for each mapping input data stream and/or each data segment. It shall be understood that all possible combinations of respective means for such a selection are possible.

According to embodiments of the present invention the selection of the MIMO mode and/or the pilot pattern and the mapping of the data blocks onto data symbols of the frame is performed such that the MIMO mode and/or the pilot pattern changes from data symbol to data symbol, from a group of data symbols to a next group of data symbols (in time direction), from frame to frame, from a group of frames to a next group of frames, from data segment to data segment and/or from a group of data segments to a next group of data segments.

Figure 7:
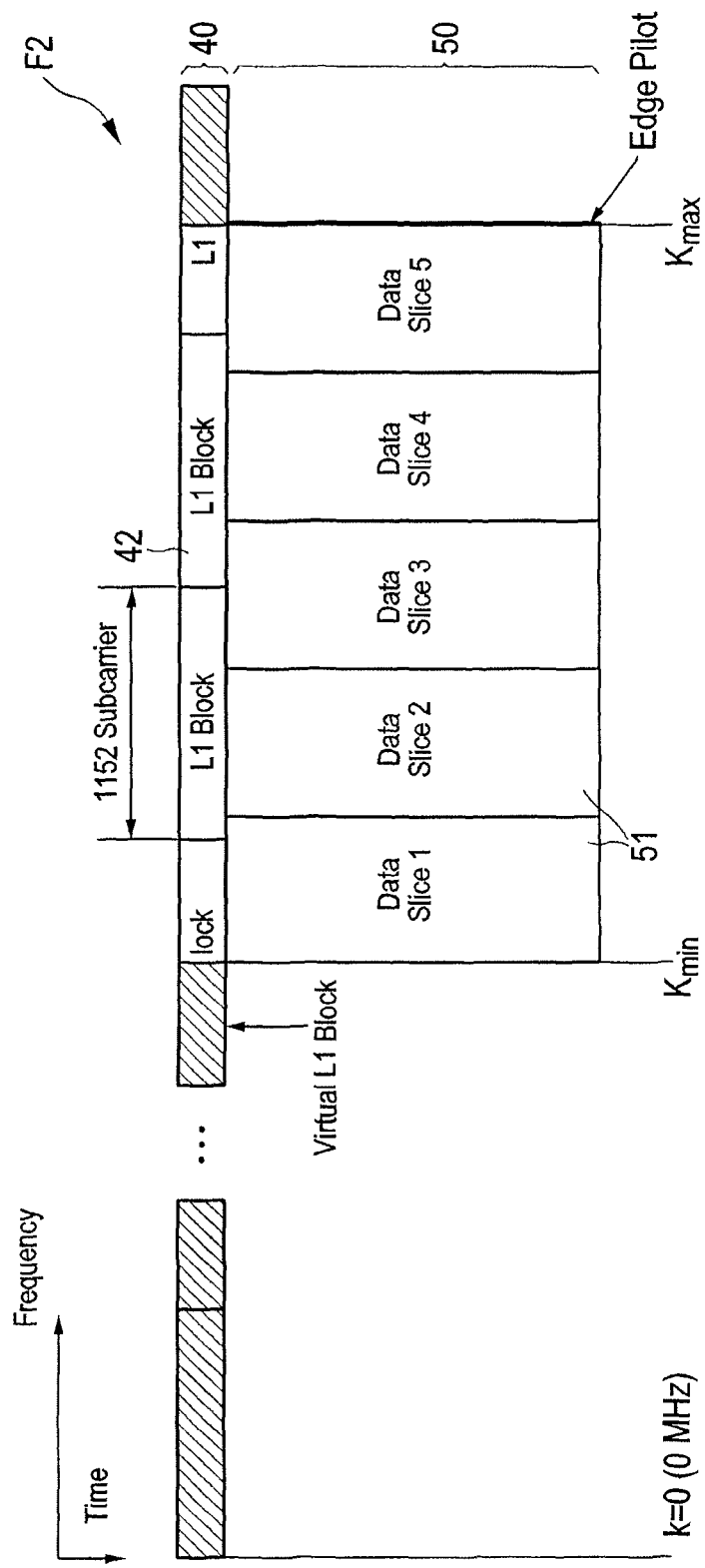
FIG. 7 shows a first embodiment of the frame structure of a second frame.
Figure 8:
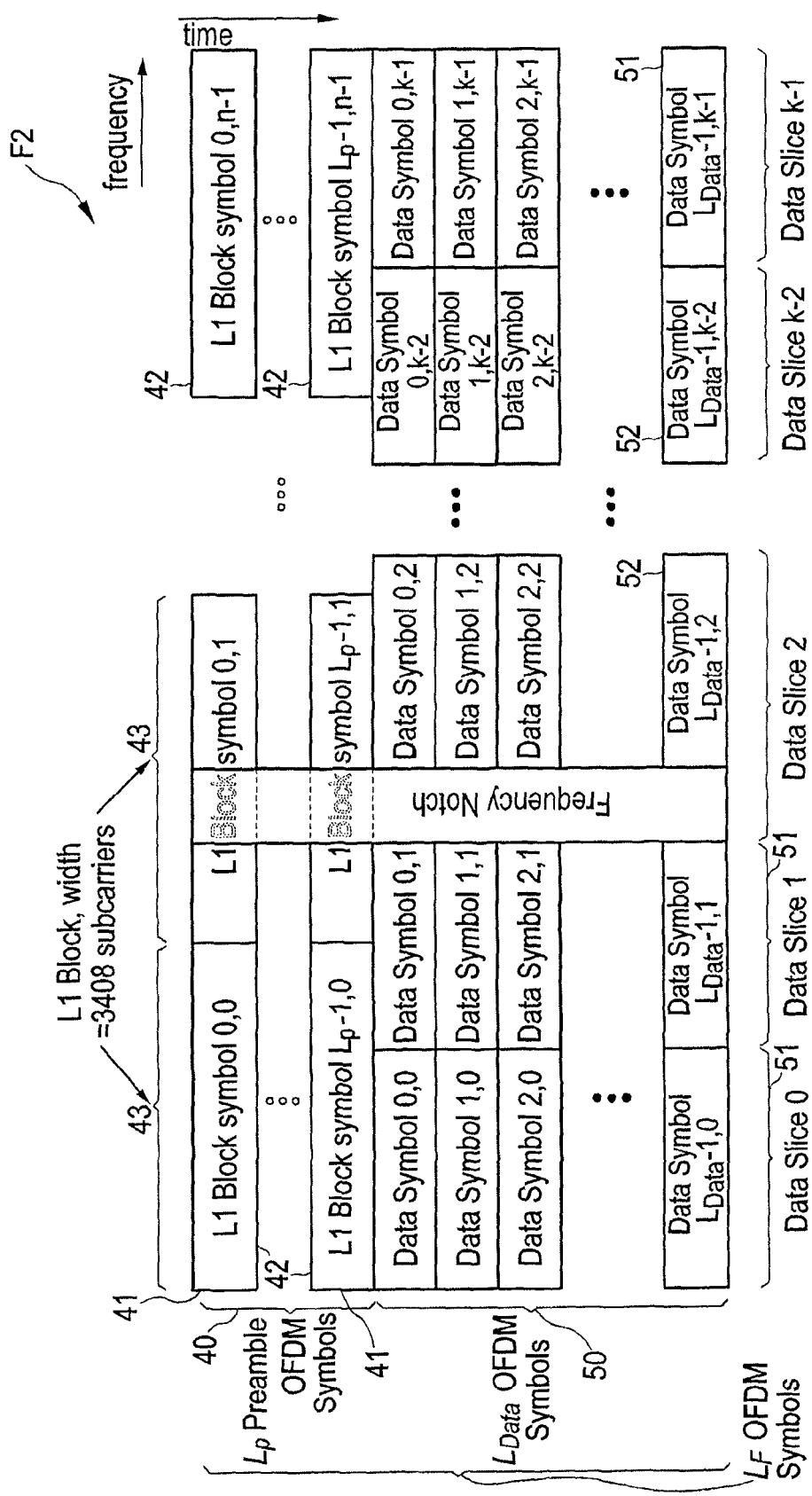
FIG. 8 shows more details of the first embodiment of the frame structure of a second frame.

The frame structure of the second frames F2 as generated by such embodiments of the second frame forming unit 16 is schematically depicted in FIG. 7 and in more detail in FIG. 8.

These figures show the frame structure of the second frame F2 as defined in the DVB-C2 standard. This frame structure uses the concept of absolute OFDM, according to which all frequencies are aligned to the absolute frequency 0 MHz, which is identical to the OFDM subcarrier index k=0. The OFDM subcarrier frequencies of the following OFDM subcarriers are given by $f=(1/T_u) \cdot k$, where $T_u$ is the duration of the useful OFDM symbol part. Hence, the start and stop frequencies of the signal can also be given in OFDM subcarrier indices instead of a middle frequency of the signal. The start and the stop frequency are given by $K_{min}$ and $K_{max}$, respectively. It shall be noted, however, that the used of absolute OFDM is not essential for the present invention.

It is important to note that the concept of absolute OFDM can be used, but must not necessarily be used. For instance, in an embodiment, both the first and second frames F1, F2 are aligned to a frequency raster and use the concept of absolute OFDM, whereas in another embodiment both the first and second frames F1, F2 are not aligned to a frequency raster and do not use the concept of absolute OFDM. The second frames F2, however, make use of the concept of segmented OFDM as illustrated in FIGS. 7 and 8, while the first frames F1 generally do not make use of this concept (but could also use it in certain embodiments).

The frame F2 has a preamble portion 40 and a payload portion 50. The signalling data are mapped on the preamble portion 40, which comprises (in time direction) one or more preamble symbols 41 (e.g. $L_p$ preamble symbols 41 as shown in FIG. 8). Each preamble symbol 41 carries (in frequency direction) one or more preamble signalling blocks 42 (also called L1 block symbol) which carry the signalling data, i.e. the same signalling data are included therein and are thus periodically repeated, although the signalling blocks 42 are not completely identical, e.g. due to the use of different pilots therein.

The payload portion 50 is segmented into data segments 51 (also called data slices, e.g. 5 data slices as shown in FIG. 7 or k data slices as shown in FIG. 8. Each data segment 51 carriers a number of data symbols 52, e.g. $L_{Data}$ data symbols as shown in FIG. 8). Onto these data symbols the data blocks of the various mapping input data streams S1, S2, . . . , Sp are mapped. Various embodiments of said mapping will be explained in more detail below.

As can also be seen from FIGS. 7 and 8 the preamble segments 43, into which the preamble portion is segmented in frequency direction, all have an equal bandwidth which is equal to or larger than the bandwidth of the data segments 51. This shall be understood as an example only, the bandwidth of the preamble segments 43 can also be smaller than the bandwidth of the data segments 51, e.g. if less signalling information must be put into the preamble segments. Generally, the bandwidth of both the preamble segments and the data segments is smaller than or equal to the receiver bandwidth. There is also no necessity of any alignment of the beginning of the preamble segments 43 with the beginning of the data segments in a frequency domain. Hence, a transmitter may also only transmit two partial preamble signalling blocks 42, for which the receiver can create a complete preamble signalling block if it knows where these preamble signalling blocks begin.

Figure 9:
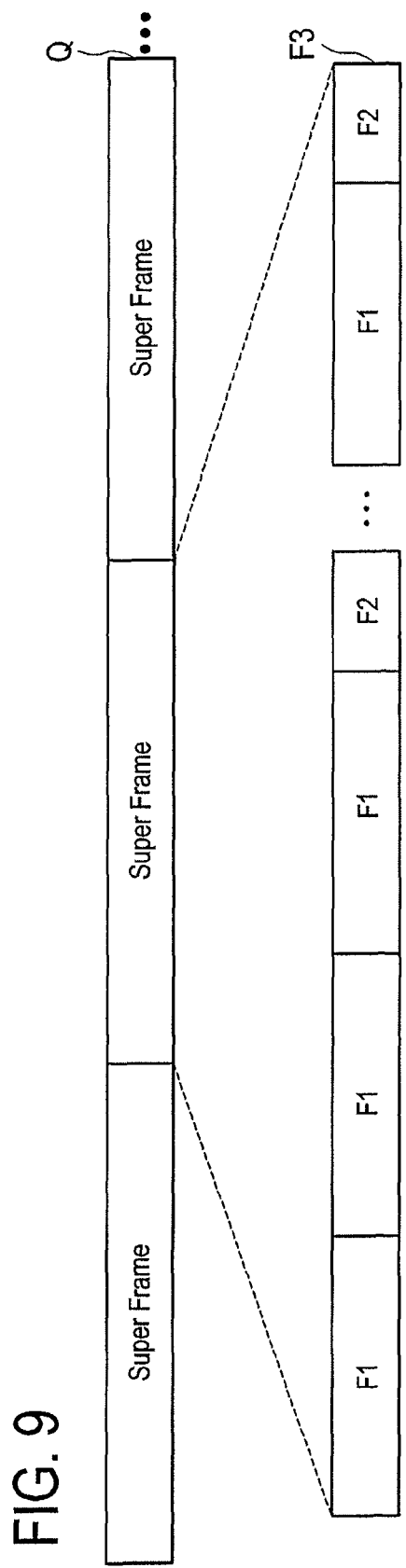
FIG. 9 shows the structure of a superframe.

FIG. 9 shows a superframe structure that is formed by the stream forming unit 18 from the first and second frames, F1, F2. In particular, by alternately arranging one or more first frames F1 and one or more second frames F2 said superframe structure is formed. The sequence of said superframes F3 then represents the mapping output data stream Q outputted by the stream forming unit 18 via the data output 20.

Adopting the superframe structure as defined in the DVB-T2 standard the first frames F1 represent the T2-frames, and the second frames F2 are placed into the parts reserved for the FEF frames. For instance, in a practical embodiment the F1 frames (formed in accordance with the DVB-T2 standard) are provided for reception by stationary receivers (e.g. in accordance with the DVB-T2 standard), and the second frames F2 (e.g. formed in accordance with a DVB-C2 standard or according to any new rules) are provided for reception by mobile receivers (e.g. according to the upcoming DVB-NGH standard).

Next, embodiments for mapping the data blocks of a mapping input data stream onto the second frame F2 shall be explained. In a first embodiment, which is generally in consistence with the frame structure defined in the DVB-C2 standard, the data blocks of a particular mapping input data stream are mapped onto a single data segment or two or more (neighbouring or not neighbouring) data segments. For instance, referring to FIG. 7, all data blocks of a particular mapping input data stream are thus mapped on (for instance) data slice 1 or data slices 1 and 2. This has the advantage that the receiver tuning position can be kept fixed once the receiver has tuned to the data segment it wants to receive.

Figure 10:
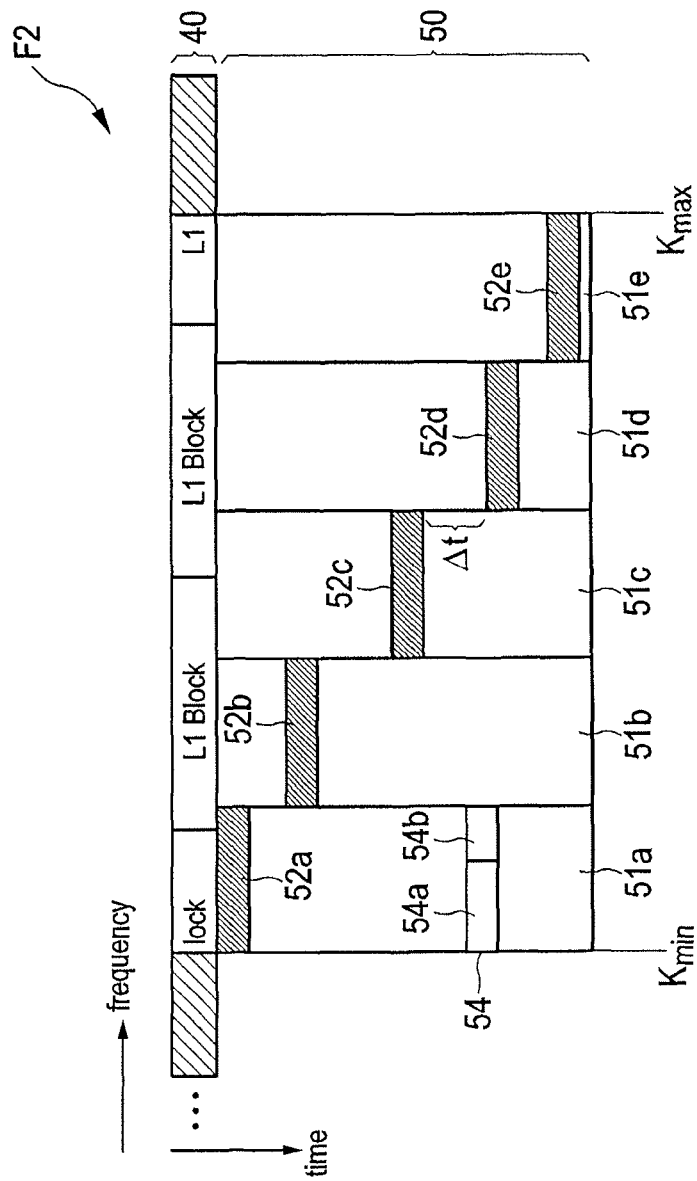
FIG. 10 shows a second embodiment of the frame structure of the second frame.

According to another embodiment as schematically depicted in FIG. 10, the data blocks of a particular mapping input data stream are spread in time and frequency over various data symbols and various data segments. For instance, the data symbols 52a-52e indicated in FIG. 10 carry data blocks of a particular mapping input data stream and are spread in frequency over the five data segments 51a-51e and in addition in time so that at each time only one data segment carries a data symbol containing data of said particular mapping input data stream. This provides the advantage of an increased robustness due to increased time and frequency diversity. Of course, the tuner of the receiver has to wake up slightly earlier for channel estimation if the data blocks of the data stream it wants to receive are spread over various data segments. If time-slicing (as in DVB-H or DVB-T2) is applied, this problem always occurs. However, the retuning to new frequencies should only induce a small overhead in processing and power consumption (compared to always-on and full-bandwidth tuning).

In a single data segment data blocks belonging to various mapping input data streams can thus be transmitted according to this embodiment of the present invention. These data blocks may be pre-processed in the same manner, but also in different manner (e.g. with different MODCODs) to provide different levels of robustness to the different mapping input data streams. For instance, as proposed according to an embodiment of the present invention, different MIMO modes and/or different pilot patterns may be applied to the data blocks of the individual mapping input data streams. Further, in an alternative or in addition, different MIMO modes and/or different pilot patterns may be applied to the data blocks mapped onto the individual data segments.

While it is generally possible, that at a particular time also more than one data symbol (i.e. from different data segments) carry a data block of the same mapping input data stream, the embodiment shown in FIG. 10 is preferred since in this case receivers with smaller bandwidths can be used.

The mapping structure of the data blocks of a particular mapping input data stream can be kept regular, as shown in FIG. 10, but is preferably selected irregular, i.e. the data blocks are preferably spread irregularly over the data symbols of the second frame F2 and not according to any regular (e.g. periodic) pattern in time and/or frequency. This also contributes to an increased robustness, particularly against regular disturbances. This requires an increased amount of signalling information needed for the receiver to find the data symbols of the mapping input data stream to be received. For this problem, however, several solutions exist as will be explained below.

Further, time gaps are preferably introduced between data blocks of a mapping input data stream, during which no data symbol of any data segment carries a data block of said particular mapping input data stream. For instance, as shown in FIG. 10, there is a time gap $\Delta t$ between the data symbols 52c and 52d, during which other data symbols are provided, which, however, do not carry data blocks of the mapping input data stream whose data blocks are carried in the data symbols 52a-52e. This provides the advantage that a receiver might fall into sleep mode during this time gap $\Delta t$ to save power. Generally, said time gap $\Delta t$ is preferably large enough to allow the receiver to fall into sleep mode, wake up timely and re-tune, but it might differ from data symbol to data symbol. It is at least large enough to allow the receiver to re-tune.

The bandwidth of the data segments 51 may be kept equal and predetermined, as shown in FIG. 10. However, in other embodiments the bandwidth of the individual data segments 51 may be variable or may be determined as needed. For instance, if a mapping input data stream has only a low amount of data compared to other mapping input data streams a data segment might be used having a smaller bandwidth for said mapping input data stream.

According to still another embodiment of the mapping, the mapping of data blocks of a particular mapping input data stream may be kept constant within a particular frame F2, but may be changed from frame F2 to the next frame F2, i.e. a frequency hopping may be provided from frame to frame (or from a first group of frames to the next group of frames), but not within frames.

According to still another embodiment a data block can be split up in frequency direction for use by data symbols from different mapping input data streams. This is illustrated in FIG. 10 by use of data symbol 54. In this example, the data symbol is split up into a first partial data symbol 54a, onto which a first (possibly partial) data block from a first mapping input data stream is mapped, and a second partial data symbol 54b, onto which a second (possibly partial) data block from a second mapping input data stream is mapped. This, for instance, makes sense if the total data symbol 54 cannot be filled by a complete data block from the first mapping input data stream (e.g. because not enough data are currently available).

Next, various embodiments for signalling the required signalling information about the mapping of the data blocks onto the data segments and the data symbols of the second frames shall be explained. In a first embodiment only the preamble signalling blocks comprise all the signalling information required for a transmitter to receive and demap all the intended data blocks. This embodiment would, however, require that the preamble signalling blocks are quite large (in frequency and/or time), since the preamble has typically a high pilot density for robust channel estimation and synchronization leading to the result that less signalling capacity is available in the preamble. Hence, putting a lot of signalling information into the preamble signalling blocks would further increase their size, which is generally not preferred.

Figure 11:
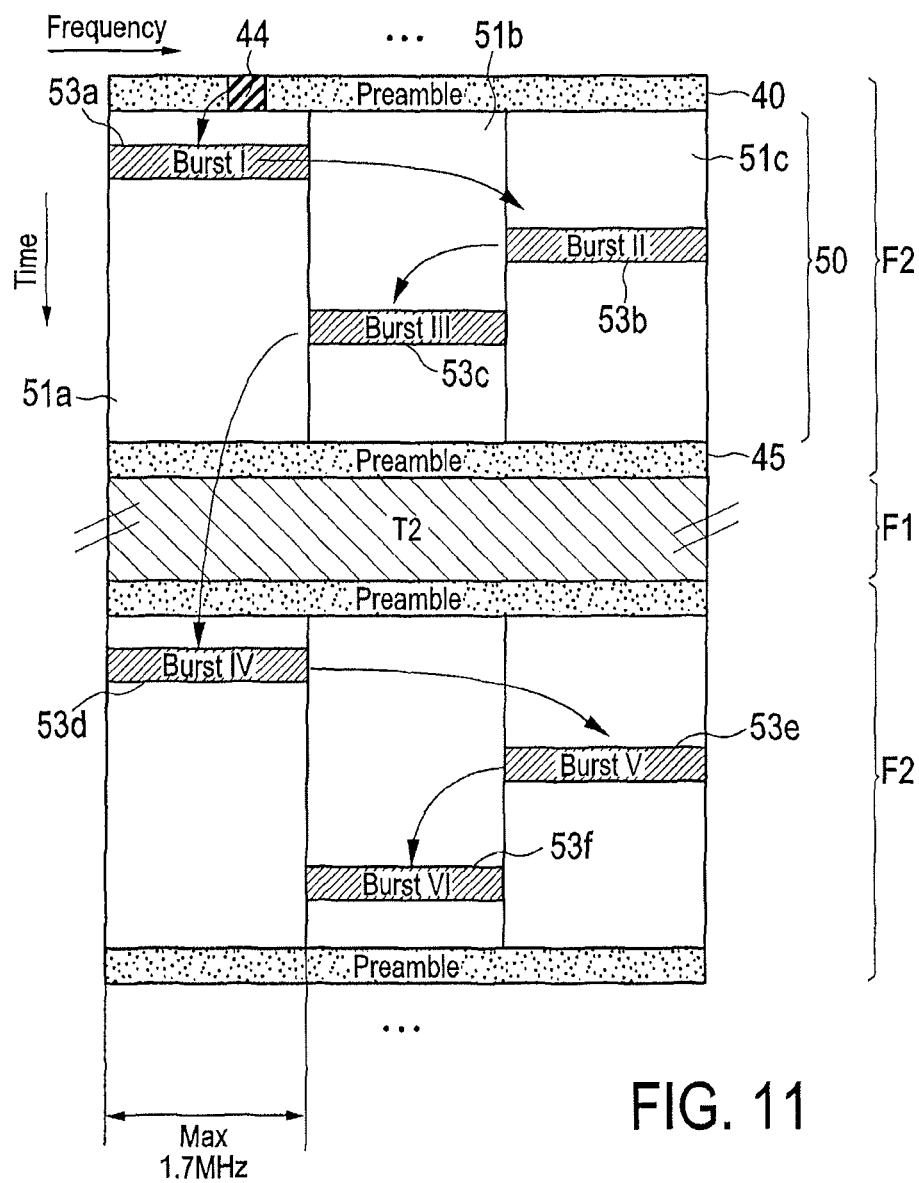
FIG. 11 shows a first embodiment for mapping signalling information into the second frames.

In another embodiment, illustrated in FIG. 11, where a second frame F2 is shown having a preamble portion 40 and a another preamble portion 45 (often also referred to as "postamble"; generally contains the same information as the preamble portion 40, but indicating that it is another preamble portion, i.e. a "postamble portion"), the signalling principle is based on two steps. The preamble signalling blocks according to this embodiment comprise only high level, rough signalling information about the mapping of the data blocks onto the data segments. This high level signalling information may correspond to the signalling parameters that are generally transmitted in the initial layer 1 blocks, as commonly done according to the DVB-T2 or DVB-C2 standard. This high level information may, for instance, comprise information about the bandwidth of the data segments in the payload portion, the used pilot patterns, the guard interval etc. In addition, it comprises preferably a pointer block 44 including at least one pointer to at least one payload portion signalling block 53, which is provided in the payload portion 50 and which comprises low level, more detailed signalling information about the mapping of the data blocks onto the data symbols of the second frame. This payload portion signalling block 53a shown in FIG. 11 thus requires sufficient information for the receiver to find and decode the data symbols carrying data blocks of the desired data stream. Further, a pointer to the next payload portion signalling block 53b may be included which comprises further information, particularly regarding the location of subsequent data symbols carrying payload data.

As shown in FIG. 11 each payload portion signalling block 53a-53f points to the next payload portion signalling block, which payload portion signalling blocks can thus be mapped and decoded basically in the same way as the data blocks carrying actual payload data. The pointer from one payload portion signalling block to the next payload portion signalling block may also point across other frames F1 located in between two second frames F2.

According to another embodiment multiple pointers are included in the pointer block 44, which point to several payload portion signalling blocks, e.g. to the payload portion signalling blocks 53a-53c. After deinterleaving and decoding said payload portion signalling blocks 53a-53c sufficient low level signalling information and location information (e.g. pointers) for finding the next set of payload portion signalling blocks 53d-53f as well as the next group of data blocks. Thus, according to such an embodiment, a set of pointers is transmitted during several bursts (i.e. payload portion signalling blocks) and provides information on the next bursts (i.e. payload portion signalling blocks) of the following set as well as the next data blocks.

Figure 12:
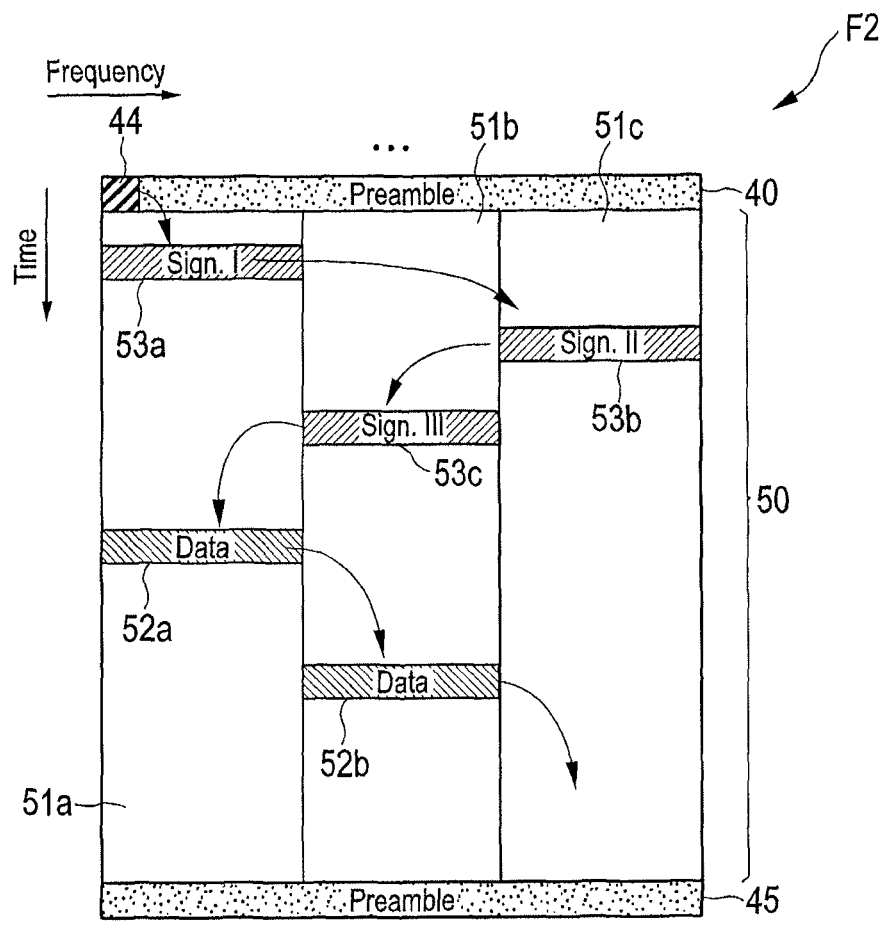
FIG. 12 shows a second embodiment for mapping signalling information into the second frames.

Another embodiment for signalling shall be explained with reference to FIG. 12 showing a single second frame F2. According to this embodiment the signalling principle is based on three steps. Firstly, as mentioned above, the preamble signals the position of at least the first payload portion signalling block 53a provided in the payload portion 50. For this purpose, again, the preamble may comprise a pointer 44. The receiver is then able to decode the (one or more) payload portion signalling block(s) 53a (53b, 53c), which carries the data required for decoding the data blocks of the mapping input data streams. Preferably, the payload portion signalling blocks are mapped onto the frame F2 and transmitted similar to the data blocks carrying payload data, which allows for long time interleaving and robustness.

Still further, according to this embodiment, at least one of said payload portion signalling blocks 53a-53c (or the whole set together, in particular after deinterleaving and decoding) provides information, in particular a pointer, by which the receiver finds at least the first data block 52a (or the group of next data blocks) of the desired data stream. Said data block 52a does not only contain the actual payload data, but also contains in-band signalling information comprising low level, more detail signalling information about the mapping of the data blocks of said particular mapping input data stream onto the data segments of the frames. This in-band signalling information thus enables the receiver to find the next data block 52b of the same data stream. Hence, from this moment on the receiver is no longer obliged to receive and decode the signalling information comprised in the preamble and/or in the payload portion signalling blocks, but the in-band signalling information contained in the data blocks 52a, 52b, . . . is sufficient for finding all data blocks of the desired data stream and maybe also of other "related" data streams (for enabling faster zapping to related services).

According to a modification of said embodiment, not each single data block contains sufficient information for finding the next data block, but several data blocks 52a, 52b are treated as a unit. Only after deinterleaving and decoding all of them, the in-band signalling information is available including information about the next "unit" (i.e. group of data blocks).

Hence, generally the receiver is not obligated to receive the preamble or the payload portion signalling blocks, which may again be considered as a separate signalling data stream mapped onto the payload portion of the frame. However, if the position of the data blocks is not known at the time the current mapping input data stream was encoded, it can also point to the position of the next payload portion signalling block. It shall be noted that the payload portion signalling blocks do generally not only comprise signalling information for a single mapping input data stream, but for all mapping input data streams.

Hence, according to this embodiment the signalling information specific to a particular mapping input data stream is provided in-band in the data blocks of said mapping input data streams, e.g. attached at the beginning or at the end of the data blocks. It is also possible to interleave said signalling information together with the FEC-encoded data blocks by a common interleaver, or the signalling information may be combined with the uncoded payload data (either completely at the beginning or end or sub-divided into several portions), and then a common FEC-encoding followed by interleaving is performed, preferably by use of a common interleaver, i.e. over multiple FEC-coded blocks. This provides the advantage of longer time diversity and, after the separation into various data segments, also more frequency diversity.

According to the present invention, further information is preferably included in the signalling information, in particular in the payload portion signalling blocks, which informs the receiver about the selected MIMO mode per mapping input data stream and/or per data segment and, if required, about the selected pilot pattern per mapping input data stream and/or per data segment.

Figure 13:
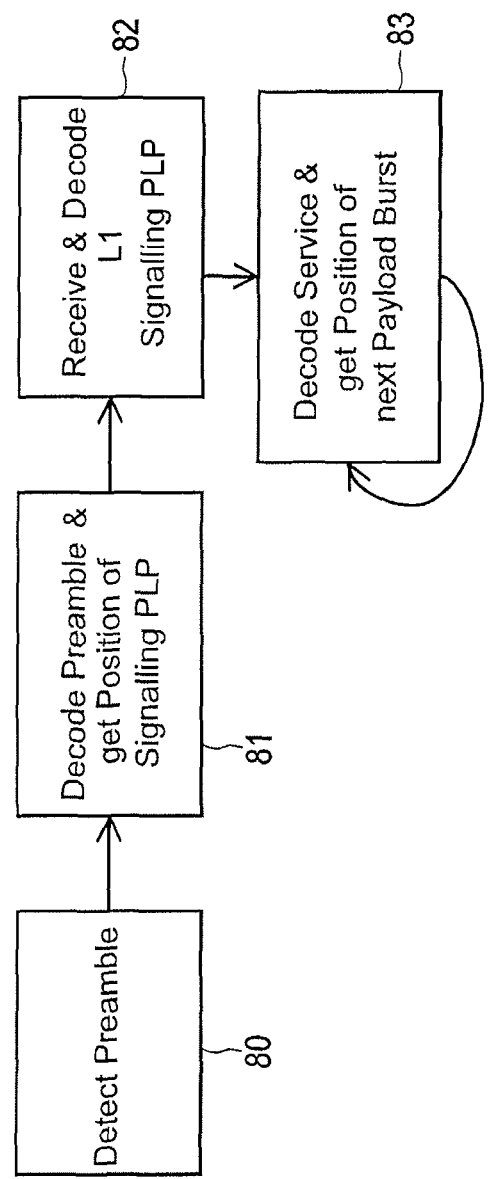
FIG. 13 illustrates the steps of the method performed by a receiver for obtaining signalling information.

A simple block diagram illustrating the steps for retrieving of the signalling information in the receiver, if the signalling information is mapped onto the frame F2 as illustrated in FIG. 12, is shown in FIG. 13. In a first step 80 the preamble is detected, which is mainly used for initial synchronization to the data stream to be received. A pointer in the preamble points to the next payload portion signalling block, whose position is obtained in step 81 by decoding the preamble, at least the pointer included therein. In this embodiment the payload portion signalling blocks are mapped onto the frame F2 like a normal mapping input data stream and are also called "signalling PLP". In step 82 this payload portion signalling block of the signalling PLP is received and decoded. Afterwards, the complete signalling is done in-band, i.e. within the mapping input data stream itself. Hence, in step 83, the service and the position of the next data block (also called payload burst) is obtained and decoded.

It shall be noted that the same principles and the same embodiments for signalling information can be used if the pointer unit 44 is included in the other preamble 45 (i.e. the postamble) of a frame.

The preferred embodiment of a receiver only needs to obtain the signalling information stored in a preamble portion, then accesses a payload portion signalling block a single time, and from then on uses only the in-band signalling information. The in-band signalling information preferably includes a pointer to the next data block of the data stream and to the next payload portion signalling block (which is useful if a payload portion signalling block is provided in every frame of the same type, but is otherwise not needed since then enough preamble symbols are in between from which the signalling information can also be provided in some embodiments). Only, if the receiver wants to switch to another service, a payload portion signalling block has to be accessed again a single time to obtain the required signalling information related to the new service.

An example of the signalling information that can be included in the payload portion signalling blocks is illustrated in the following table, where the entries are either self-explaining, or as defined in the T2 standard, or as described below:

FRAME_NUMBER: This 8-bit field indicates the frame number of the last burst of the time interleaving frame.
NUM_PLP: This 8-bit field signals the number of PLPs present in the current DVB-NGH signal.
The following fields appear for every signalled PLP:
　PLP_ID: 8-bit identifier of the PLP.
　PLP_IDENTIFICATION: This 16-bit field uniquely identifies a PLP within a network.
　PLP_QAM_MODE: This 4-bit field signals the QAM mode of the PLP (including rotated constellations).
　PLP_FEC_MODE: This 4-bit field signals the FEC mode of the PLP (including FEC code length).
　PLP_MIMO_MODE: This 2-bit field signals the MIMO mode of the PLP according to the following table:

TABLE 1

| PLP_MIMO_MODE field | | | | |
|---|---|---|---|---|
| | PLP_MIMO_MODE | | | |
| | 00 | 01 | 10 | 11 |
| mode | SISO | MISO | MIMO | reserved |

PLP_PILOT_PATTERN: This 3-bit field identifies the pilot pattern in which the PLP is transmitted.
　PLP_TYPE: This 8-bit field indicates the PLP type.
　PLP_PAYLOAD_TYPE: This 8-bit field signals the payload type, e.g. TS, GSE.
　NUM_ASSOCIATED_PLP: This 3-bit field indicates the number of PLPs that are associated with this PLP.
　The following two fields appear for each associated PLP:
　ASSOICATED_PLP_ID: This 8-bit field indicated the PLP ID of the associated PLP.
　ASSOCIATION_TYPE: This 2-bit field signals the association type, e.g. local service or incremental redundancy.
　INTERLEAVING_TYPE: This 2-bit field indicates the time interleaver type.
　NUM_SIGNALLED_TI_FRAMES: This 2-bit field indicates the number of signalled time interleaving frames for the given PLP minus 1, so NUM_SIGNALLED_TI_FRAMES=0 corresponds to one TI frame.
　The following fields appear for each signalled time interleaving frame:
　　TI_NUM_BURSTS: This 3-bit field signals the number of bursts for the given time interleaving frame.
　　TI_FRAME_NUMBER: This 8-bit field indicates the frame number in which the time interleaving frame starts. If the number is smaller than the frame number of the current frame, the TI_FRAME_NUMBER refers to the following super frame.
　　INTRASYMBOL_POINTER: This 11-bit field points to the start of the time interleaving frame within an OFDM symbol.
　　The following fields appear for each time interleaving burst:
　　　DATA_SLICE_ID: This 4-bit field indicates the Data Slice number containing the burst.
　　　PILOT_PATTERN: This 3-bit field indicates the pilot pattern used in the given data slice. In case of a postamble, this signalling gets valid for the next frame.
　　　OFDM_SYMBOL_NUMBER: This 8-bit field indicates the OFDM symbol number of the next given burst. If the number is lower than the number of the previous burst, this burst is transmitted within the next frame.
　　　The following field only appears if there are associated PLPs:
　　　　ASSOCIATED_PLP_IDX: This 3-bit field indicates the index of the associated PLP in the NUM_ASSOICATED_PLP loop. A value of 0 means that no PLP is currently associated.
　　　TIME_INTERLEAVER_SIZE: This 8-bit field indicates the length of the time interleaving frame in multiples of LDPC codewords.

NUM_HANDOVER_PLP: This 8-bit field indicates the number of PLPs that will be signalled in the handover signalling.

The following fields appear for every signalled handover PLP.

PLP_IDENTIFICATION: This 16-bit field uniquely identifies the PLP within a network.

NUM_ALTERNATIVE_CELLS: This 8-bit field indicates the number of alternative cells within the given network that also carry the PLP.

The following fields appear for every alternative cell:

START_FREQUENCY: This 24-bit field indicates the start frequency of the alternative cell.

CELL_ID: This 16-bit field indicates the cell ID of the alternative cell.

CRC32: This 32-bit cyclic redundancy check ensured correctness of the data.

| FIELD | SIZE |
|---|---|
| FRAME_NUMBER | 8 bit |
| NUM_PLP | 8 bit |
| for i = 1 ... NUM_PLP { | |
| PLP_ID | 8 bit |
| PLP_IDENTIFICATION | 16 bit |
| PLP_QAM_MODE | 3 bit |
| PLP_FEC_MODE | 4 bit |
| PLP_MIMO_MODE | 2 bit |
| PLP_PILOT_PATTERN | 3 bit |
| PLP_TYPE | 8 bit |
| PLP_PAYLOAD_TYPE | 8 bit |
| NUM_ASSOCIATED_PLPs | 3 bit |
| For NUM_ASSOCIATED_PLPs { | |
| ASSOCIATED_PLP_ID | 8 bit |
| ASSOCIATION_TYPE | 2 bit |
| } | |
| INTERLEAVING_TYPE | 2 bit |
| NUM_SIGNALLED_TI_FRAMES | 2 bit |
| for i = 1 ... | |
| TI_NUM_BURSTS | 3 bit |
| TI_FRAME_NUMBER | 8 bit |
| INTRASYMBOL_POINTER | 11 bit |
| for i = 1 ... NUM_BURSTS { | |
| DATA_SLICE_ID | 4 bit |
| OFDM_SYMBOL_NUMBER | 8 bit |
| PILOT_PATTERN | 3 bit |
| if (NUM_ASSOCIATED_PLP > 0) { | |
| ASSOCIATED_PLP_IDX | 3 bit |
| } | |
| } | |
| TIME_INTERLEAVER_SIZE | 8 bit |
| } | |
| } | |
| NUM_HANDOVER_PLPs | 8 bit |
| for i = 1 ... NUM_HANDOVER_PLPs { | |
| PLP_IDENTIFICATION | 16 bit |
| NUM_ALTERNATIVE_CELLS | 8 bit |
| for j = 1 ... NUM_ALTERNATIVE_CELLS { | |
| START_FREQUENCY | 24 bit |
| CELL_ID | 16 bit |
| } | |
| } | |
| CRC32 | 32 bit |

Figure 24:
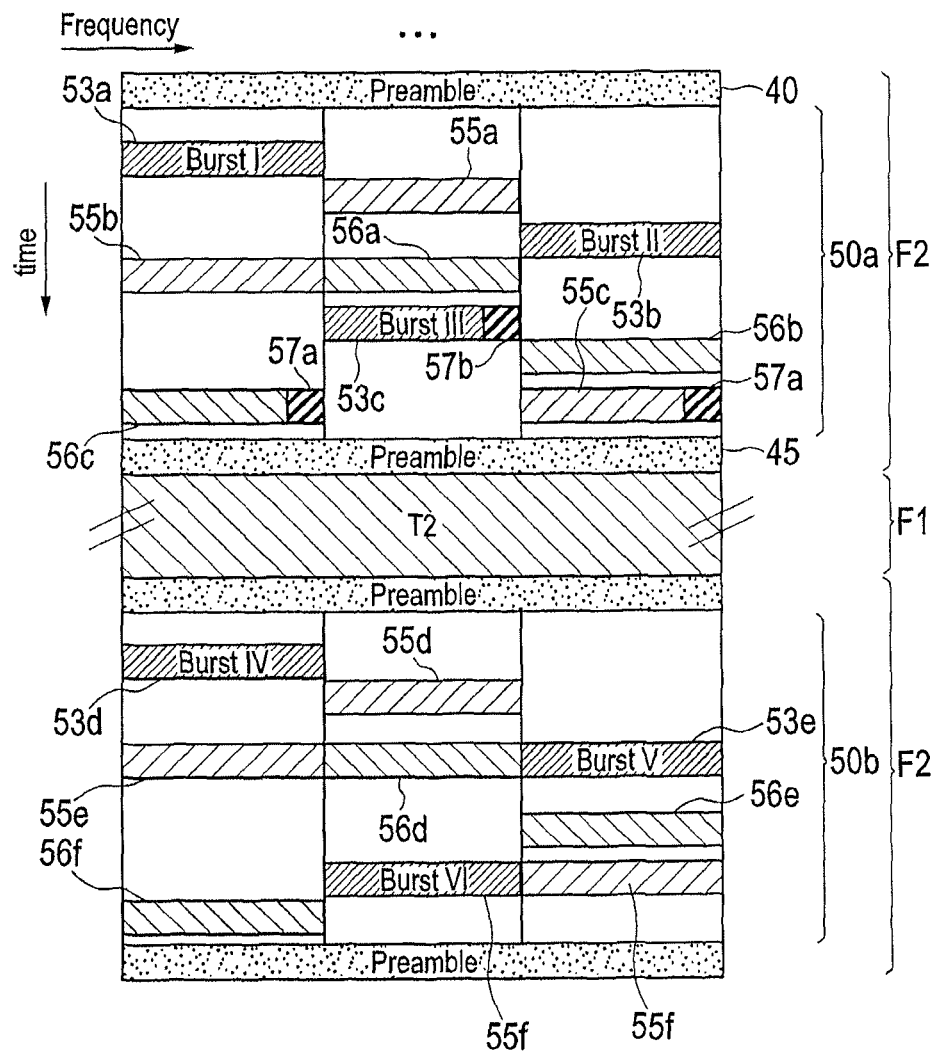
FIG. 24 shows a third embodiment for mapping signalling information into the second frames.

A further embodiment for signalling information is illustrated with reference to FIG. 24. According to this embodiment payload portion signalling blocks 53a-53c are mapped onto data symbols of the second frame 50a. Into these payload portion signalling blocks 53a-53c signalling information, in particular pointers, about the mapping of the data blocks 55d-55f, 56d-56f of the various data streams (55a-55f being data blocks of a first data stream, and 56a-56f being data blocks of another data stream) onto the data symbols of a subsequent group of second frames (or only a single second frame), here the next second frame 50b, have been included.

Hence, in a group of one or more second frames (e.g. the frame 50a) all the required signalling information can be found by the receiver in one or more of the payload portion signalling blocks 53a-53c, that are required to find all data blocks 55d-55f, 56d-56f carrying payload data mapped onto the subsequent group of (one or more) second frames 50b. Instant zapping of the receiver between all data streams is thus possible within the subsequent group of (one or more) second frames 50b without any waiting time for first obtaining the required signalling information.

Additionally, some offset signalling information 57a, 57b indicating changes of the mapping of the data blocks 55a-55f, 56a-56f between said particular group of second frames 50a and said subsequent group of second frames 50b can be included into in-band signalling information or into one or more payload portion signalling blocks mapped onto data symbols of said particular second frame. Hence, at the end of a group of (one or more) second frames said offset signalling information 57a can be mapped as in-band signalling information into one or more data blocks 55c, 56c. Alternatively, said offset signalling information 57b can be mapped into one or more payload portion signalling blocks 53c. Said offset signalling information 57a, 57b indicates how the signalling information changes from this group of second frames 50a to the next group of second frames 50b (or any other subsequent frame) so that in the next (or subsequent) group(s) of second frames 50b all the signalling information must not necessarily be mapped into payload portion signalling blocks or must at least not be obtained by the receiver. In other words, mainly some offset information is mapped into the frames, particularly to save time (in the receiver).

Figure 14:
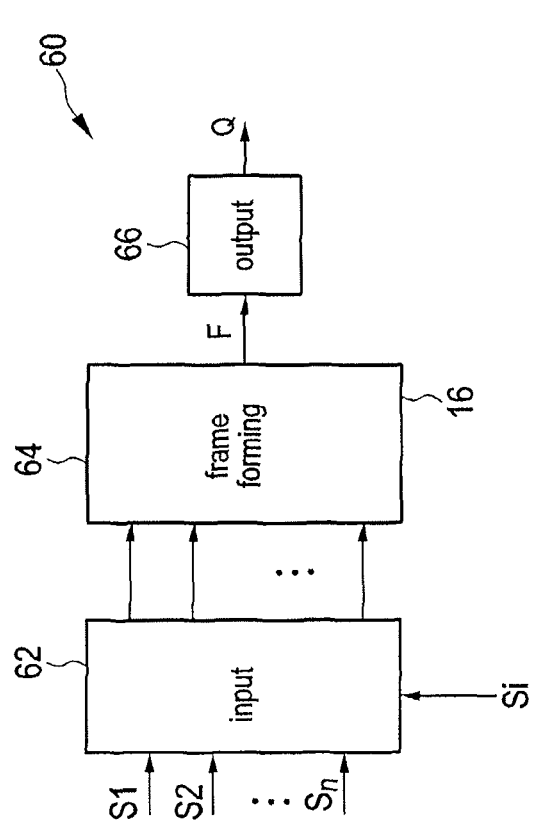
FIG. 14 shows a second embodiment of a mapping apparatus according to the present invention.
Figure 15:
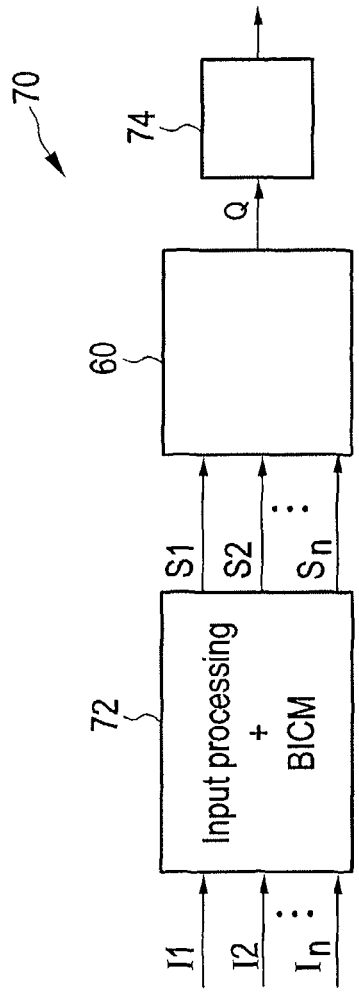
FIG. 15 shows a second embodiment of a transmitter according to the present invention.

Another embodiment of a mapping apparatus 60 according to the present invention is schematically depicted in FIG. 14. A corresponding transmission apparatus 70 comprising such a mapping apparatus 60 is depicted in FIG. 15. The main difference between the mapping apparatus 60 shown in FIG. 14 and the mapping apparatus shown in FIG. 1 is that according to the embodiment of the mapping apparatus 60 shown in FIG. 14 only a single frame forming unit 64 is provided following the data input 62 and that no stream forming unit 18 is provided. Said frame forming unit 64 basically corresponds to the second frame forming unit 16 as shown in FIG. 1, but is adapted for mapping the data blocks of the mapping input data streams S1, S2, ..., Sn onto frames F having a frame structure as shown in FIG. 10 for the second frames F2.

In other words, the data blocks are mapped onto said frame F such that they are spread in time and frequency over various data symbols and various data segments of the frame F2 as shown in FIG. 10 or as further explained above regarding further variations of the frame structure for the frame F2. Thus, said frame structure applied by the frame forming unit 64 provides a time and frequency diversity enabling the use of a narrow-band receiver and providing the desired low power consumption of the receiver. The generated frames F are generally arranged sequentially and are then outputted by the data output 66 as mapping output data stream Q for further processing and/or transmission.

The transmitter 70 shown in FIG. 15 differs from the transmitter 30 shown in FIG. 2 in that it only comprises a single pre-processing unit 72 which basically corresponds to the pre-processing unit 34, according to which the input data streams I1, I2, ..., In are processed as defined in the DVB-T2 or DVB-C2 standard. Of course, the pre-processing may also be employed in a different way and must not necessarily be consistent with the DVT-T2 or DVB-C2 standard (or any standard). For transmission of the mapping output data stream Q a transmitter unit 74 is provided which generally corresponds to the transmitter unit 36 shown in FIG. 2.

It shall be noted that the frame forming unit 64 shown in FIG. 14 generally corresponds to the second frame forming unit 16 shown in FIG. 1. In particular, for the frame forming unit 64 the same embodiments exist as have been explained above for the second frame forming unit 16 and as have been shown in FIGS. 6A to 6D. Further, the embodiments illustrated in FIGS. 6A to 6D are to be understood only as examples of possible implementations. Further embodiments exist including other combinations of the preferred elements, in particular the MIMO mode selection units, the pilot pattern selection units, the coding unit and the buffer units.

Figure 25A:
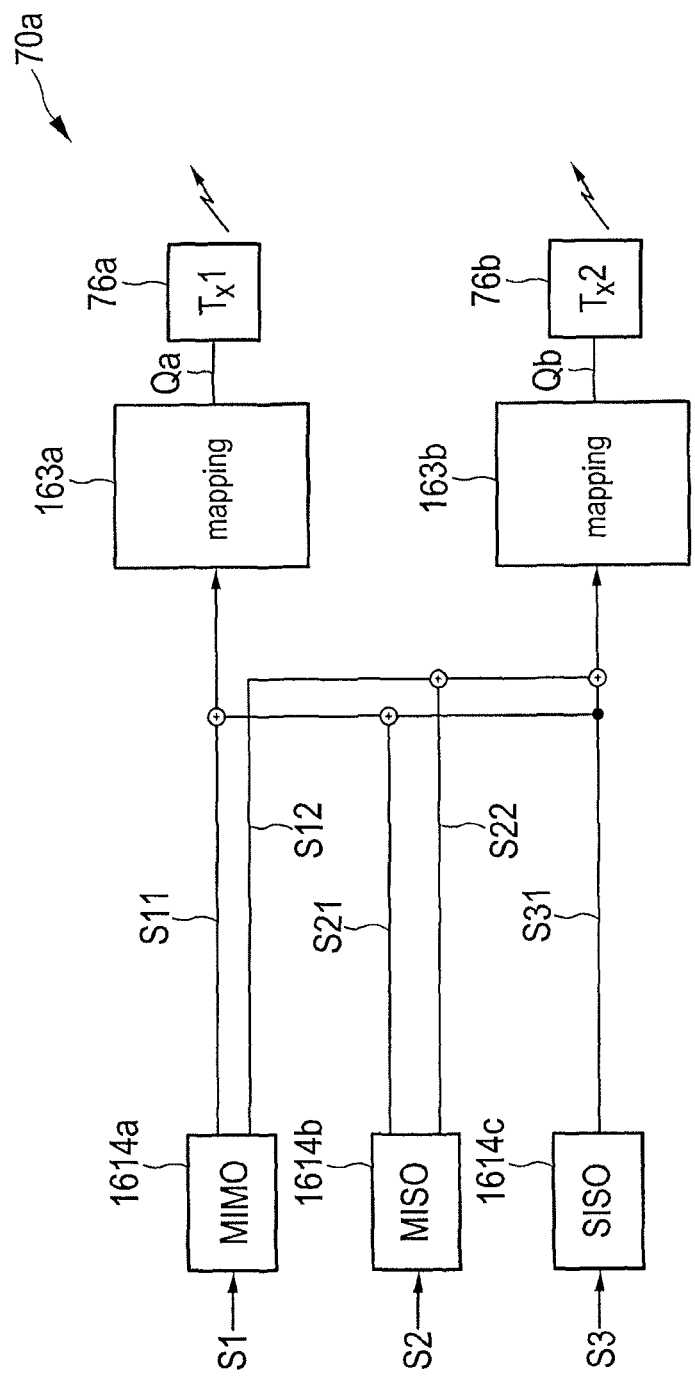
FIG. 25 shows simplified diagrams of various embodiments of a transmitter according to the present invention.
Figure 25B:
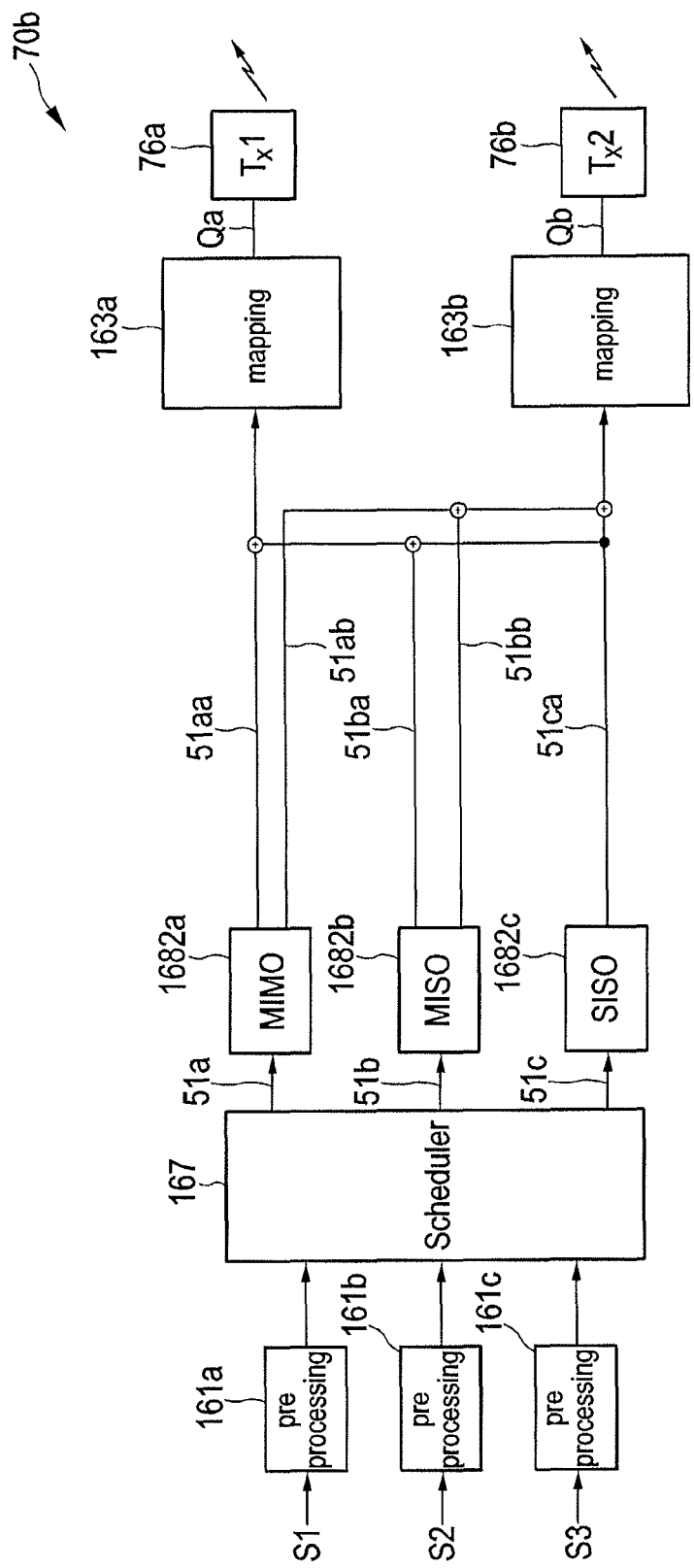

FIGS. 25A and 25B schematically illustrate two preferred embodiments of the transmitter according to the present invention in a simplified diagram and by use of two simple examples showing only a few elements of the transmitter.

In the first embodiment of the transmitter 70a shown in FIG. 25A three mapping input data streams S1, S2, S3, e.g. representing three different services that shall be available to mobile receivers, are illustrated. The first mapping input data stream S1, e.g. a movie service, is provided to a first MIMO mode selection unit 1614a, which selects that MIMO processing shall be applied to the data blocks of this first mapping input data stream S1. Accordingly, the data stream S1 is split off into (at least) two output streams S11, S12, which may be coded differently (e.g. by spatial multiplexing, e.g., according to the D-/H- or V-BLAST (Bell Labs Layered Space Time scheme) architecture; not shown) and which are provided to different mapping units 163a, 163b. Therein, the data blocks of said output streams S11, S12 are mapped onto different mapping output data streams Qa, Qb, which are provided to different transmission antennas 76a, 76b for broadcasting. For receiving these data blocks the receiver uses two reception antennas and two reception paths to individually process the received mapping output data streams Qa, Qb until they are combined to obtain the information contained in the received service (i.e. in the data stream S1). Since MIMO processing is applied to this service, a high throughput of the data transmission can be obtained. Generally, this depends on the MIMO scheme: spatial multiplexing is for higher throughput, while other space-time (or space-frequency) MIMO schemes aim for higher robustness.

The second mapping input data stream S2, e.g. a news service, is provided to a second MIMO mode selection unit 1614b, which selects that MISO processing shall be applied to the data blocks of this second mapping input data stream S2. Accordingly, the data stream S2 is split off into (at least) two output streams S21, S22, which may be coded differently (e.g. by an Alamouti encoder; not shown) and which are provided to different mapping units 163a, 163b. Therein, the data blocks of said output streams S21, S22 are mapped onto the different mapping output data streams Qa, Qb, which are provided to the different transmission antennas 76a, 76b for broadcasting. For receiving these data blocks the receiver generally only requires a single reception antenna and a single reception path to process the received mapping output data streams Qa, Qb until they are combined to obtain the information contained in the received service (i.e. in the data stream S2). Thus, this news service can be detected by any receiver (independent of the number of deployed receive antennas) and the transmission is reliable, because of the MISO scheme.

The advantages of MISO vs. MIMO are the high robustness and simple detection (1 reception antenna is sufficient). The robustness of MISO can be further increased if MIMO is used with the same data rate as with a single transmission antenna. On the other hand, the performance of spatial multiplexing MIMO drops rapidly if the spatial distribution coefficients (channel coefficients) are correlated. This is, for instance, the case if the antennas are located close to each other, as is e.g. the case in a small handheld device having two antennas. In contrast, a MISO method has in worst case (completely correlated channel coefficients) the same performance as a SISO method.

The third mapping input data stream S3, e.g. a music service, is provided to a third MIMO mode selection unit 1614c, which selects that SISO processing shall be applied to the data blocks of this second mapping input data stream S3. Accordingly, the data stream S3 is processed into a single output stream S31, which is provided to at least one of said mapping units 163a, 163b. Generally, mapping of the data blocks of said output stream S31 onto one mapping output data stream Qa or Qb and transmission over one transmission channel is sufficient. Preferably, however, the identical data blocks are mapped onto both mapping output data streams Qa, Qb and are thus also broadcast by all different transmission antennas 76a, 76b as is typically done in single frequency networks. Again, for receiving these data blocks the receiver generally only requires a single reception antenna and a single reception path to process the received mapping output data streams Qa, Qb until they are combined to obtain the information contained in the received service (i.e. in the data stream S3). Compared to MIMO and MISO the described SISO method has the advantages of simple detection, in particular with respect to channel estimation, and less energy consumption.

While in the embodiment of the transmitter 70a the selection of the MIMO mode is available per mapping input data stream, in the embodiment of the transmitter 70b shown in FIG. 25B the selection of the MIMO mode is available per data segment. Accordingly, after preprocessing the mapping input data streams S1, S2, S3 by PLP processing units 161a, 161b, 161c (see also FIG. 6D) and scheduling by the scheduler 167, MIMO mode selection is performed per data segment 51a, 51b, 51c by MIMO mode selection units 1682a, 1682b, 1683c. Therein, generally the same function is performed as explained above with respect to the MIMO mode selection units 1614a, 1614b, 1614c, but now on the level of data segments. Thereafter the data blocks of the various obtained data segments 51aa, 51ab, 51ba, 51bb, 51ca are provided to the mapping unit 163 as, 163b, wherein they are mapped accordingly on the mapping output data streams Qa, Qb and then transmitted by the transmission antennas 76a, 76b.

Further embodiments of the transmitter include pilot pattern selection means in addition or instead of MIMO mode selection means. For instance, the MIMO mode selection means shown in FIGS. 25A, 25B can be replaced or complemented with such pilot pattern selection means for selecting the pilot pattern per mapping input data stream and/or per data segment.

For allowing channel estimation scattered pilots are added to the data slices. The addition of these scattered pilots is already done within individual data slices, as it is possible to have different pilot densities within different data slices of the same signal.

The equalisation of SISO signals requires the estimation of a single channel transfer function, only. However, as the neighbouring data slices may use MIMO or MISO signals, the edge pilots and the preamble pilots carry MIMO or MISO pilots. Though, edge pilots and preamble pilots are not part of the data slice pilots. Different pilot densities can be supported. The pilot patterns PP0 and PP1 are intended for large Single Frequency Networks, while the pilot schemes PP2 and PP3 have reduced overhead. Furthermore, PP0 and PP2 are optimized for high speed reception, as they have an increased pilot density in the time direction. In another embodiment the edge pilot density is selected with the highest possible density of a complete data segment, a complete frame or the complete data transmission.

Within a data slice a given cell is a scattered pilot if $$k_{DS} \bmod (D_X \cdot D_Y) = D_X (l \bmod D_Y) k=1, \ldots, N_{DS}-1,$$

where $k_{DS}$ is the subcarrier number within the data slice, and l is the symbol number within the frame, respectively. Further, Dx indicates the difference in carrier index between adjacent scattered-pilot-bearing carriers and Dy indicates the difference in symbol number between successive scattered pilots on a given carrier. The values for $D_X$ and $D_Y$ are given in the following table:

| Pilot Pattern | $D_X$ | $D_Y$ |
|---|---|---|
| PP0 | 4 | 2 |
| PP1 | 4 | 4 |
| PP2 | 8 | 2 |
| PP3 | 8 | 4 |

Figure 26A:
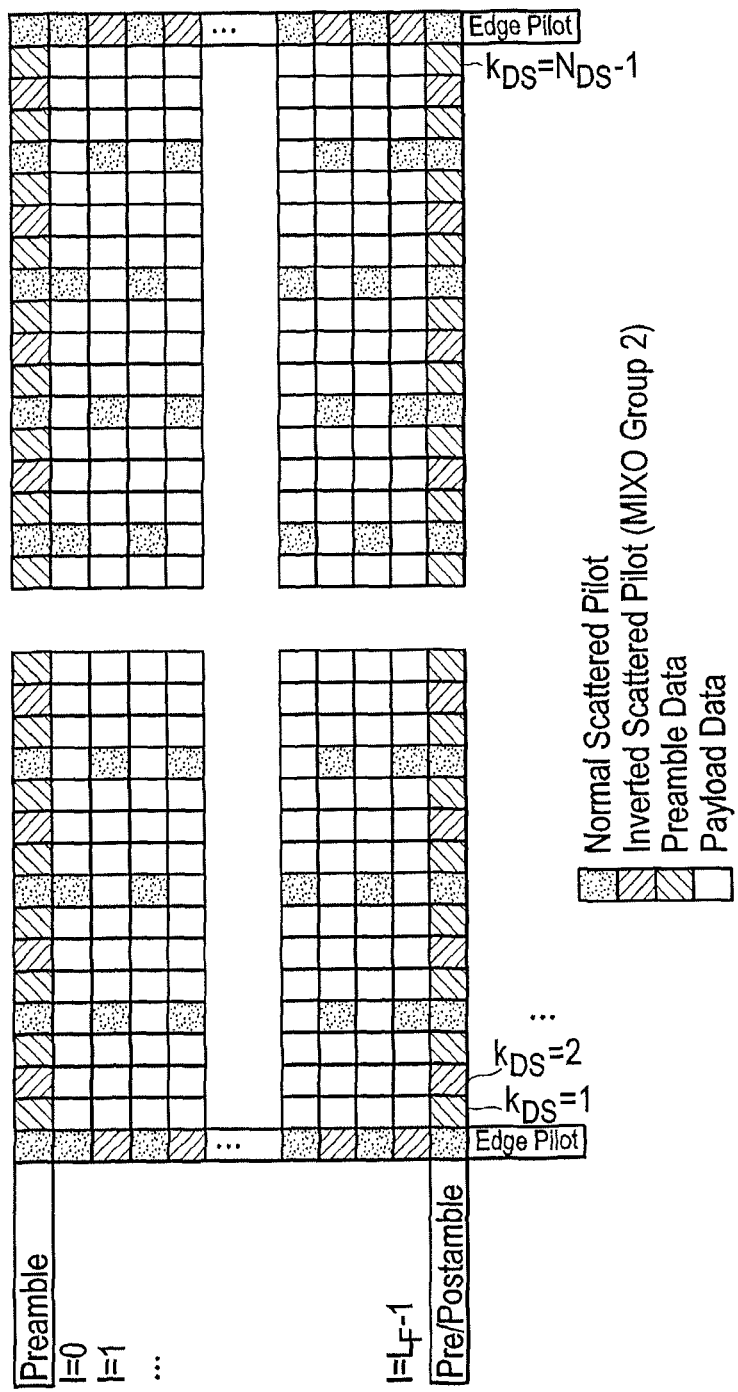
FIG. 26 shows three examples of possible pilot patterns that may be used according to the present invention.

FIG. 26A shows an example pilot arrangement for pilot pattern PP0.

The modulation sequence of the pilots is $$Re\{c'_{m,l,k_{DS}}\} = A_{SP} \text{ and } Im\{c'_{m,l,k_{DS}}\} = 0,$$

where $A_{SP}$ is the boosting level of the scattered pilots as defined in the following table.

| Pilot Pattern | $A_{SP}$ |
|---|---|
| PP0 | 4/3 |
| PP1 | 4/3 |
| PP2 | 4/3 |
| PP3 | 7/4 |

Furthermore, no scrambling is applied at this point as the complete scrambling is performed in the framing section.

The transmission of MIMO or MISO services requires additional pilots, as two different channel transfer functions have to be estimated by the receiver. However, in contrast to DVB-T2, the possibility to support also large Single Frequency Networks shall be provided. Hence, an additional pilot pattern is overlaid to the SISO pilots, i.e. the inverted pilots. Hence, a cell is a non-inverted pilot if $$k_{DS} \bmod (D_X \cdot D_Y) = D_X (l \bmod D_Y) k=1, \ldots, N_{DS}-1,$$

and an inverted pilot if $$k_{DS} \bmod (D_X \cdot D_Y) = D_X [(l+D_Y/2) \bmod D_Y] k=1, \ldots, N_{DS}-1,$$

where the values $D_X$ and $D_Y$ are again defined in the above table. The modulation sequence for the transmitters of MIMO OR MISO group 0 is:

$$Re\{c^{0'}_{m,l,k_{DS}}\} = A_{SP} \text{ and } Im\{c^{0'}_{m,l,k_{DS}}\} = 0.$$

The modulation sequence for the non-inverted pilots of MIMO or MISO group 1 is:

$$Re\{c^{1'}_{m,l,k_{DS}}\} = A_{SP} \text{ and } Im\{c^{1'}_{m,l,k_{DS}}\} = 0,$$

while the modulation sequence for the inverted pilots of MIMO or MISO group 1 is:

$$Re\{c^{1'}_{m,l,k_{DS}}\} = -A_{SP} \text{ and } Im\{c^{1'}_{m,l,k_{DS}}\} = 0.$$

Figure 26B:
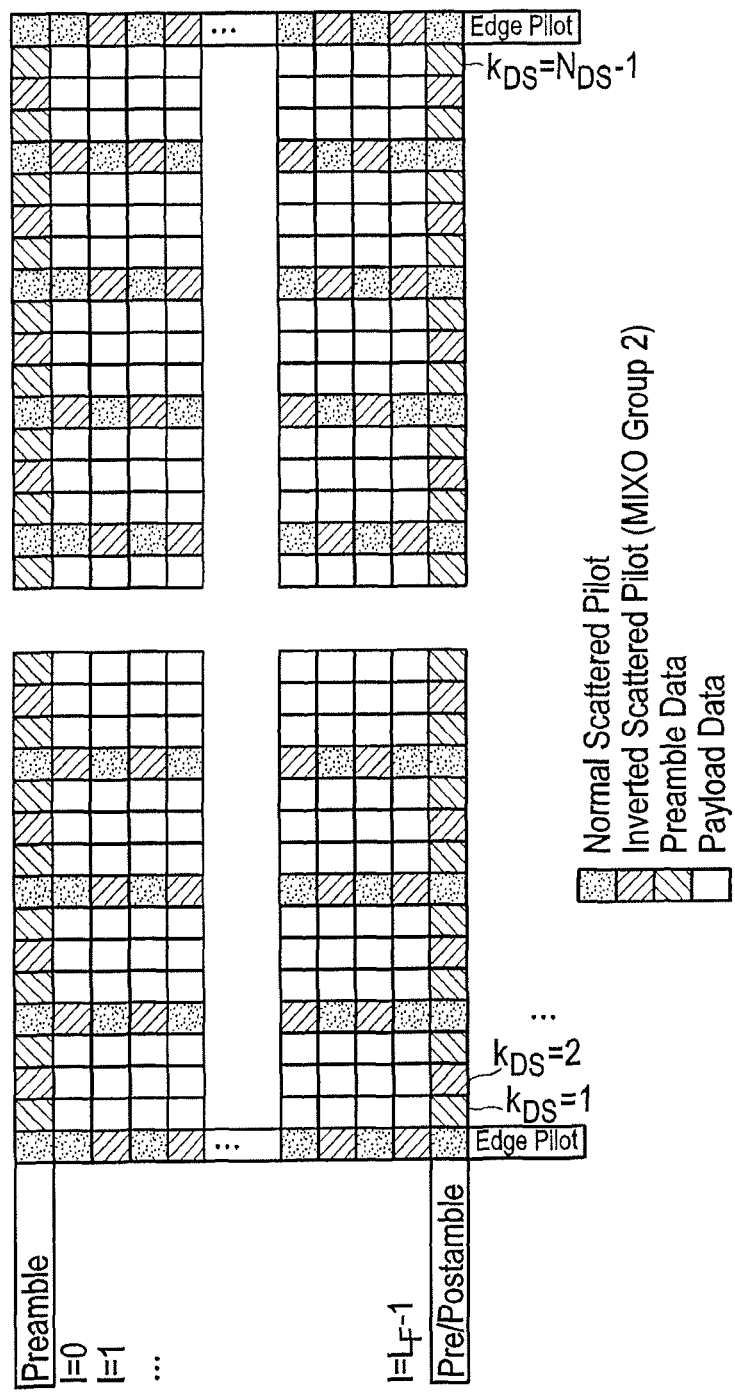

The values for $A_{SP}$ are again given in the above table. Furthermore, FIG. 26B depicts an arrangement of the MIMO or MISO pilots for pilot pattern PP0.

The edge pilots are generally selected such that they are fitting with the pilot patterns of one or more neighbouring data segments. For instance, a multiple of the pilot patterns of the two neighbouring data segments, between which the (common) edge pilots are provided, can be selected. If there is only a single neighbouring data segment (if the edge pilots are provided at the beginning or end (in frequency direction) of a frame), the pilot pattern is fitted to the pilot pattern of the single neighbouring data segment. In other words, the single edge pilots, that are common to the one or more neighbouring data segments, must be compatible and fit with the pilot patterns of these one or more neighbouring data segments.

Figure 16:
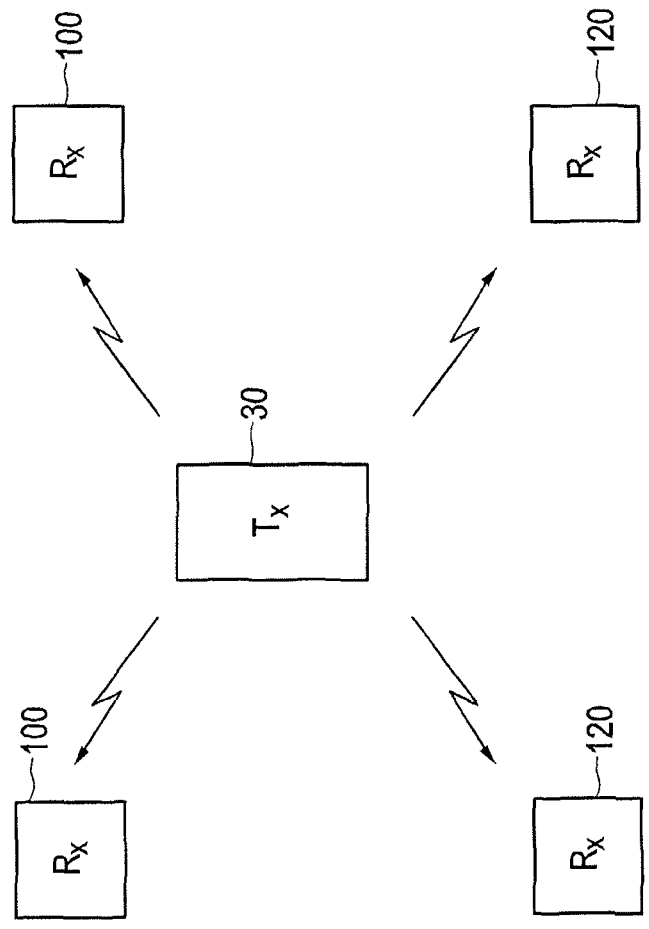
FIG. 16 shows a first embodiment of a broadcast system according to the present invention.

FIG. 16 shows a schematic block diagram of a broadcast system according to the present invention. In this embodiment, a transmitter (Tx) 30 as schematically depicted in FIG. 2 and a plurality of various receivers (Rx) 100, 120 are provided for receiving data broadcast by said transmitter 30. The receivers 100 may, for instance, be stationary receivers, e.g. in accordance with the DVB-T2 standard, and the receivers 120 may, for instance, be mobile receivers, e.g. in accordance with the upcoming DVB-NGH standard. The transmission signals of the transmitter 30 are constructed as explained above, i.e. may have a superframe structure as depicted in FIG. 9, and are not particularly adapted only for reception by a single type of receivers, but by both types of receivers 100, 120.

Figure 17:
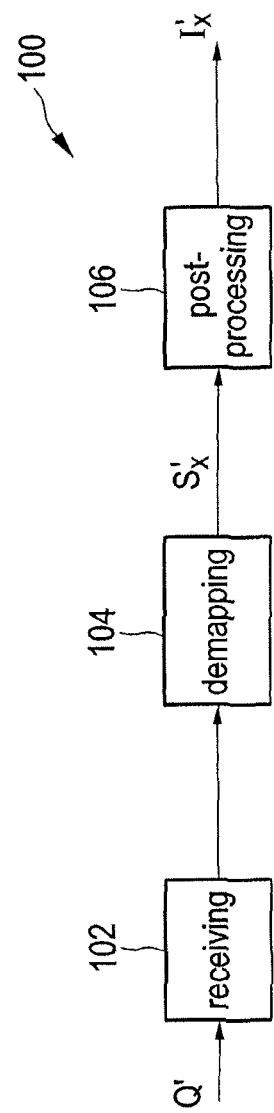
FIG. 17 shows an embodiment of a receiver of a first type used in said broadcast system shown in FIG. 16.

An embodiment of a (stationary) receiver 100 is schematically depicted in FIG. 17. It comprises a receiving unit 102 for receiving a demapping input data stream Q', which basically corresponds to the mapping output data stream Q transmitted by the transmitter 30, but possibly disturbed due to disturbances introduced by the transmission channel between the transmitter 30 and the receiver 100. The received demapping input data stream Q' is provided to a demapping apparatus 104 which then demaps the desired data stream (i.e. the desired service) Sx' therefrom. Said demapping will be explained in more detail below. Thereafter, the demapped data stream Sx' is further processed in a post-processing unit 106. Said post-processing may include cell/time deinterleaving, constellation demapping, bit deinterleaving, LDPC/BCH decoding, BBFRAME processing, dejittering and null packet reinserting as, for instance, commonly provided in a receiver according to the DVB-T2 standard. After said post-processing, the desired data stream Ix', which corresponds to one of the transmitter input data streams I1, I2, . . . , Im, is outputted.

Figure 18:
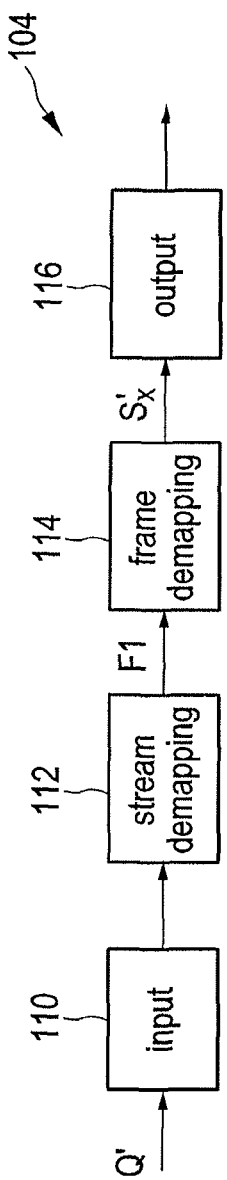
FIG. 18 shows a demapping apparatus of the receiver shown in FIG. 17.

An embodiment of the demapping apparatus 104 is schematically depicted in FIG. 18. Said demapping apparatus 104 comprises a data input 110, at which the demapping input data stream Q' is received. Said demapping input data stream Q' is constructed as explained above for the mapping output data stream Q. It comprises one or more first frames F1 and one or more second frames F2, which are alternately arranged. The frame structures of the first frames F1 and the second frames F2 are generally different, and for each frame structure various embodiments exist, as explained above in detail.

The received demapping input data stream Q' is then provided to a stream demapping unit 112, in which the first frames F1 are demapped from the demapping input data stream Q'. These first frames F1 are then provided to a frame demapping unit 114, in which they are further demapped for obtaining a desired mapping output data stream Sx', which is then outputted by the data output 116 for post-processing by the post-processing unit 106.

The stream demapping and frame demapping performed in this embodiment of the demapping apparatus 104 is commonly known and, for instance, be performed in accordance with the DVB-T2 standard, if the demapping apparatus 104 is part of a stationary receiver 100 in accordance with the DVB-T2 standard, as is the case in this embodiment. Hence, no further details need to be explained here, as all these details are generally known in the art. The F1 frames may, for instance, be the T2 frames of a superframe structure shown in FIG. 9, having a frame structure as, for instance, shown in FIGS. 3 and 4. Of course, however, other frame structures and other stream structures may be used as well, in which case the demapping apparatus 104 and its elements are adapted accordingly.

Figure 19:
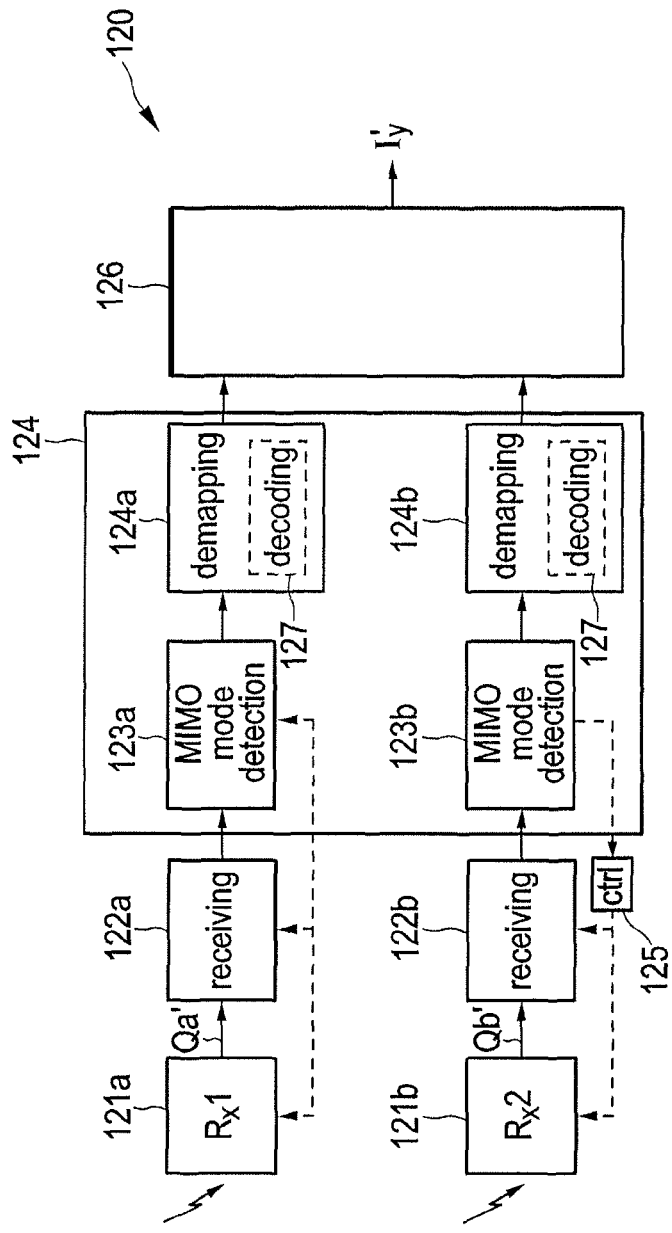
FIG. 19 shows an embodiment of a receiver of second type according to the present invention used in said broadcast system shown in FIG. 16.

An embodiment of a receiver 120 in accordance with the present invention is schematically depicted in FIG. 19. The general layout of the receiver 120 is, to some extent, similar (or even the same) as the layout of the receiver 100 as depicted in FIG. 17. However, the layout and function of the separate units of the receivers 100, 120 are different.

In an example at two reception antennas 121a, 121b and two receiving units 122a, 122b (the reception antennas may also be part of the receiving units 122) the receiver input data stream Qa', Qb' are received. These are provided to a demapping apparatus 124, which includes MIMO mode detection units 123a, 123b, which detect the MIMO mode applied to the data blocks of the mapping input data streams and/or the data segments in the transmitter, e.g. by evaluating the respective signalling information indicating said MIMO mode and/or by evaluating the received signals (e.g. by detection of the respective pilot pattern). Depending thereon, a corresponding processing is performed. For instance, if to the service that shall be received by the receiver, a MIMO mode is applied, the corresponding MIMO decoding (e.g. an Alamouti decoding) is applied that corresponds to the encoding performed in the encoder.

Further, in an embodiment it is possible, in particular for a MIMO receiver, to switch off one or more reception paths (e.g. by a control unit 125 via a feedback from the MIMO mode detection units 123a, 123b to the respective reception antenna 121a, 121b and/or the respective receiving unit 122a, 122b), e.g. if SISO or MISO scheme is applied to the desired service, since then over all transmission paths substantially identical data are transmitted. In this way power can be saved. Still further, in an embodiment the data received over the different reception paths may be combined to improve the quality of the received data.

In other broadcast systems, e.g. according to DVB-T2, the complete frame is either transmitted in SISO scheme or in MISO scheme. In the latter case the receiver must always equalize spatially. If also MIMO scheme is available so that per frame MIMO scheme is selected or not, the receiver must always have multiple reception antennas and apply spatial equalization. According to the present invention, however, different classes of receivers can be used in the same broadcast system and by use of the same broadcast signals. In particular, receivers that can receive MIMO signals, but also receivers that can at least receive MIMO or SISO signals can be used according to the present invention. Thus, the present invention enables also the use of a receiver having only a single reception antenna, which may receive and decode MISO and SISO signals, but ignores MIMO signals.

The output of the MIMO mode detection units 123a, 123b is provided to demapping units 124a, 124b, which may also be a combined demapping unit in an embodiment (e.g. if spatial equalization has to be performed). Therein, the desired data stream is demapped (and, if necessary, decoded in separate or a combined decoding unit(s) 127 provided in one or both of said demapping units 124a, 124b, or generally in the demapping apparatus 124), which is thereafter subjected to post-processing in the post-processing unit 126, to obtain the desired receiver output data stream Iy'. The post-processing in the post-processing 126 may generally be similar or identical to the post-processing performed in the post-processing unit 106 of the receiver 100, however is adapted such that it interrelates with the pre-processing performed in the pre-processing unit 34 of the transmitter 30. Hence, if the pre-processing in the pre-processing unit 34 of the transmitter 30 is, for instance, performed in accordance with the DVB-T2 or DVB-C2 standard, the post-processing in the post-processing unit 126 is adapted accordingly in accordance with the respective standard.

Similarly, in another embodiment of the transmitter, in addition to or instead of the MIMO mode detection units 123a, 123b respective pilot pattern detection units may be provided for detection of the pilot patterns. Based on the detected pilot pattern, the receiver may decide to perform channel estimation either in time and/or frequency direction (interpolation) and decide what kind of further processing of the received data is required.

It shall be noted that multiple services multiplexing is also possible according to the present invention, according to which different PLPs are transmitted over the different transmit antennas in case of MIMO. For example, two different PLPs might be mapped onto the different transmission paths of a MIMO encoded data symbols, while the receiver might e.g. process one PLP instantaneously, and store another PLP for later use or combine both PLPs (as in case of scalable video coding).

Figure 20:
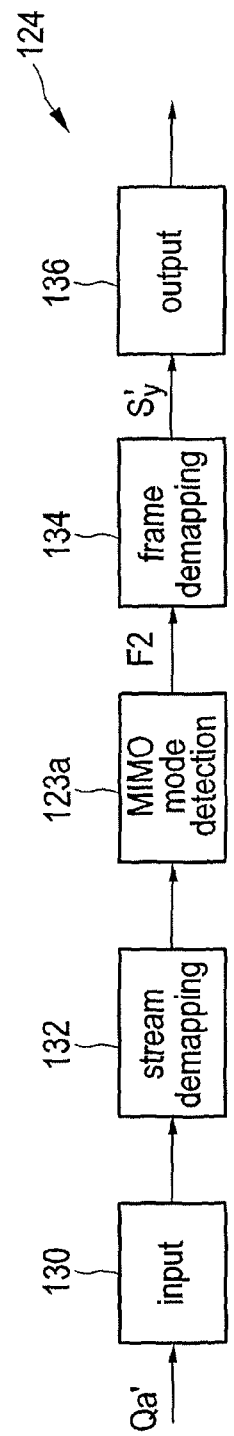
FIG. 20 shows a demapping apparatus of the receiver shown in FIG. 19.

An embodiment of one path of the demapping apparatus 124 is schematically depicted in FIG. 20. Again, the demapping apparatus 124 generally comprises the same layout as the demapping apparatus 104 of the receiver 100. However, the layout and functions of the separate units of the demapping apparatus 124 are different.

At the data input 130 the demapping input data stream Q' is received, which is provided for stream demapping in a stream demapping unit 132. Here, the frames F2 are demapped from the demapping input data stream Q'. These frames F2 may, for instance, be incorporated into the superframe structure as provided according to the DVB-T2 standard as FEF frames as shown in FIG. 9. These frames F2 are then provided to a MIMO mode detection unit 123a (and/or a pilot pattern detection unit) and then to a frame demapping unit 134, which demaps a demapping output data stream Sy' from said second frames. Said second frames F2 generally have a frame structure, which is different from the frame structure of the first frames F1, which second frame structure has been explained above with various modifications in FIGS. 7, 8, 10 to 12.

In particular, said frame demapping unit 134 is adapted for demapping said second frames F2 comprising a preamble portion 40 and a payload portion 50 into said demapping output data stream Sy'. Said frame demapping unit 134 is particularly adapted for demapping the signalling data Si from the preamble portion 40 and for demapping the data blocks of the demapping output data stream Sy' from the payload portion 50 by use of said signalling information Si. The derived demapping output data stream Sy' is then provided to a data output 136 for output to the post-processing unit 126.

Since the frame structure of the second frames F2 uses, as explained above, a segmented concept, according to which the payload portion is segmented into data segments, a narrow-band receiver 120 can be used, which, in some embodiments, must not be able to be tuned to and receive the complete channel bandwidth of the complete frame F2, but must only be able to be tuned to and receive a bandwidth portion of said total channel bandwidth. This is possible, despite the frame structures of both the first and second frames F1, F2 use the total channel bandwidth, which, however, can slightly vary for the two types of frames (e.g. 7.61 MHz for a first type, and 7.62 MHz for the second type of frames), i.e. the channel bandwidth of both types is in the same order.

The size of the bandwidth portion of the receiver 120 depends on the bandwidth portion covered by data blocks of the desired demapping output data stream Sy'. If, for instance, all the data blocks of the desired demapping output data stream Sy' are stored in a single data segment only, it is sufficient if the receiver can be tuned to and receive the bandwidth covered by said data segment. If, as provided in another embodiment, the data blocks of the desired demapping output data stream Sy' (in frequency direction) cover two or more (neighbouring or not neighbouring) data segments at a particular moment in time, the receiver must be able to be tuned to and receive a larger bandwidth portion. Further, the invention also enables the use of receivers that are able to receive the complete channel bandwidth and not only a portion thereof, as is the case in preferred receivers of the present invention.

The information about the bandwidth portion, in particular its size and its frequencies, are generally signalled from the transmitter to the receiver within the signalling information. This signalling information also contains information about the locations of the data blocks of the various data streams, to enable the receiver to change its tuning accordingly. As explained above, particularly with reference to FIGS. 11 to 13, for signalling of the required information, various embodiments exist. Hence, the frame demapping unit 134 is adapted accordingly to find, collect, deinterleave, decode and make use of said signalling information for demapping the desired data blocks from the frames F2.

Figure 21:
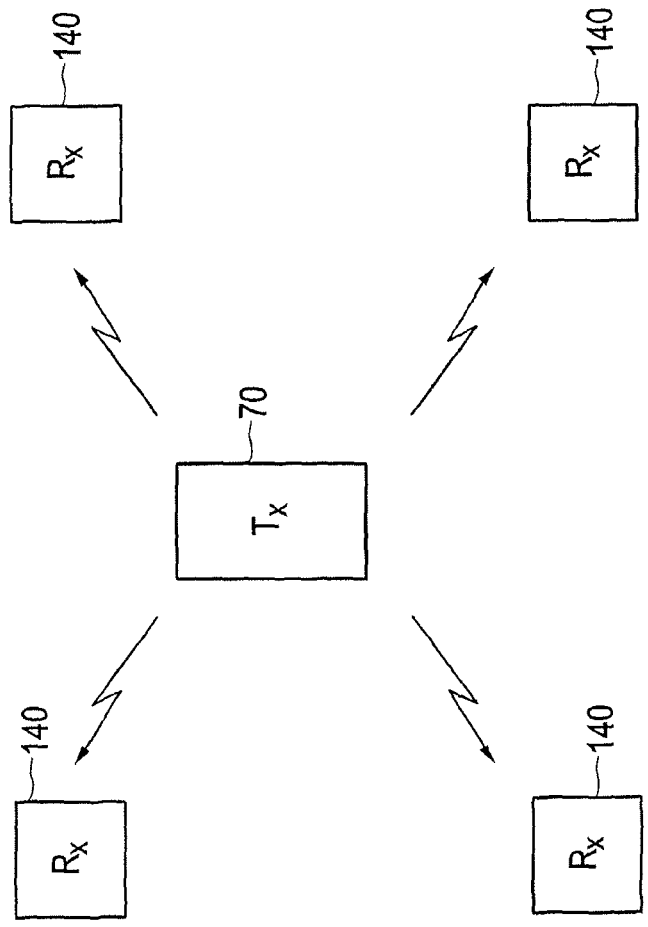
FIG. 21 shows a second embodiment of a broadcast system according to the present invention.

FIG. 21 shows another embodiment of a broadcast system in accordance with the present invention. In this embodiment, the transmitter 70 is used as depicted in FIG. 15. According to said embodiment, only a single type of frames F is used (i.e. no superframe structure of superframes F3 containing first and second frames F1, F2 is used, but another superframe structure containing only frames F), onto which the data blocks of the various data streams are mapped. The mapping is provided such that the data blocks are spread in time and frequency over various data symbols and various data segments of the frames F, such as, for instance, depicted in FIG. 10. Accordingly, only a single type of receivers 140 (preferably a mobile receiver) is provided in the broadcast system, which is designed to enable reception and decoding of data streams transmitted by said type of transmitter 70.

Figure 22:
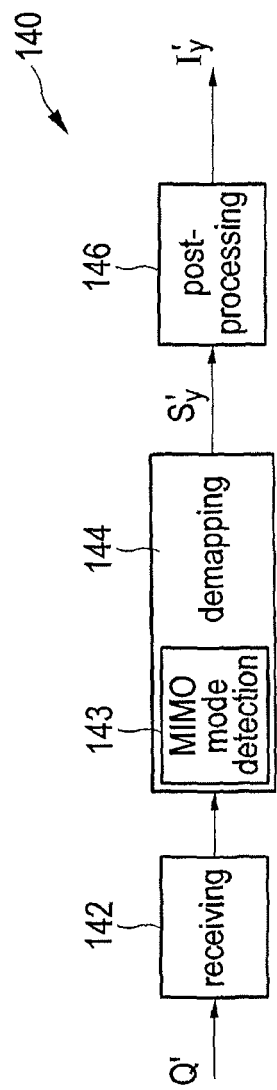
FIG. 22 shows another embodiment of a receiver according to the present invention used in said broadcast system shown in FIG. 21.
Figure 23:
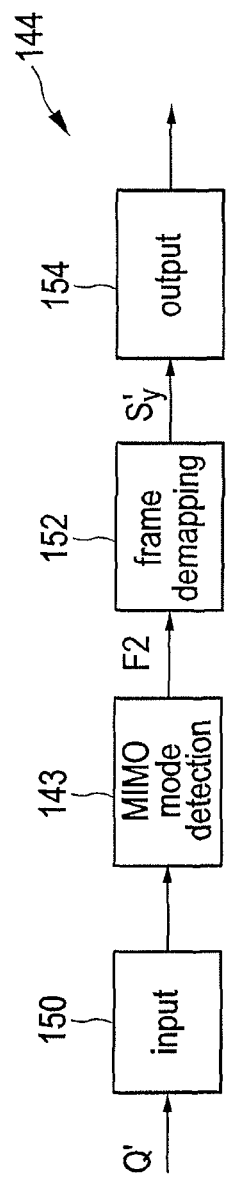
FIG. 23 shows a demapping apparatus of the receiver shown in FIG. 22.

The layout of such a receiver 140 is schematically shown in FIG. 22, which corresponds to the layout of the receivers 100, 120. The receiver 140 also comprises a receiving unit 142, a demapping apparatus 144 including a MIMO mode (and/or pilot pattern) detection unit 143, and a post-processing unit 146. However, particularly the demapping apparatus 144 is different as shown in FIG. 23. In particular, said demapping apparatus 144 does not comprise any stream demapping unit as provided in the demapping apparatus 104, 124 of the receivers 100, 120, since no superframe structure is used, but the demapping input data stream Q' only comprises a single type of frames. From the data input 150, said demapping input data stream Q' is provided to the MIMO mode (and/or pilot pattern) detection unit 143 and then to the frame demapping unit 152, by which the demapping output data stream Sy' is demapped, which is then outputted via the data output 154 for post-processing. The frame demapping unit 152 generally has the same layout and function as the frame demapping unit 134 of the demapping apparatus 124 of the second type (mobile) receiver 120, since the frame structure of the frames F used by the transmitter 70 is generally the same as the frame structure of the second frames F2 used by the transmitter 30. Of course, the same various embodiments exist also for the frame mapping unit 152 that have been explained above for the frame demapping unit 134.

For reception of the receiver input data stream Q', a single antenna and a single tuner is generally sufficient in the receiver. Receivers (e.g. mobile receivers) may, however, also be provided with two or more antennas and/or two or more tuner, which can particularly be used to advantage if the data blocks of the data stream that shall be received are spread (in time and/or frequency) over more than one data segment and/or data symbol. For instance, in case of spreading in time, a first antenna (and/or tuner) can be controlled to receive a first data block mapped onto a first data segment and the second antenna (and/or tuner) can be controlled to "look ahead" in time (e.g. be tuned to another frequency) for reception of the next data block mapped onto another data segment at the appropriate time. In another embodiment, in particular in case of spreading in frequency, both antennas (and/or tuners) can be controlled to receive the data blocks mapped onto the two data segments at the same time. In this way, tuning time in the receiver can be saved and more sleeping times for the receivers can possibly be provided. Further, in an embodiment, a receiver having two reception antennas can use the second reception antenna to "look ahead" and receive a second service (that is e.g. stored in the receiver) while the first reception antenna receives a first service, for whose reception the second reception antenna is not needed, i.e., for SISO or MISO scheme.

Preferably, at least two reception antennas are provided in a mobile receiver to make use of the various MIMO modes explained above. However, MIMO and MISO can also be used with transmitters and receivers having more than two antennas, and also Alamouti coding is just one example of a coding scheme used in MISO. Other space/time as well as space/frequency coding schemes can be used as well.

As explained above, it is one target of state of upcoming mobile broadcast standards such as NGH to provide mixed MIMO (or MISO) and SISO operation. This allows a higher level of flexibility, e.g. different services can be received with different robustness, decoding complexity or even receiver types (handheld, in-car, single or double reception antenna).

MIMO or MISO transmission schemes (both schemes are sometimes commonly denoted by the term MIXO) can be beneficial, because they exploit the spatial dimension (more robustness/higher data rates). However, SISO is still the more proven technique and requires only one transmission antenna. Introduction of MIXO for future broadcasting could be achieved by two approaches:

A) Introducing MIXO transmission could be done in a "hard cut" manner: change the complete network from SISO to MIMO and transmit from thereon with several (e.g., two) transmission antennas exclusively. It is to be noted that a typical MIXO scheme for broadcasting applies dual-polarized MIXO, i.e., one antenna element transmits with a vertically polarized component, the other element uses horizontally polarized radio waves B) For graceful introduction of MIXO schemes, it is possible to use SISO for some time, then change to MIXO, back to SISO and so on. In DVB-T2, the standard even allows to subsequently transmit a T2 Frame in SISO operation, while the next T2 Frame could use MISO.

Changing from MIXO to SISO transmission induces that during SISO transmission the second transmission antenna is switched off. This is however hardly possible, if the transmit towers radiate large transmission powers (as is typically done in terrestrial broadcasting).

Thus, having pure MIXO and SISO in subsequent (and rather short) time intervals is impossible, if the transmit antennas require a constant transmit power.

As explained above in segmented OFDM it is possible to use certain data segments (data slices) for SISO transmission, while others are used for MIXO providing in particular the advantage of reduced pilot overhead for channel estimation. Receivers for MIXO generally estimate twice the number of channels as two transmit antennas are used.

Figure 26C:
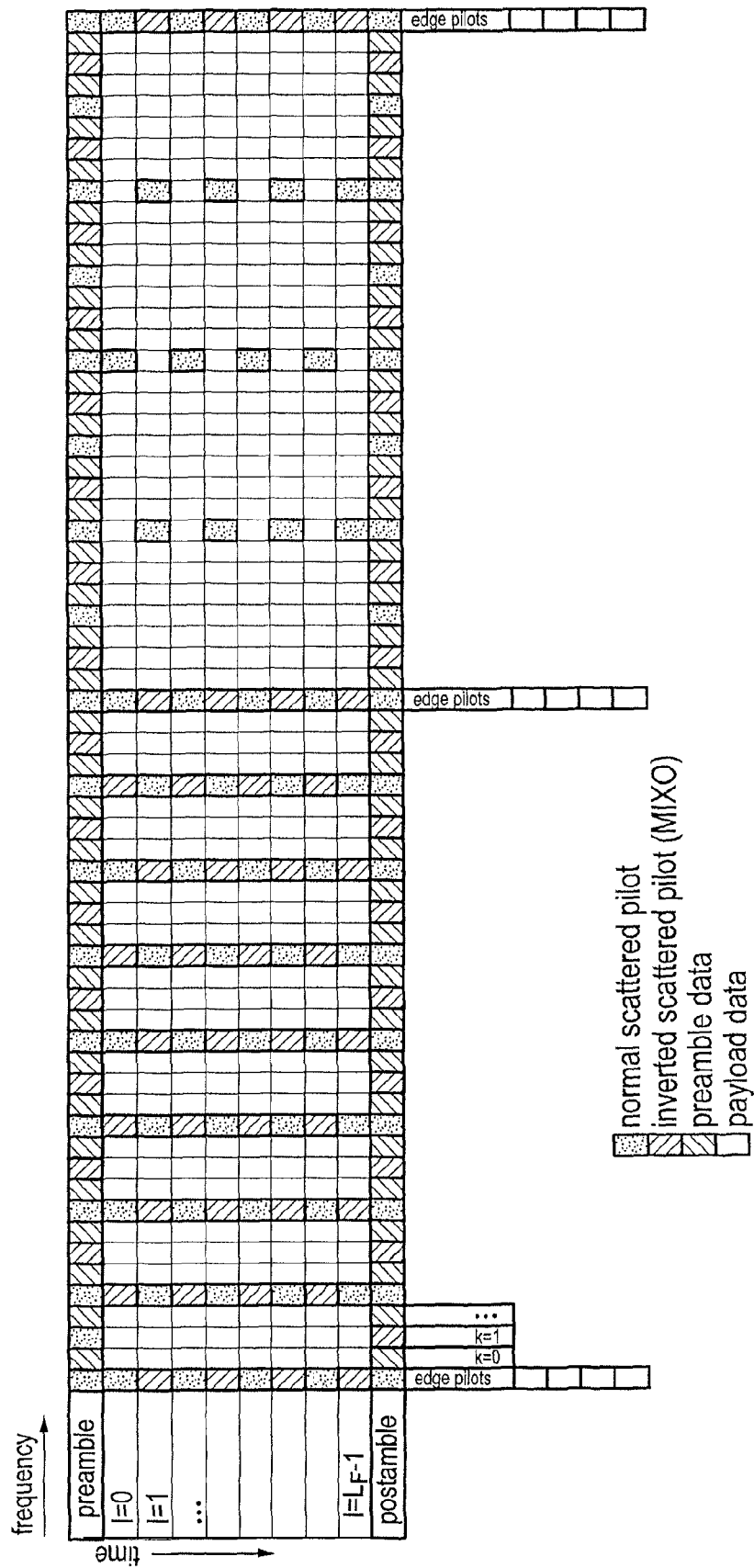

The general separation in frequency direction is depicted in FIG. 26C indicating the doubled amount of MIXO pilots. In principal, each segment might carry a different scheme (SISO, MISO or MIMO), e.g. five data segments carrying the schemes: SISO-MIXO-SISO-MIXO-MIXO.

Figure 27:
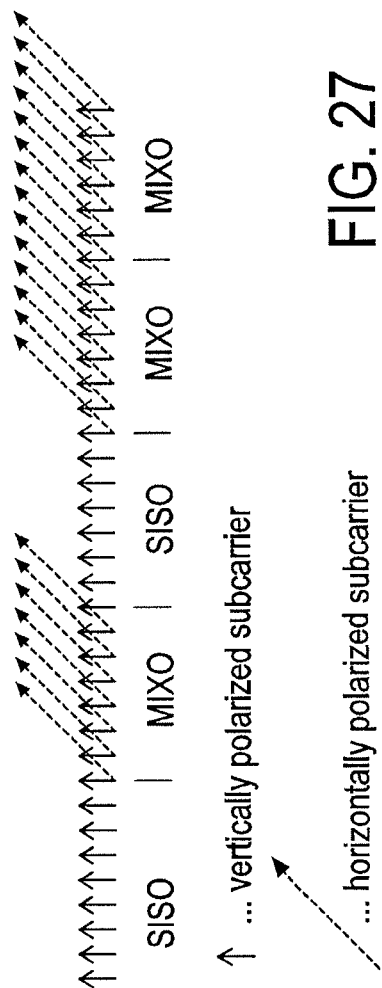
FIG. 27 shows a diagram illustrating a first embodiment how subcarriers are transmitted by two transmission antennas.

Assuming in an example that a first transmission antenna transmits data during SISO operation (e.g., the vertically polarized antenna), for MIXO further transmission antennas are used. In this example, only one further transmission antenna (i.e. a second antenna), which e.g. might be the horizontally polarized transmission antenna, is provided. Thus, in this example, all subcarriers of the segmented OFDM use the vertical component, while the subcarriers used in the MIXO segments further use the horizontal subcarriers (at the corresponding frequencies), as can be seen in FIG. 27.

While the vertically polarized OFDM signal can be generated by a normal OFDM modulation, the horizontal signal can be generated with two approaches.

In a first approach all subcarriers are set to zero, where no horizontal component is to be transmitted (i.e. in the SISO segments). Then, OFDM coding is performed using the complete bandwidth (of all data segments, including the SISO segments with the inserted zeros in frequency domain), i.e. single OFDM symbols are formed for the horizontally polarized subcarriers.

In a second approach a narrowband OFDM coding is performed for each MIXO data segment in the equivalent complex baseband and the individual signals are mixed to the center frequencies of each corresponding data segment. In the example, two OFDM signals are generated, one with ⅕ and another one with ⅖ of the complete bandwidth. The first one OFDM signal is shifted to the second data segment, the other OFDM signal is shifted to the last two data segments. However, frequency and time synchronization generally need to be rather accurate.

Both approaches generally yield the same result, which can be interpreted as using zero-padding for SISO subcarriers, i.e. those subcarriers which are not transmitted over a particular transmission antenna.

A further possible solution would be that the horizontal subcarriers in the SISO data segments are not filled with zeros, but rather are replaced by the same symbols as used in the SISO part, which are transmitted over the vertical antenna. However, typically, there is a rather large cross-polar discrimination (XPD, about 10 dB), which means that the horizontally SISO segments are received by a pure SISO receiver with smaller power (up to 3 dB loss, if two antennas are used in the MIMO or MISO scheme).

As typically both transmission antennas should radiate the same power, the subcarriers of the MIXO data segments are preferably be boosted by an appropriate scaling factor (indicated by larger arrays in FIG. 27). As discussed above, each component may use half of the overall transmission power. Since the horizontally polarized subcarriers occur in only ⅗ of the complete bandwidth, the power of these subcarriers can be boosted by a factor of ⅗ compared to the subcarriers of the vertical component (which occur in the complete bandwidth). In summary, this approach splits the overall transmit power (that would be used for SISO-only transmission) into two equal parts. However, the second (MIXO) part is distributed over just some of the data segments, while on other data segments no power is radiated. Thus, the power of the MIXO data segments is boosted. More precisely, the power inside the MIXO data segments of the additional antennas, which are used for MIXO, is boosted compared to the power of the antenna, which is used for both SISO and MIXO.

However, there could be practical problems, as the receiver would typically detect the power imbalances between the different transmitted signals. For most MIXO schemes, this impedes decoding. Thus, power imbalances between the transmitter components should preferably be avoided in some cases. The following approach enables this.

For the following example the overall transmission power (which would be used for SISO-only transmission and which would be transmitted over all N_seg segments) is denoted as P_SISO, the number of MIXO data segments is denoted by N_MIXO and the number of transmission antennas used for MIXO is denoted by N_ant. Then all subcarriers of both transmission antennas are down-scaled (compared to the SISO-only case) by a factor such that the overall radiated power is still P_SISO.

More precisely, the downscaling of the power for all subcarriers is, for instance, computed by the factor D=P_SISO/(N_seg−N_MIXO+N_ant*N_MIXO). The downscaling of the magnitudes of all subcarriers is done appropriately with $\sqrt{D}$.

Figure 28:
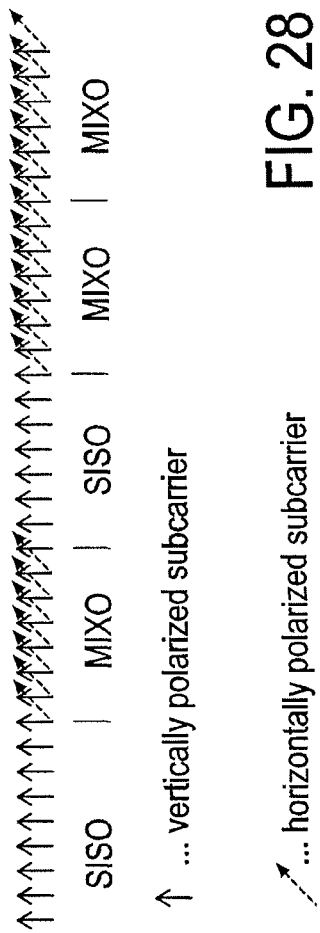
FIG. 28 shows a diagram illustrating a second embodiment how subcarriers are transmitted by two transmission antennas.

FIG. 28 depicts the scenario: the transmission antennas radiate in general different powers in total; however, the sum of those powers equals P_SISO. Further, it is ensured that all subcarriers use the same transmission power such that there is no power imbalance.

The second antenna (horizontal) in this example could in addition be used to further reduce the peak-to-average power ratio (PAPR—typical problem for OFDM). Moreover, in an embodiment some non-zero symbols are inserted, e.g. tone reservation carriers at the positions of the pilots. Newly inserted pilots however still need to be orthogonal to the original SISO pilots, i.e. all related channel estimation functionalities need to be maintained. Preferably, the boosting factor explained above should then be reduced accordingly. Thus, these newly inserted pilots do not disturb the original pilots, if the receiver treats them as MIXO pilots, thereby eliminating the new pilots. This could be exploited to further reduce the PARP by selecting the pilots appropriately. For instance, in a brute force approach all permutations are tried and the one is selected, which minimizes the PAPR.

Figure 29A:
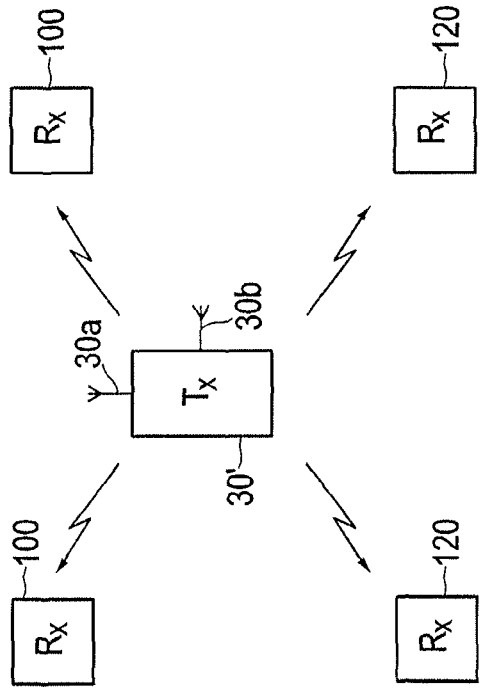
FIG. 29 shows two embodiments of a broadcast system according to the present invention using different types of antennas in the transmission apparatus.
Figure 29B:
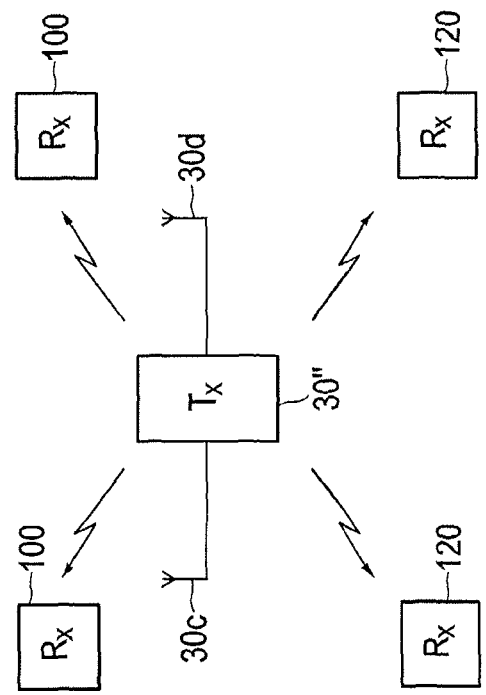

As mentioned above, the further transmission antennas use differently polarized subcarriers than the first antenna. For instance, in an embodiment of a transmission apparatus 30' as depicted in FIG. 29A a first transmission antenna 30a uses vertically polarized subcarriers, while a second transmission antenna 30b (and still further transmission antennas, if available and used) uses horizontally polarized subcarriers. Alternatively, the various antennas may use different circular polarizations. In still another alternative embodiment of a transmission apparatus 30" as shown in FIG. 29B the various transmission antennas 30c, 30d may be located at considerable distances from each other, i.e. not at substantially the same place, and use the same polarization.

Next, a further embodiment of a transmission apparatus for use in various broadcast systems is described.

Generally, SISO transmissions use only one transmission antenna, while MIXO transmissions take advantage of several transmission antennas (wherein two transmission antennas is the most likely case in the upcoming DVB-NGH systems).

Figure 30A:
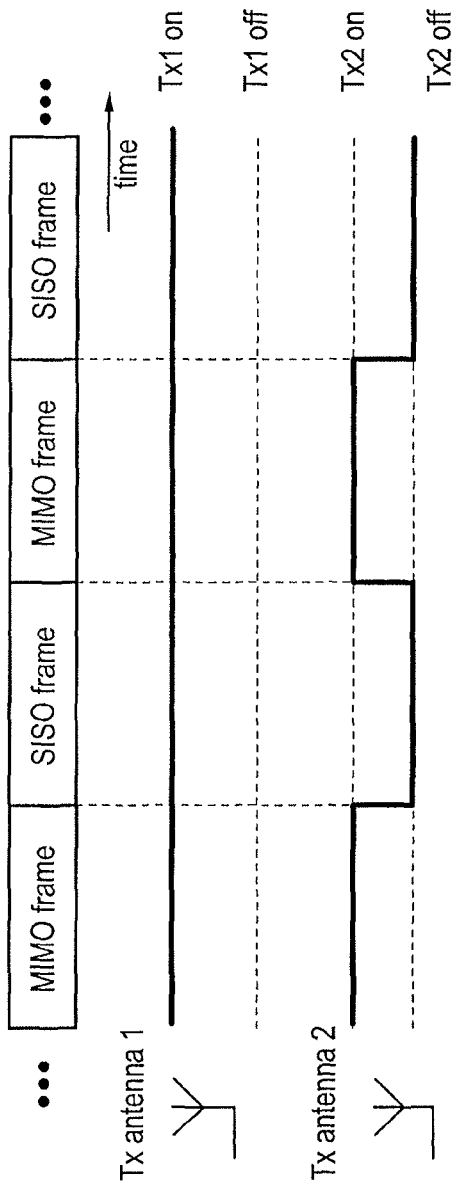
FIG. 30 illustrates a further transmission apparatus and the assignment of transmission power to its transmission antennas.

If MIMO and SISO services are mixed in time, e.g. partitioned by the help of frames, it occurs that one transmission antenna operates constantly, while the second (and further) transmission antenna only transmits during the MIXO transmission periods as schematically shown in FIG. 30A for mixed MIMO/SISO operation.

In order to achieve the same overall transmission power level on the channel the SISO power level of the single transmission antenna generally should be 3 dB higher compared to the power level on each of the two MIXO transmission antennas, i.e. during MIXO operation the same power has to be radiated as in SISO operation, thus splitting the power onto two transmission antennas (3 dB loss).

Having different power levels on different transmission antennas is generally no problem for transmission systems with limited transmission power levels (WLAN, WIMAX, LTE, . . . ). These systems can easily switch between different MIMO and SISO schemes. This is different for large scale transmission systems, e.g. nationwide terrestrial broadcast systems such as DVB-T2 or the upcoming NGH standard systems. The transmission apparatus of these broadcast networks typically covers very large areas, therefore the transmission power level needs to very high. It is quite difficult to switch on and off frequently blocks of a high power level signal chain, which would be needed on the second transmission path of the NGH MIMO scheme (during SISO transmission periods).

It is therefore proposed to allocate the power level in a way that it is kept constant over the different transmission periods (i.e. SISO and MIXO frames). This means that the SISO transmission power (being so far fed to a single transmit antenna) is split up to the two (or more) transmission paths. Logically the two transmission paths build therefore a kind of SFN (Single Frequency Network).

Figure 30B:
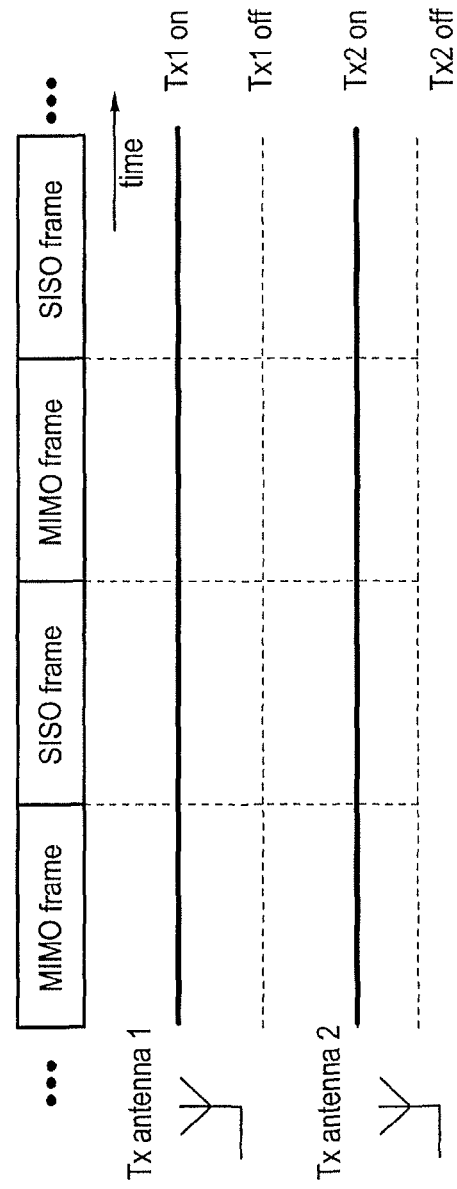

FIG. 30B shows the now constant power allocation across the different MIMO and SISO operation periods. Each transmission antenna radiates the same power. Preferably, the additional MIXO antennas (here only the second antenna) duplicate the data from the original SISO antenna, i.e., during the SISO frames, both transmission antennas transmit the same data.

For fixed reception conditions (i.e. where the polarization of the reception is aligned to the transmission polarization) the received signal strength might be decreased by 3 dB. On the other hand, portable and mobile receivers gain from the increased polarization diversity, as different reception angles can always deploy the overlaid (or combined) reception field strengths of both transmission polarizations. Mobile receivers will in average have therefore better reception conditions. This is even more true if reception diversity with different receiver paths (e.g. orthogonal reception antennas) is applied.

In summary, the present invention enables the use of narrow-band receivers having a low power consumption even if the frame structure used by the transmitter of the multi-carrier broadcast system has a much broader channel bandwidth. Further, various embodiments are provided, which enable further savings in power consumption of receivers, which is particularly important for mobile receivers. Still further, an increased or at least selectable robustness for selected services due to the use of time and/or frequency diversity in the mapping of data blocks of the services onto frames having a segmented frame structure can be achieved.

A data segment of the payload portion can be used only for a single data stream or can be split up in time and/or frequency direction for use by data blocks of two or more data streams. The respective use of the data segment, i.e. the mapping of the data blocks of the various data streams on the data segments of the frames, can be static (i.e. continuously fixed) for the whole transmission of a data stream, can be quasi-static (i.e. fixed for a group of frames or only a single frame, i.e. can be changed from frame to frame) or can be continuously changed (i.e. also with frames). In the latter embodiments more signalling is required compared to the first (static) embodiment.

Further, according to the present invention various levels of robustness and various data rates can be selected by the transmitter and can be received by the receiver through the ability to select the MIMO mode and/or the pilot pattern per PLP and/or per data slice. For instance, a low resolution data stream can be transmitted using SISO or MISO and a corresponding high resolution data stream can be transmitted in MIMO.

The invention also enables the application of scalable video coding, according to which the same data are transmitted as a high resolution data stream (with lower robustness) and as a low resolution data stream (with higher robustness). If the receiver is, e.g. due to bad reception conditions, not able to receive the high resolution data stream it can switch to the corresponding ("associated") low resolution data stream.

The invention has been illustrated and described in detail in the drawings and foregoing description, but such illustration and description are to be considered illustrative or exemplary and not restrictive. The invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfil the functions of several items recited in the claims. The mere fact that certain measures are recited in mutually different dependent claims does not indicate that a combination of these measures cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems.

Any reference signs in the claims should not be construed as limiting the scope.

In an embodiment of the receiver said MIMO mode detection means is adapted for detecting one of a SISO scheme, MISO scheme or MIMO scheme.

In an embodiment of the receiver said MIMO mode detection means is adapted for detecting the MIMO mode from frame to frame or from a group of frames to a next group of frames.

In an embodiment of the receiver said MIMO mode detection means is adapted for detecting the MIMO mode from data symbol to data symbol or from a group of data symbols to a next group of data symbols.

In an embodiment of the receiver said pilot pattern detection means is adapted for detecting edge pilots between neighboring data segments, said edge pilots fitting with the pilot patterns of both neighboring data segments.

In an embodiment of the receiver said pilot pattern detection means is adapted for detecting the pilot pattern from frame to frame or from a group of frames to a next group of frames.

In an embodiment of the receiver said pilot pattern detection means is adapted for detecting the pilot pattern from data symbol to data symbol or from a group of data symbols to a next group of data symbols.

In an embodiment of the receiver said MIMO mode detection means and/or said pilot pattern detection means is adapted for demapping signalling information from said frame, said signalling information including MIMO mode information indicating the selected MIMO mode of the data blocks per data segment and/or per mapping input data stream and/or pilot pattern information indicating the selected pilot pattern per data segment and/or per mapping input data stream.

In an embodiment of the receiver said frame demapping means is adapted for demapping said signalling information from one or more preamble signalling blocks mapped onto preamble symbols of a preamble portion of said frames, from one or more payload portion signalling blocks mapped onto data symbols of said payload portion or in-band from one or more data blocks mapped onto data symbols of said payload portion.

In an embodiment of the receiver it comprises one or more demapping units per reception path of a receiver, into which said apparatus is included, wherein said one or more demapping units are adapted for individually demapping the data blocks from the provided demapping input data stream.

In an embodiment of the receiver at least one demapping unit comprises decoding means for decoding the data blocks provided to said at least one demapping unit.

In an embodiment of the receiver said frame demapping means is adapted for demapping the data blocks of a demapping output data stream from various data symbols and various data segments of said frame, over which said data blocks are spread in time and frequency.

In an embodiment of the receiver said receiving unit comprises at least two receiving sub-units for receiving different demapping input data streams, and said receiver apparatus further comprises a control unit for switching off at least one receiving sub-units or for combining the reception signal received by said receiving sub-unit, if the MIMO mode detection unit has detected that the demapping input data stream currently received uses SISO scheme or MISO scheme.

The invention claimed is:

1. A transmission apparatus for transmitting data within a multi-carrier broadcast system, comprising:
processing circuitry configured to
map payload data of mapping input data streams onto a mapping output data stream having a channel frequency bandwidth for transmission in a multi-carrier broadcast system by
receiving at least two mapping input data streams each being subdivided into data blocks carrying payload data,
mapping the data blocks of said at least two mapping input data streams onto frames of said mapping output data stream, each frame covering a total channel frequency bandwidth of said channel frequency bandwidth, each frame comprising a payload portion, said payload portion comprising a plurality of data symbols and being segmented into data segments each covering a frequency bandwidth portion of said channel frequency bandwidth, wherein the processing circuitry is configured to map the data blocks of said at least two mapping input data streams onto the data symbols of said payload portion and select a MIMO mode of the data blocks for each data segment and/or for each mapping input data stream, such that said mapping output data stream includes at least one frame including two different MIMO modes for transmission within the transmission time of a single frame on at least two different data segments of said data segments each covering a frequency bandwidth portion of said channel frequency bandwidth, said two different MIMO modes selected from a SISO scheme, a MISO scheme, and a MIMO scheme, and
outputting said mapping output data stream; and
control transmission of said mapping output data stream.

2. The transmission apparatus as claimed in claim 1, wherein said processing circuitry is configured to change the MIMO mode from frame to adjacent frame or from a group of frames to a next adjacent group of frames.

3. The transmission apparatus as claimed in claim 1, wherein said processing circuitry is configured to map the data blocks onto the data symbols of the data segments such that the MIMO mode changes from data symbol to data symbol or from a group of data symbols to a next group of data symbols within a same frame.

4. A transmission apparatus for transmitting data within a multi-carrier broadcast system, comprising:
processing circuitry configured to
map payload data of mapping input data streams onto a mapping output data stream having a channel frequency bandwidth for transmission in a multi-carrier broadcast system by
receiving at least two mapping input data streams each being subdivided into data blocks carrying payload data,
mapping the data blocks of said at least two mapping input data streams onto frames of said mapping output data stream by mapping the data blocks of a first group of received mapping input data streams onto first frames having a first frame structure for use by receivers of a first type, mapping the data blocks of a second group of received mapping input data streams onto second frames having a second frame structure different from the first frame structure for use by receivers of a second type, and forming said mapping output data stream by alternately arranging one or more first and one or more second frames, each frame covering a total channel frequency bandwidth of said channel frequency bandwidth, each frame comprising a payload portion, said payload portion comprising a plurality of data symbols and being segmented into data segments each covering a frequency bandwidth portion of said channel frequency bandwidth, wherein the processing circuitry is configured to map the data blocks of said at least two mapping input data streams onto the data symbols of said payload portion and select a pilot pattern for each data segment and/or for each mapping input data stream, such that said mapping output data stream includes at least two different pilot patterns, and
outputting said mapping output data stream; and
control transmission of said mapping output data stream.

5. The transmission apparatus as claimed in claim 4,
wherein said processing circuitry is configured to increase pilot density in time and/or frequency direction, or increase the pilot density depending on a number of transmission antennas and/or a desired robustness level.

6. The transmission apparatus as claimed in claim 4,
wherein said processing circuitry is configured to provide edge pilots for one or more neighboring data segments, said edge pilots fitting with the pilot patterns of said one or more neighboring data segments.

7. The transmission apparatus as claimed in claim 4,
wherein said processing circuitry is configured to change the pilot pattern from frame to adjacent frame or from a group of frames to a next adjacent group of frames.

8. The transmission apparatus as claimed in claim 4,
wherein said processing circuitry is configured to map the data blocks onto the data symbols of the data segments such that the pilot pattern changes from data symbol to data symbol or from a group of data symbols to a next group of data symbols within a same frame.

9. The transmission apparatus as claimed in claim 1 or 4,
wherein said processing circuitry is configured to store, in respective buffers per mapping input data stream, pre-processed data blocks of an associated mapping input data stream therein until they are mapped onto a frame, and
wherein said processing circuitry is configured to retrieve data blocks from said respective buffers and map them onto a data segment of a frame, if sufficient data blocks are stored therein for filling a complete data symbol.

10. The transmission apparatus as claimed in claim 1 or 4,
wherein said processing circuitry is configured to map the data blocks of said at least two mapping input data streams onto the data segments of a frame such that into a data segment only data blocks having the same MIMO mode and/or pilot pattern are mapped.

11. The transmission apparatus as claimed in claim 1,
wherein said processing circuitry is configured to map signalling information into said frame, said signalling information including MIMO mode information indicating the selected MIMO mode of the data blocks per data segment and/or per mapping input data stream.

12. The transmission apparatus as claimed in claim 1 or 4,
wherein said processing circuitry is configured to individually map, per each transmission path of a transmitter into which said apparatus is included, substantially same data blocks of a provided mapping input data stream onto individual frames.

13. The transmission apparatus as claimed in claim 1, further comprising:
a further processing circuitry configured to map the data blocks of a first group of received mapping input data streams onto first frames having a first frame structure covering said channel frequency bandwidth for use by receivers of a first type,
wherein said processing circuitry is configured to
map the data blocks of a second group of received mapping input data streams onto second frames having a second frame structure covering said channel frequency bandwidth for use by receivers of a second type, which second frame structure is different from the first frame structure, and
form said mapping output data stream by alternately arranging one or more first and one or more second frames.

14. A transmission method, implemented by a transmission apparatus, for transmitting data within a multi-carrier broadcast system, comprising:
a method for mapping payload data of mapping input data streams onto a mapping output data stream having a channel frequency bandwidth for transmission in a multi-carrier broadcast system; and
transmitting said mapping output data stream,
wherein said method for mapping includes
receiving at least two mapping input data streams each being subdivided into data blocks carrying payload data,
mapping, by processing circuitry of said transmission apparatus, the data blocks of said at least two mapping input data streams onto frames of said mapping output data stream, each frame covering a total channel frequency bandwidth of said channel frequency bandwidth, each frame comprising a payload portion, said payload portion comprising a plurality of data symbols and being segmented into data segments each covering a frequency bandwidth portion of said channel frequency bandwidth, wherein the data blocks of said at least two mapping input data streams are mapped onto the data symbols of said payload portion,
selecting a MIMO mode of the data blocks for each data segment and/or for each mapping input data stream, such that said mapping output data stream includes at least one frame including two different MIMO modes for transmission within the transmission time of a single on at least two different data segments of said data segments each covering a frequency bandwidth portion of said channel frequency bandwidth, said two different MIMO modes selected from a SISO scheme, a MISO scheme, and a MIMO scheme, and
outputting said mapping output data stream.

15. A transmission method, implemented by a transmission apparatus, for transmitting data within a multi-carrier broadcast system, comprising:
a method for mapping payload data of mapping input data streams onto a mapping output data stream having a channel frequency bandwidth for transmission in a multi-carrier broadcast system; and
transmitting said mapping output data stream,
wherein said method for mapping includes
receiving at least two mapping input data streams each being subdivided into data blocks carrying payload data,
mapping, by processing circuitry of said transmission apparatus, the data blocks of said at least two mapping input data streams onto frames of said mapping output data stream by mapping the data blocks of a first group of received mapping input data streams onto first frames having a first frame structure for use by receivers of a first type, mapping the data blocks of a second group of received mapping input data streams onto second frames having a second frame structure different from the first frame structure for use by receivers of a second type, and forming said mapping output data stream by alternately arranging one or more first and one or more second frames, each frame covering a total channel frequency bandwidth of said channel frequency bandwidth, each frame comprising a payload portion, said payload portion comprising a plurality of data symbols and being segmented into data segments each covering a frequency bandwidth portion of said channel frequency bandwidth, wherein the data blocks of said at least two mapping input data streams are mapped onto the data symbols of said payload portion, selecting a pilot pattern of the data blocks for each data segment and/or for each mapping input data stream, such that said mapping output data stream includes at least two different pilot patterns, and outputting said mapping output data stream.

16. A receiver apparatus for receiving data within a multi-carrier broadcast system, comprising:

processing circuitry configured to control reception of a demapping input data stream having a frame structure; and demap a demapping input data stream having a channel frequency bandwidth received in said multi-carrier broadcast system into a demapping output data stream by receiving said demapping input data stream comprising frames, each frame having a frame structure covering a total channel frequency bandwidth of said channel frequency bandwidth, wherein data blocks of a group of received mapping input data streams, each being subdivided into data blocks carrying payload data, are mapped onto said frames, demapping said frames comprising a payload portion into said demapping output data stream, wherein said processing circuitry is configured for the data blocks of said demapping output data stream from the payload portion, wherein payload data are mapped onto the payload portion comprising a plurality of data symbols carrying payload data of at least two mapping input data streams, said payload portion being segmented into data segments each covering a frequency bandwidth portion of said channel frequency bandwidth, detecting a MIMO mode of the data blocks for each data segment and/or for each mapping input data stream, said demapping input data stream including at least one frame including two different MIMO modes for transmission within the transmission time of a single frame on at least two different data segments of said data segments each covering a frequency bandwidth portion of said channel frequency bandwidth, said two different MIMO modes selected from a SISO scheme, a MISO scheme, and a MIMO scheme, and outputting said demapping output data stream.

17. A receiver apparatus for receiving data within a multi-carrier broadcast system, comprising:

processing circuitry configured to control reception of a demapping input data stream having frames of alternately arranged one or more first and one or more second frames, said one or more first frames having first data blocks mapped in a first frame structure for use by receivers of a first type, said one or more second frames having second data blocks mapped in a second frame structure for use by receivers of a second type different from said first type; and demap a demapping input data stream having a channel frequency bandwidth received in said multi-carrier broadcast system into a demapping output data stream by receiving said demapping input data stream comprising said frames, each frame covering a total channel frequency bandwidth of said channel frequency bandwidth, wherein said first data blocks and said second data blocks include data blocks of respective first and second groups of received mapping input data streams, each being subdivided into data blocks carrying payload data, demapping said frames comprising a payload portion into said demapping output data stream, wherein said processing circuitry is configured for the data blocks of said demapping output data stream from the payload portion, wherein payload data are mapped onto the payload portion comprising a plurality of data symbols carrying payload data of said first and second groups of received mapping input data streams, said payload portion being segmented into data segments each covering a frequency bandwidth portion of said channel frequency bandwidth, detecting the pilot pattern of the data blocks for each data segment and/or for each mapping input data stream, said demapping input data stream including at least two different pilot patterns, and outputting said demapping output data stream.

18. A receiving method, implemented by a receiver apparatus, for receiving data within a multi-carrier broadcast system, comprising:

receiving a demapping input data stream having a frame structure; and a method for demapping a demapping input data stream having a channel frequency bandwidth received in said multi-carrier broadcast system into a demapping output data stream, wherein said method for demapping includes receiving said demapping input data stream comprising frames, each frame having a frame structure covering a total channel frequency bandwidth of said channel frequency bandwidth, wherein data blocks of a group of received mapping input data streams, each being subdivided into data blocks carrying payload data, are mapped onto said frames, demapping, by processing circuitry of said receiver apparatus, said frames comprising a payload portion into said demapping output data stream, wherein the data blocks of said demapping output data stream are demapped from the payload portion, wherein payload data are mapped onto the payload portion comprising a plurality of data symbols carrying payload data of at least two mapping input data streams, said payload portion being segmented into data segments each covering a frequency bandwidth portion of said channel frequency bandwidth, detecting a MIMO mode of the data blocks for each data segment and/or for each mapping input data stream, said demapping input data stream including at least one frame including two different MIMO modes for transmission within the transmission time of a single frame on at least two different data segments of said data segments each covering a frequency bandwidth portion of said channel frequency bandwidth, said two different MIMO modes selected from a SISO scheme, a MISO scheme, and a MIMO scheme, and outputting said demapping output data stream.

19. A receiving method, implemented by a receiver apparatus, for receiving data within a multi-carrier broadcast system, comprising:

receiving a demapping input data stream having frames of alternately arranged one or more first and one or more second frames, said one or more first frames having first data blocks mapped in a first frame structure for use by receivers of a first type, said one or more second frames having second data blocks mapped in a second frame structure for use by receivers of a second type different from said first type; and a method for demapping a demapping input data stream having a channel frequency bandwidth received in said multi-carrier broadcast system into a demapping output data stream, wherein said method for demapping includes receiving said demapping input data stream comprising said frames, each frame covering a total channel frequency bandwidth of said channel frequency bandwidth, wherein said first data blocks and said second data blocks include data blocks of respective first and second groups of received mapping input data streams, each being subdivided into data blocks carrying payload data, demapping, by processing circuitry of said receiver apparatus, said frames comprising a payload portion into said demapping output data stream, wherein the data blocks of said demapping output data stream are demapped from the payload portion, wherein payload data are mapped onto the payload portion comprising a plurality of data symbols carrying payload data of said first and second groups of received mapping input data streams, said payload portion being segmented into data segments each covering a frequency bandwidth portion of said channel frequency bandwidth, detecting a pilot pattern of the data blocks for each data segment and/or for each mapping input data stream, said demapping input data stream including at least two different pilot patterns, and outputting said demapping output data stream.

20. A non-transitory computer-readable recording medium that stores therein a computer program product which, when executed by a processor, causes the method according to claim 14, 15, 18, or 19 to be performed by the processor.

21. A multi-carrier broadcast system for transmitting and receiving data comprising:
a) the transmission apparatus as claimed in claim 1 or 4 for transmitting data; and
b) a receiver apparatus for receiving data, the receiver apparatus including processing circuitry configured to
control reception of a demapping input data stream having a frame structure, and
demap a demapping input data stream having a channel frequency bandwidth received in said multi-carrier broadcast system into a demapping output data stream by
receiving said demapping input data stream comprising frames, each frame having a frame structure covering a total channel frequency bandwidth of said channel frequency bandwidth, wherein data blocks of a group of received mapping input data streams, each being subdivided into data blocks carrying payload data, are mapped onto said frames,
demapping said frames comprising a payload portion into said demapping output data stream, wherein said processing circuitry is configured for the data blocks of said demapping output data stream from the payload portion, wherein payload data are mapped onto the payload portion comprising a plurality of data symbols carrying payload data of at least two mapping input data streams, said payload portion being segmented into data segments each covering a frequency bandwidth portion of said channel frequency bandwidth,
detecting a MIMO mode of the data blocks for each data segment and/or for each mapping input data stream, said demapping input data stream including at least one frame including two different MIMO modes for transmission within the transmission time of a single frame on at least two different data segments of said data segments each covering a frequency bandwidth portion of said channel frequency bandwidth, said two different MIMO modes selected from a SISO scheme, a MISO scheme, and a MIMO scheme, and
outputting said demapping output data stream.

22. A multi-carrier broadcast method for transmitting and receiving data comprising:
a) the transmission method as claimed in claim 14 or 15 for transmitting data; and
b) a receiving method for receiving data, including
receiving a demapping input data stream having frames of alternately arranged one or more first and one or more second frames, said one or more first frames having first data blocks mapped in a first frame structure for use by receivers of a first type, said one or more second frames having second data blocks mapped in a second frame structure for use by receivers of a second type different from said first type, and
a method for demapping a demapping input data stream having a channel frequency bandwidth received in said multi-carrier broadcast system into a demapping output data stream,
wherein said method for demapping includes
receiving said demapping input data stream comprising said frames, each frame covering a total channel frequency bandwidth of said channel frequency bandwidth, wherein said first data blocks and said second data blocks include data blocks of respective first and second groups of received mapping input data streams, each being subdivided into data blocks carrying payload data,
demapping, by processing circuitry of said receiver apparatus, said frames comprising a payload portion into said demapping output data stream, wherein the data blocks of said demapping output data stream are demapped from the payload portion, wherein payload data are mapped onto the payload portion comprising a plurality of data symbols carrying payload data of said first and second groups of received mapping input data streams, said payload portion being segmented into data segments each covering a frequency bandwidth portion of said channel frequency bandwidth,
detecting a MIMO mode of the data blocks for each data segment and/or for each mapping input data stream, said demapping input data stream including at least two different MIMO modes selected from a SISO scheme, a MISO scheme, and a MIMO scheme, and
outputting said demapping output data stream.

23. A transmission system comprising:
a) a transmission apparatus for transmitting data of a mapping output data stream within a multi-carrier broadcast system, said mapping output data stream including at least one frame including two different MIMO modes for transmission within the transmission time of a single frame on at least two different data segments, said data segments each covering a frequency bandwidth portion of said at least one frame, said at least one frame covering a total channel frequency bandwidth of the multi-carrier broadcast system, said two different MIMO modes selected from a SISO scheme, a MISO scheme, and a MIMO scheme, said transmission apparatus comprising:

at least two transmission antennas, wherein a first transmission antenna is adapted for transmission of data blocks mapped onto data frames in any MIMO mode and wherein the further transmission antennas are adapted for transmission of data blocks mapped onto data frames in a MISO scheme or a MIMO scheme;

wherein the one or more further antennas are adapted for also transmitting data during times when the first transmission antenna is transmitting data blocks mapped onto data frames in a SISO scheme; and wherein said further transmission antennas are adapted for each substantially using the same transmission power as the first transmission antenna; and b) one or more receiving apparatuses, each comprising one or more antennas, for receiving data transmitted from the transmission apparatus.

24. The transmission system as claimed in claim 23, wherein said one or more further antennas of the transmission apparatus are adapted for transmitting, during times when the first transmission antenna is transmitting data blocks mapped onto data frames in the SISO scheme, same data as the first antenna.

25. A multi-carrier broadcast system for transmitting and receiving data comprising:

a) the transmission apparatus as claimed in claim 1 or 4 for transmitting data; and b) a receiver apparatus for receiving data, the receiver apparatus including processing circuitry configured to
control reception of a demapping input data stream having frames of alternately arranged one or more first and one or more second frames, said one or more first frames having first data blocks mapped in a first frame structure for use by receivers of a first type, said one or more second frames having second data blocks mapped in a second frame structure for use by receivers of a second type different from said first type, and
demap a demapping input data stream having a channel frequency bandwidth received in said multi-carrier broadcast system into a demapping output data stream by
receiving said demapping input data stream comprising said frames, each frame covering a total channel frequency bandwidth of said channel frequency bandwidth, wherein said first data blocks and said second data blocks include data blocks of respective first and second groups of received mapping input data streams, each being subdivided into data blocks carrying payload data,
demapping said frames comprising a payload portion into said demapping output data stream, wherein said processing circuitry is configured for the data blocks of said demapping output data stream from the payload portion, wherein payload data are mapped onto the payload portion comprising a plurality of data symbols carrying payload data of said first and second groups of received mapping input data streams, said payload portion being segmented into data segments each covering a frequency bandwidth portion of said channel frequency bandwidth,
detecting a pilot pattern of the data blocks for each data segment and/or for each mapping input data stream, said demapping input data stream including at least two different pilot patterns, and
outputting said demapping output data stream.

26. A multi-carrier broadcast method for transmitting and receiving data comprising:

a) the transmission method as claimed in claim 14 or 15 for transmitting data; and b) a receiving method for receiving data, including
receiving a demapping input data stream having frames of alternately arranged one or more first and one or more second frames, said one or more first frames having first data blocks mapped in a first frame structure for use by receivers of a first type, said one or more second frames having second data blocks mapped in a second frame structure for use by receivers of a second type different from said first type, and
a method for demapping a demapping input data stream having a channel frequency bandwidth received in said multi-carrier broadcast system into a demapping output data stream,
wherein said method for demapping includes
receiving said demapping input data stream comprising said frames, each frame covering a total channel frequency bandwidth of said channel frequency bandwidth, wherein said first data blocks and said second data blocks include data blocks of respective first and second groups of received mapping input data streams, each being subdivided into data blocks carrying payload data,
demapping, by processing circuitry of said receiver apparatus, said frames comprising a payload portion into said demapping output data stream, wherein the data blocks of said demapping output data stream are demapped from the payload portion, wherein payload data are mapped onto the payload portion comprising a plurality of data symbols carrying payload data of said first and second groups of received mapping input data streams, said payload portion being segmented into data segments each covering a frequency bandwidth portion of said channel frequency bandwidth,
detecting a pilot pattern of the data blocks for each data segment and/or for each mapping input data stream, said demapping input data stream including at least two different pilot patterns, and
outputting said demapping output data stream.

27. The transmission apparatus as claimed in claim 4,
wherein said processing circuitry is configured to map signaling information into said frame, said signaling information including MIMO mode information indicating the selected pilot pattern information indicating the selected pilot pattern per data segment and/or per mapping input data stream.

* * * * *

UNITED STATES PATENT AND TRADEMARK OFFICE
CERTIFICATE OF CORRECTION

| | | Page 1 of 1 |
|---|---|---|
| PATENT NO. | : 9,236,927 B2 | |
| APPLICATION NO. | : 13/579727 | |
| DATED | : January 12, 2016 | |
| INVENTOR(S) | : Lothar Stadelmeier et al. | |

It is certified that error appears in the above-identified patent and that said Letters Patent is hereby corrected as shown below:

Claims

In Column 42, Claim 14, lines 28-29, change "the transmission time of a single on at least" to --the transmission time of a single frame on at least--.

Signed and Sealed this
Twelfth Day of April, 2016

Michelle K. Lee
*Director of the United States Patent and Trademark Office*